(12) United States Patent
Abe

(10) Patent No.: US 7,391,920 B2
(45) Date of Patent: Jun. 24, 2008

(54) IMAGE PROCESSING METHOD, APPARATUS, AND PROGRAM

(75) Inventor: Yuko Abe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 696 days.

(21) Appl. No.: 10/979,279

(22) Filed: Nov. 3, 2004

(65) Prior Publication Data

US 2005/0094900 A1    May 5, 2005

(30) Foreign Application Priority Data

| Nov. 4, 2003 | (JP) | ............................. 2003-374395 |
| Nov. 6, 2003 | (JP) | ............................. 2003-377370 |
| Nov. 6, 2003 | (JP) | ............................. 2003-377371 |
| Nov. 6, 2003 | (JP) | ............................. 2003-377372 |

(51) Int. Cl.
      *G06K 9/40*      (2006.01)
(52) U.S. Cl. ........................ 382/266; 382/267; 382/270; 382/300
(58) Field of Classification Search ................ 382/266, 382/267, 270, 300, 252, 298, 237; 358/3.01, 358/3.1, 1.9, 519, 312; 348/129, 134, 246
See application file for complete search history.

(56) References Cited

U.S. PATENT DOCUMENTS

| 5,463,697 | A   |    | 10/1995 | Toda et al.    | ................... 382/199 |
| 6,011,878 | A   | *  | 1/2000  | Ushida et al.  | ................ 382/298 |
| 6,373,990 | B1  | *  | 4/2002  | Ushida et al.  | ................ 382/252 |
| 6,535,651 | B1  |    | 3/2003  | Aoyama et al.  | ............. 382/300 |
| 6,766,068 | B2  |    | 7/2004  | Aoyama et al.  | ............. 382/300 |
| 6,940,619 | B1  | *  | 9/2005  | Easwar         | ...................... 358/3.01 |
| 6,965,395 | B1  | *  | 11/2005 | Neter          | .......................... 348/129 |

FOREIGN PATENT DOCUMENTS

| EP | 1 067 774 A2 | 1/2001 |
| JP | 6-58716      | 3/1994 |
| JP | 7-87360      | 3/1995 |
| JP | 9-266531     | 10/1997 |
| JP | 9-321981     | 12/1997 |
| JP | 11-69144     | 9/1999 |
| JP | 2000-331174  | 11/2000 |
| JP | 2001-8037    | 1/2001 |
| JP | 2002-77595   | 3/2002 |
| JP | 2002-319020  | 10/2002 |
| JP | 2003-526272  | 9/2003 |
| WO | WO 01/67392  | 9/2001 |

* cited by examiner

*Primary Examiner*—Anh Hong Do
(74) *Attorney, Agent, or Firm*—McGinn IP Law Group, PLLC

(57) ABSTRACT

If an edge is detected between each pair of two mutually adjacent pixels among three serially adjacent pixels in a digital image, a candidate pixel selection unit in an intermediate value pixel judgment unit selects a pixel located at the middle among the three pixels as a candidate pixel. A pixel value comparison unit compares the pixel values of the three pixels, which are used for selecting the candidate pixel, with each other. Only if the pixel values of the three pixels monotonically increase or monotonically decrease along the arrangement direction of the pixels, a judgment unit judges that the candidate pixel is an intermediate value pixel.

36 Claims, 57 Drawing Sheets

Prior Art

Prior Art

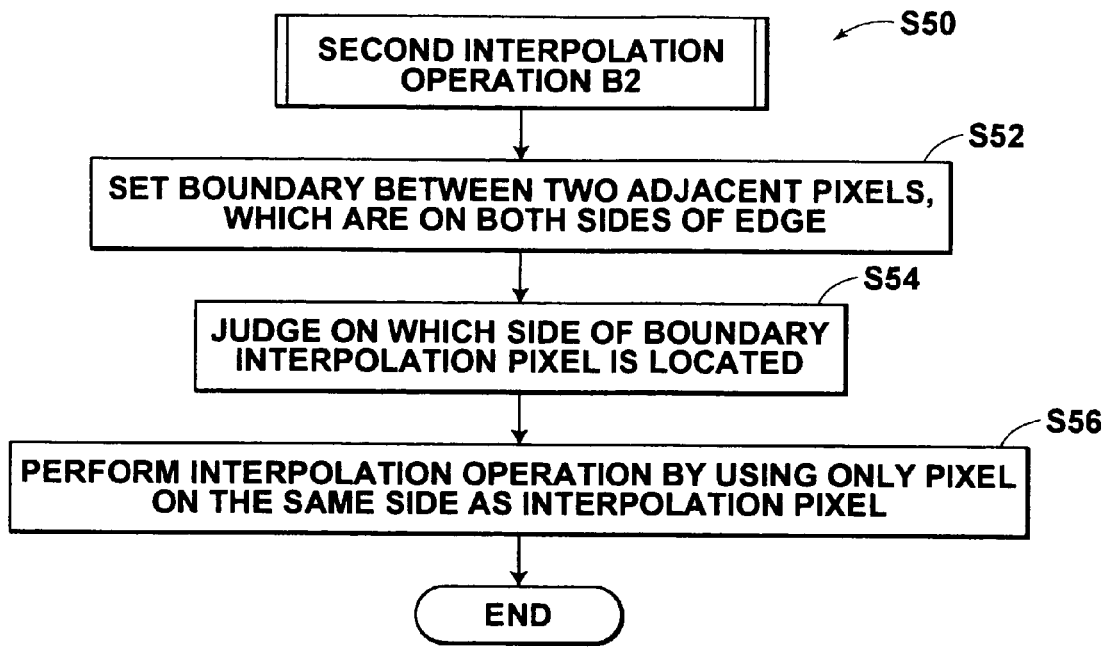
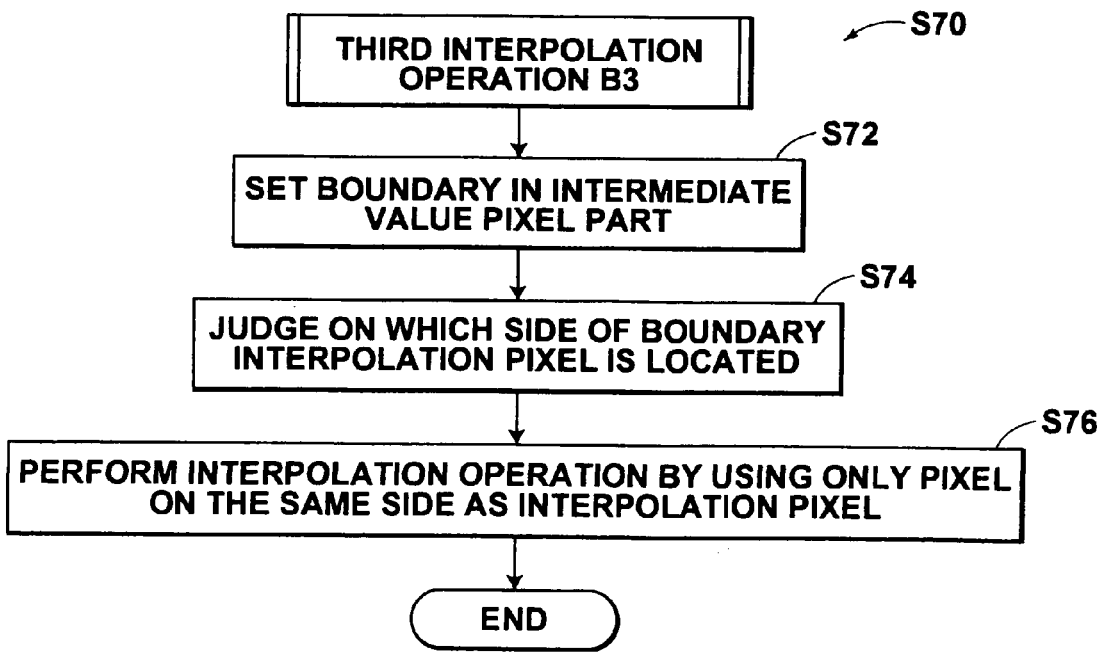

FIG.24

| | |
|---|---|
| ![Pattern 0](square with center x, tick marks on all four sides)<br>PATTERN 0 | • NO EDGE<br>• e1<br>• e2<br>• e3<br>• e4 |
| ![Pattern 1](square with center x, diagonal line in upper-right)<br>PATTERN 1 | • e1,e2<br>• e1,e2,e5<br>• e1,e2,e6<br>• e1,e2,e3,e5<br>• e1,e2,e4,e5<br>• e1,e2,e5,e6 |
| ![Pattern 2](square with center x, diagonal line in lower-right)<br>PATTERN 2 | • e2,e3<br>• e2,e3,e5<br>• e2,e3,e6<br>• e1,e2,e3,e6<br>• e1,e2,e4,e6<br>• e2,e3,e5,e6 |

FIG.25
| | |
|---|---|
| 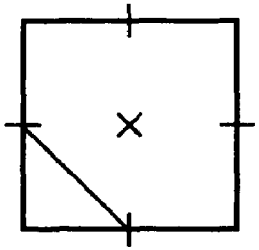<br>PATTERN 3 | · e3,e4<br>· e3,e4,e5<br>· e3,e4,e6<br>· e1,e3,e4,e5<br>· e2,e3,e4,e5<br>· e3,e4,e5,e6 |
| 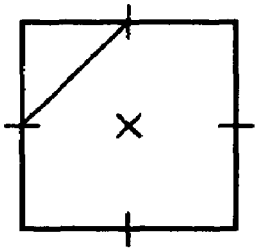<br>PATTERN 4 | · e1,e4<br>· e1,e4,e5<br>· e1,e4,e6<br>· e1,e2,e4,e6<br>· e1,e3,e4,e6<br>· e1,e4,e5,e6 |
| 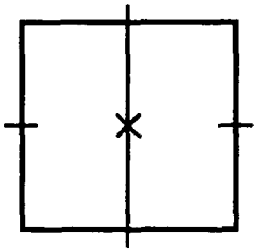<br>PATTERN 5 | · e1,e3<br>· e1,e5<br>· e1,e6<br>· e3,e5<br>· e3,e6<br>· e1,e2,e3<br>· e1,e3,e4<br>· e1,e3,e5<br>· e1,e3,e6<br>· e1,e5,e6<br>· e3,e5,e6<br>· e1,e3,e5,e6<br>· e1,e2,e3,e5,e6<br>· e1,e3,e4,e5,e6 |

FIG.26
| | |
|---|---|
| 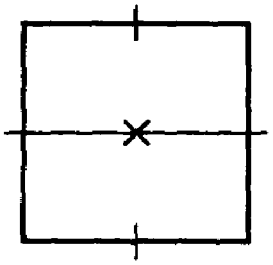<br>PATTERN 6 | · e2,e4<br>· e2,e5<br>· e2,e6<br>· e4,e5<br>· e4,e6<br>· e1,e2,e4<br>· e2,e3,e4<br>· e2,e4,e5<br>· e2,e4,e6<br>· e2,e5,e6<br>· e4,e5,e6<br>· e2,e4,e5,e6<br>· e1,e2,e4,e5,e6<br>· e2,e3,e4,e5,e6 |
| 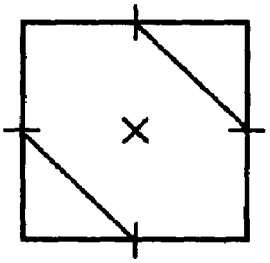<br>PATTERN 7 | · e1,e2,e3,e4 ※<br>· e1,e2,e3,e4,e5<br>· e1,e2,e3,e4,e5,e6 ※ |
| 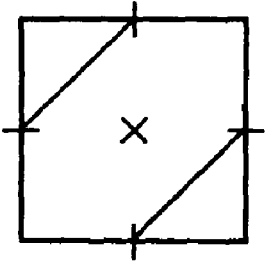<br>PATTERN 8 | · e1,e2,e3,e4 ※<br>· e1,e2,e3,e4,e6<br>· e1,e2,e3,e4,e5,e6 ※ |

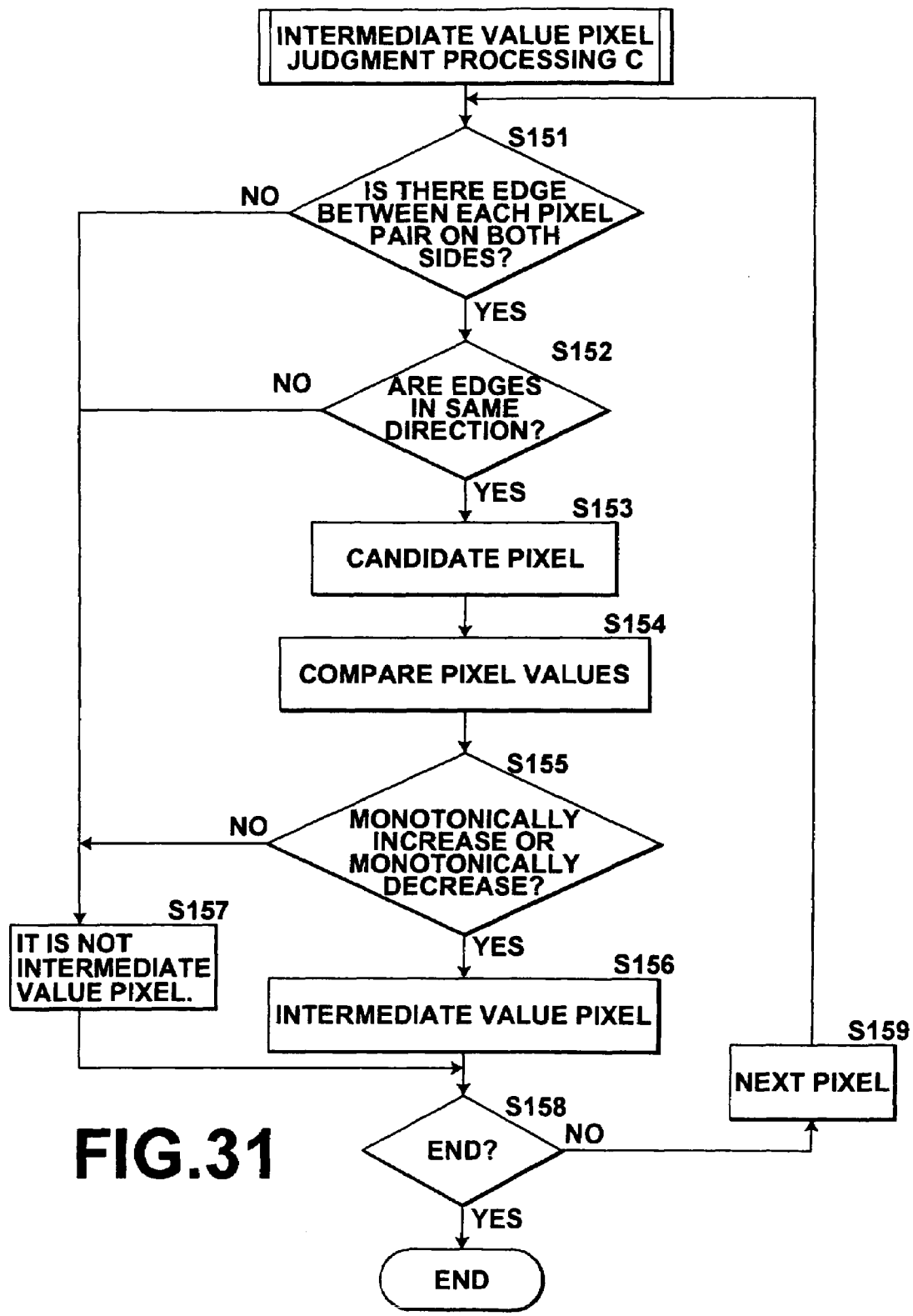

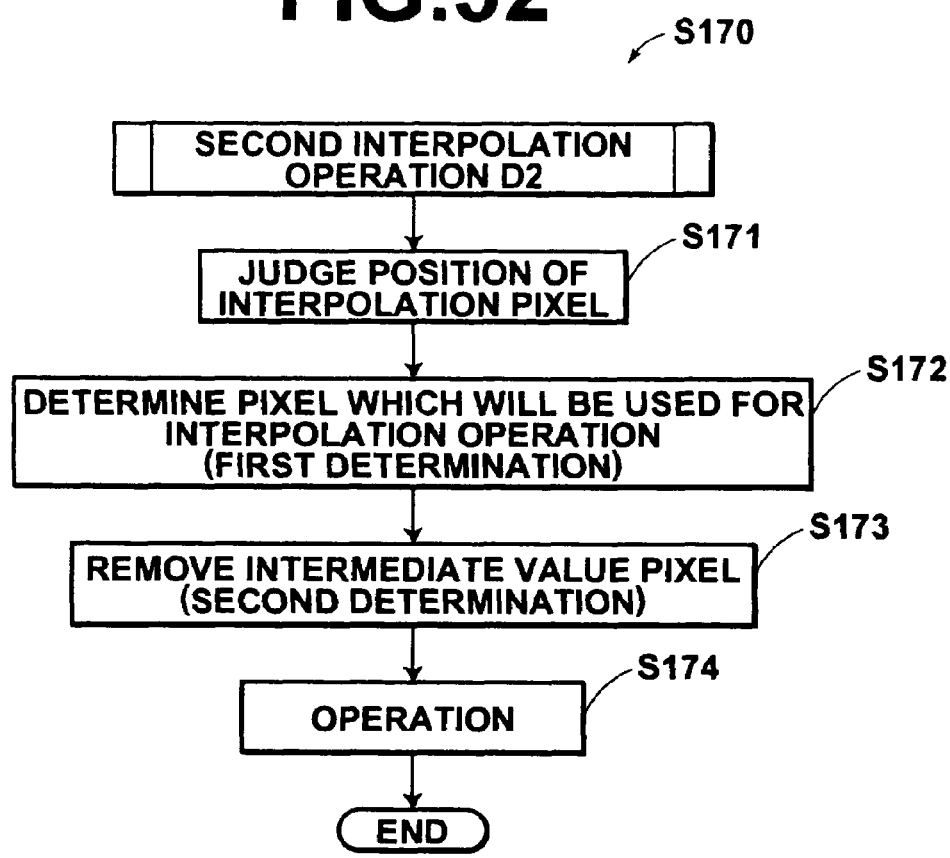
FIG.33A
→ X  Prior Art
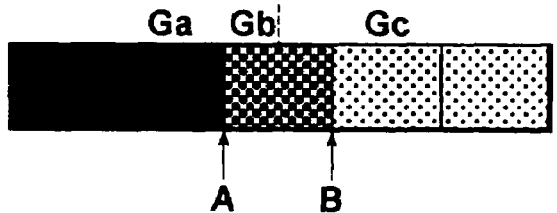
FIG.33B
Prior Art

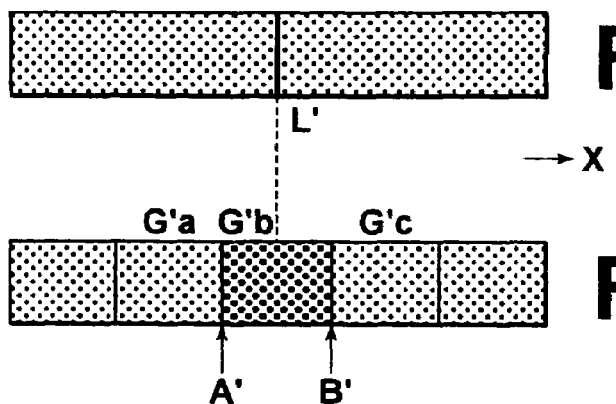
FIG.34A
FIG.34B
FIG.35
| G11 | G21 | G31 |
|-----|-----|-----|
| G12 | G22 | G32 |
| G13 | G23 | G33 |
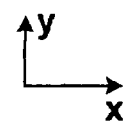

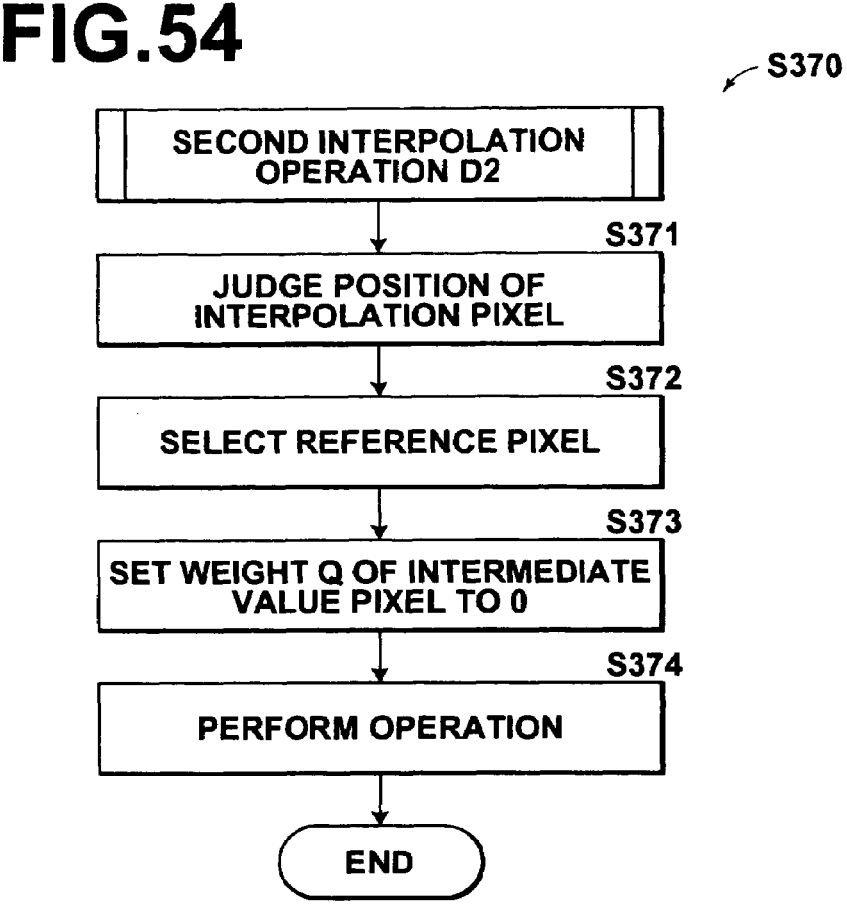
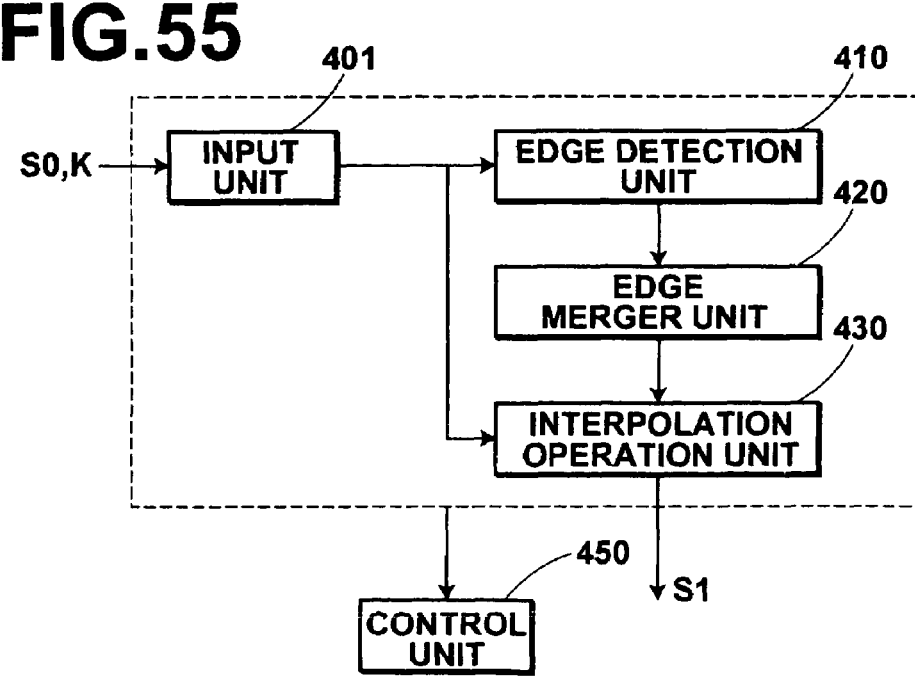

IMAGE PROCESSING METHOD, APPARATUS, AND PROGRAM

BACKGROUND OF THE INVENTION

1. Field of the Invention

The present invention relates to an intermediate value pixel judgment method for judging whether a reference pixel, which is used for interpolating an interpolation pixel between pixels included in an image represented by image data, is an intermediate value pixel when the image is enlarged or reduced, for example. The present invention also relates to an image interpolation method for interpolating the interpolation pixel between the pixels included in the image. The present invention also relates to a method for adjusting an edge, which is detected to interpolate an interpolation pixel between the pixels. The present invention also relates to an edge detection method for detecting an edge located between pixels in an image. The present invention relates to these image processing methods and apparatuses, and programs for causing a computer to execute these methods.

2. Description of the Related Art

Conventionally, a digital image, which is obtained by photoelectrically reading out a photograph image, which is recorded on a photography film such as a negative film and a color reversible film, with a read-out device such as a scanner, and an image represented by image data, which is obtained by taking a photograph of a subject with a digital photography device such as a digital still camera (DSC) and a cellular phone to which a camera is attached, are enlarged or reduced so that the size of the images conforms to the size of a reproduction device such as a monitor for reproducing the images. For example, a service is provided for enlarging or reducing the image data according to the size of a liquid crystal monitor of a cellular phone at a destination when an image data, which is obtained by taking a photograph of a subject with a cellular phone to which a camera is attached, is sent to the cellular phone at the destination as an e-mail.

The image data is enlarged or reduced by interpolating a new pixel (hereinafter, referred to as an interpolation pixel), based on an enlargement/reduction ratio, between pixels included in an image, which is represented by image data. There are various known interpolation methods such as a linear interpolation method, a Gaussian filter method, a nearest neighbor method, a bilinear method, and a bicubic method.

However, if the image data is enlarged or reduced by using a single method, there is a problem that a blur or a "shaggy edge" or shagginess is generated in an edge part included in the image. Therefore, a method has been proposed for detecting an edge component included in an image and performing a different interpolation operation for an edge part and for a non-edge part from each other (Japanese Unexamined Patent Publication No. 2002-319020).

A Sobel filter or a Laplacian filter is generally used for detecting an edge in the image by the method disclosed in Japanese Unexamined Patent Publication No. 2002-319020 or like. The Sobel filter and the Laplacian filter are odd-tap filters, of which shortest length is 3 taps. An edge can be detected by judging whether a target pixel is an edge by performing filtering processing.

Meanwhile, when an image is enlarged or reduced, an interpolation pixel is interpolated between pixels. Therefore, it is required to judge whether there is an edge between the pixels instead of judging whether there is an edge in a pixel in the image. When edge detection processing is performed by using the odd-tap filter as described above, it is possible to judge whether the target pixel, itself, in the image is an edge. However, it is impossible to judge whether there is an edge between the pixels.

As the simplest method for judging whether there is an edge between pixels, there is a method for performing filtering processing on two adjacent pixels in an image, for example, by using a difference filter, which is illustrated in FIG. 5. According to this method, a difference in pixel value between the two pixels is obtained, and if the absolute value of the difference is equal to or larger than a predetermined threshold value, it is judged that there is an edge between the two adjacent pixels, for example. In the following descriptions on the present invention, the edge detection method as described above is referred to as a first edge detection method.

Further, a method for judging whether there is an edge between two pixels, which are located at the middle among four serially adjacent pixels, based on the pixel values of the four serially adjacent pixels instead of the pixel values of the two adjacent pixels may be also used. Specifically, for detecting whether there is an edge between two pixels G2 and G3, which are located at the middle among four serially adjacent pixels G1, G2, G3 and G4, which are illustrated in FIG. 4, first, filtering processing is performed on three pixel pairs (G1, G2), (G2, G3), and (G3, G4), each including mutually adjacent two pixels by using a difference filter. Accordingly, the difference in pixel value between each pair is calculated as primary differences d1, d2, and d3. Then, filtering processing is further performed on two pairs of mutually adjacent primary differences (d1, d2) and (d2, d3) among the three primary differences d1, d2 and d3 by using a difference filter in a similar manner. Accordingly, the difference between each pair of the primary differences is calculated as secondary differences d4 and d5. The number of combinations of the positive/negative of each of the primary differences and the secondary differences, which are calculated for the four serially adjacent pixels in the image, is 18. FIGS. 6-8 illustrate the relationship between the combinations and the profile shapes of the four pixels. Among the 18 combinations, there are two combinations indicating that there is an edge between the two adjacent pixels G2 and G3, and they are edge 1 and edge 2, which are illustrated in FIG. 6. There are two kinds of edge 1, namely, an edge rising from left to right, which corresponds to the combination (d1, d2, d3, d4, d5)=(+, +, +, +, −), and an edge rising from right to left, which corresponds to the combination (d1, d2, d3, d4, d5)=(−, −, −, −, +). There are four kinds of edge 2, namely, a downwardly convex edge rising from left to right, which corresponds to the combination (d1, d2, d3, d4, d5)=(+, +, +, +, +), an upwardly convex edge rising from left to right, which corresponds to the combination (d1, d2, d3, d4, d5)=(+, +, +, −, −), a downwardly convex edge rising from right to left, which corresponds to the combination (d1, d2, d3, d4, d5)=(−, −, −, +, +), and an upwardly convex edge rising from right to left, which corresponds to the combination (d1, d2, d3, d4, d5)=(−, −, −, −, −). The primary differences d1, d2, and d3 and the secondary differenced d4 and d5 are calculated for four serially adjacent pixels. If the relationship among the positive/negative of each of the differences satisfies the relationship of edge 1 or edge 2, which is illustrated in FIG. 6, it is judged that there is an edge between the two adjacent pixels G2 and G3. If the relationship among the positive/negative of each of the differences satisfies the relationships such as a peak and a trough, which are illustrated in FIGS. 7 and 8, it is judged that there is no edge between the two adjacent pixels G2 and G3. In the following descriptions on the present invention, the edge detection method as described above is referred to as a second edge detection method.

Further, it is also possible to detect whether there is an edge between two adjacent pixels more accurately by combining the first edge detection method and the second edge detection method as described above. Specifically, the primary differences d1, d2, and d3 and the secondary differences d4 and d5 are obtained for the four serially adjacent pixels G1-G4 as in the same manner with the second edge detection method to make a first judgment. In the first judgment, if the relationship among the positive/negative of each of these differences satisfies the relationship of edge 1 or edge 2, which is illustrated in FIG. 6, it is judged that there is an edge between the two adjacent pixels G2 and G3. If the relationship among the positive/negative of each of the differences satisfies the relationship such as a peak or a trough, which is illustrated in FIG. 7, it is judged that there is no edge between the two adjacent pixels G2 and G3. If it is judged that there is an edge between the two adjacent pixels G2 and G3 in the first judgment, judgment is further made as to whether the absolute value of the difference in pixel value between the pixels G2 and G3 is equal to or larger than a predetermined threshold value (second judgment). Only if the second judgment is YES, it is judged that there is a true edge between the pixels G2 and G3. Accordingly, it is possible to prevent a subtle difference in pixel value between the pixels G2 and G3 from being erroneously judged to be an edge when the difference can be regarded as a noise. In the following descriptions on the present invention, the edge detection method as described above is referred to as a third edge detection method.

Further, the first edge detection method may be modified. In the modified edge detection method, if the absolute value of the difference in pixel value between the two adjacent pixels is equal to or larger than a predetermined threshold value (first threshold value), it is judged that there is an edge between the two pixels. In addition, when the absolute value of the difference in pixel value between the two adjacent pixels is less than the first threshold value, if the absolute value of the difference is equal to or larger than a predetermined threshold value (second threshold value), which is less than the first threshold value, and the absolute value of the difference between these two adjacent pixels is the maximum among the absolute values of the differences in pixel value between each pixel pair of mutually adjacent pixels among a plurality of serially adjacent pixels, which is at least four, with these two adjacent pixels at the middle of the plurality of serially adjacent pixels, it may be judged that there is an edge between the two adjacent pixels at the middle of the plurality of serially adjacent pixels. Accordingly, the edge can be detected. In this method, a relatively smooth edge as well as a sharp edge can be detected. In the following descriptions on the present invention, the edge detection method as described above is referred to as a fourth edge detection method.

There are various methods, such as the above examples, for detecting an edge by judging whether there is an edge between pixels in an image. Further, it is also possible to judge the extension direction of the edge (hereinafter referred to as an edge direction, for short) by using these methods. When an interpolation pixel is interpolated between pixels in an image for enlarging or reducing the image, if the pixel value of the interpolation pixel is obtained by selecting a different reference pixel or using a different interpolation operation method depending on whether there is an edge in the vicinity of the interpolation pixel, the direction of the edge, or the like, it is possible to prevent the deterioration in the image quality of the image due to enlargement or reduction. For example, if an edge is not detected between pixels in the vicinity of the interpolation pixel, all the pixels (for example, 16 pixels in a 4×4 pixel block surrounding the interpolation pixel) in the vicinity of the interpolation pixel are used as reference pixels. The pixel value of the interpolation pixel is obtained by performing an interpolation operation by using the pixel values of the reference pixels. In contrast, if an edge is detected between pixels in the vicinity of the interpolation pixel, a judgment is made on which side of the edge the interpolation pixel is located. Further, among the pixels in the vicinity of the interpolation pixel, only the pixels, which are located on the same side of the edge as the interpolation pixel, are used as the reference pixels to obtain the pixel value of the interpolation pixel. Accordingly, the deterioration of the image quality in the enlarged/reduced image can be prevented. Needless to say, besides using the different reference pixels, a different interpolation operation method may be used depending on whether an edge has been detected between the pixels in the vicinity of the interpolation pixel.

In digital images, which are obtained by photoelectrically reading out images recorded on a photography film, or digital images, which are obtained by taking a photograph of a subject with a digital photography device, sampling processing is performed to digitize analog image signals. When the sampling processing is performed, the pixel value of a pixel representing a part, which includes an edge, in a subject (hereinafter referred to as an edge part), is a pixel (hereinafter referred to as an intermediate value pixel) representing an intermediate value between the signal values of the parts on both sides of the edge. FIG. 33B illustrates an example of the pixel composition in a digital image of a subject, which is illustrated in FIG. 33A, in the X direction. In FIG. 33B, a pixel Gb represents a part including an edge L in the subject, and the signal value of the pixel Gb is an intermediate signal value between the signal value of the part on the left side of the edge L and the signal value of the part on the right side of the edge L.

Meanwhile, when an interpolation pixel is interpolated between pixels in an image to enlarge or reduce the image, a pixel located in the vicinity of the interpolation pixel is used as a reference pixel. An interpolation operation is performed by using the pixel value of the reference pixel, and the pixel value of the interpolation pixel is obtained. When the interpolation pixel is interpolated in the vicinity of the pixel Gb during enlargement/reduction processing of the digital image of the subject, which is illustrated in FIG. 33A, if the pixel Gb is used as the reference pixel of the interpolation pixel, the pixel value of the interpolation pixel is influenced by the pixel value of the intermediate value pixel Gb. Therefore, there is a problem that a blur is generated in the enlarged/reduced image. Therefore, it is desirable to judge whether a pixel in the image is the intermediate value pixel to reduce the influence of the intermediate value pixel so that a high quality enlargement/reduction image (enlarged/reduced image) is produced.

Further, as described above, detection processing is performed to detect whether there is an edge between pixels in the vicinity of the interpolation pixel, and if there is an edge, among the pixels located in the vicinity of the interpolation pixel, only the pixels, which are located on the same side of the detected edge as the interpolation pixel, are used as the reference pixels. When the pixel value of the interpolation pixel is obtained by performing an interpolation operation by using the pixel values of the reference pixels, if an intermediate value pixel is included in the reference pixels, the pixel value of the interpolation pixel is influenced by the pixel value of the intermediate value pixel. Therefore, there is a problem that a blur remains in an enlarged/reduced image, and in the worst case, a blur becomes even larger than that of the original image.

Further, in the edge detection method for judging whether there is an edge between adjacent pixels and distinguishing whether there is an edge in a 2×2 pixel block and an edge pattern, only four pixels included in the pixel block are referred to. Therefore, there is a possibility that a noise is detected as the edge.

Further, in the edge detection method as described above, edge detection processing is performed separately for each block. Therefore, an edge in an image is detected as a zigzag line, which is formed by consecutively connecting edges in a plurality of adjacent pixel blocks. Therefore, even a smooth edge in an original image is detected as an edge with a zigzag shape. Meanwhile, as described above, when the image is enlarged or reduced, it is required to perform an interpolation operation based on the position and the direction of the edge in the image to improve the image quality of the enlarged/reduced image. When a noise is detected as an edge, if the interpolation operation is performed based on the detection, the noise remains in the enlarged/reduced image. Therefore, there is a problem that the image quality of the enlarged/reduced image is not good.

If a smooth edge in the original image is detected as an edge with a zigzag shape, when an interpolation operation is performed based on the detection, the shape of an edge in the corresponding part of the obtained image also becomes a zigzag shape. Therefore, there is a problem that the image quality deteriorates.

SUMMARY OF THE INVENTION

In view of the foregoing circumstances, it is a first object of the present invention to provide an intermediate value pixel judgment method and apparatus for judging whether a pixel included in an image is an intermediate value pixel and a program for causing a computer to execute the method. It is a second object of the present invention to provide an image interpolation method and apparatus for reducing a blur in an enlarged/reduced image and a program for causing a computer to execute the method. It is a third object of the present invention to provide an edge adjustment method and apparatus for adjusting an edge, which is detected between pixels in a digital image, to reduce a blur in an image, which is produced by enlarging or reducing the digital image, and a program for causing a computer to execute the method. It is a fourth object of the present invention to provide an edge detection method and apparatus for improving the image quality of an enlarged/reduced image and a program for causing a computer to execute the method.

A first intermediate value pixel judgment method according to the present invention is an intermediate value pixel judgment method comprising the steps:

judging an intermediate value pixel, which is a pixel representing an edge part in a subject, and of which pixel value is an intermediate value between signal values in the parts on both sides of the edge in the edge part, in a digital image obtained by taking a photograph of the subject;

detecting whether there is an edge between pixels in the digital image; and if the edge is detected between each pair of mutually adjacent pixels among three serially adjacent pixels in the digital image in the detecting step, judging that the pixel, which is located at the middle among the three pixels, is the intermediate value pixel.

Here, the term "digital image" refers to an image represented by digital image data, which is obtained by taking a photograph of a subject. The digital image is not limited to an image, which is obtained with a digital camera. The digital image includes an image, which is obtained by photoelectrically reading out a photograph image recorded on a photography film such as a negative film and a color reversible film, a printed photograph image or the like with a read-out device such as a scanner. In the following descriptions, the digital photograph image is simply referred to as "image", for short.

Further, in the present invention, the term "edge part in a subject" refers to the part including an edge, which exists in the subject. An edge, which is detected in a digital photograph image obtained by taking a photograph of the subject, is not always the same as the edge of the "edge part in a subject". For example, in the example illustrated in FIG. 33A, the boundary line L between the left part and the right part of the subject is an edge in the subject. However, there is a possibility that two edges on both sides of the boundary line L are detected or a single edge on one side of the boundary line L is detected in the digital image obtained by taking a photograph of the subject, as illustrated in FIG. 33B.

Further, in the present invention, the term "intermediate value pixel" refers to a pixel, which represents the edge part in the subject. Since the pixel value of the pixel represents the signal values on both sides of the edge, the pixel value inevitably indicates an intermediate value of the signal values in the parts on both sides of the edge.

Further, in the present invention, the term "three serially adjacent pixels" refers to three adjacent pixels, which are located on the same straight line. The "straight line" is not limited to a straight line, which extends in the same direction with the arrangement direction of the pixels in the image. For example, in the image illustrated in FIG. 35, the arrangement direction of the pixels is the X direction and the Y direction. The "three adjacent pixels" with pixel G22 located at the middle of the three pixels are three serially adjacent pixels G12, G22, and G32, which are arranged in the X direction, one of the arrangement directions of the pixels. Alternatively, the "three adjacent pixels" with pixel G22 located at the middle of the three pixels are three serially adjacent pixels G21, G22, and G23, which are arranged in the Y direction, one of the arrangement directions of the pixels. Further, in addition to the two sets of three pixels as described above, three pixels G11, G22, and G33 and three pixels G31, G32, and G13 may be also used as the "three serially adjacent pixels" in the present invention.

A second intermediate value pixel judgment method according to the present invention is an intermediate value pixel judgment method comprising the steps:

judging an intermediate value pixel, which is a pixel representing an edge part in a subject, and of which pixel value is an intermediate value between signal values in the parts on both sides of the edge in the edge part, in a digital image obtained by taking a photograph of the subject;

detecting whether there is an edge between pixels in the digital image;

if the edge is detected between each pair of mutually adjacent pixels among three serially adjacent pixels in the digital image in the detecting step, selecting the pixel, which is located at the middle among the three pixels, as a candidate pixel for the intermediate value pixel;

comparing the pixel values of the three adjacent pixels, which includes the selected candidate pixel; and only if the pixel values of the three adjacent pixels monotonically increase or monotonically decrease along the arrangement direction of the three pixels, judging that the candidate pixel is the intermediate value pixel.

In the second intermediate value pixel judgment method according to the present invention, it is preferable that the extension direction of the edge, which is detected in the detecting step, is distinguished, and only if the edge is detected between each pair of mutually adjacent pixels among the three serially adjacent pixels in the digital image, and the extension directions of the two detected edges are the same, the pixel, which is located at the middle among the three pixels, is selected as the candidate pixel.

A first intermediate value pixel judgment apparatus according to the present invention is an intermediate value pixel judgment apparatus for judging an intermediate value pixel, which is a pixel representing an edge part in a subject, and of which pixel value is an intermediate value between signal values in the parts on both sides of the edge in the edge part, in a digital image obtained by taking a photograph of the subject, the apparatus comprising:

an edge detection means for detecting whether there is an edge between pixels in the digital image; and a judgment means for judging that if the edge detection means detects the edge between each pair of mutually adjacent pixels among three serially adjacent pixels in the digital image, the pixel, which is located at the middle among the three pixels, is the intermediate value pixel.

A second intermediate value pixel judgment apparatus according to the present invention is an intermediate value pixel judgment apparatus for judging an intermediate value pixel, which is a pixel representing an edge part in a subject, and of which pixel value is an intermediate value between signal values in the parts on both sides of the edge in the edge part, in a digital image obtained by taking a photograph of the subject, the apparatus comprising:

an edge detection means for detecting whether there is an edge between pixels in the digital image;

a candidate pixel selection means for, if the edge detection means detects the edge between each pair of mutually adjacent pixels among three serially adjacent pixels in the digital image, selecting the pixel, which is located at the middle among the three pixels, as a candidate pixel for the intermediate value pixel; and a judgment means for comparing the pixel values of the three adjacent pixels, which includes the selected candidate pixel, and only if the pixel values of the three adjacent pixels monotonically increase or monotonically decrease along the arrangement direction of the three pixels, judging that the candidate pixel is the intermediate value pixel.

It is preferable that the edge detection means includes an edge direction distinction means for distinguishing the extension direction of the detected edge, and only if the edge is detected between each pair of mutually adjacent pixels among the three serially adjacent pixels in the digital image, and the extension directions of the two detected edges are the same, the candidate pixel selection means selects the pixel, which is located at the middle among the three pixels, as the candidate pixel.

A first image interpolation method according to the present invention is an image interpolation method comprising the steps of:

when the pixel value of an interpolation pixel is obtained, which is located between pixels in a digital image obtained by taking a photograph of a subject, detecting whether there is an edge between pixels in the vicinity of the interpolation pixel in the digital image;

selecting a different reference pixel from the pixels in the vicinity of the interpolation pixel depending on whether the edge is detected; and obtaining the pixel value of the interpolation pixel by performing an interpolation operation by using the pixel value of the selected reference pixel, wherein the interpolation operation is performed by giving a less weight to an edge neighboring pixel, which is one of two adjacent pixels on both sides of the edge detected in the detecting step, than the weight of the reference pixel other than the edge neighboring pixel.

A second image interpolation method according to the present invention is an image interpolation method comprising the steps of:

when the pixel value of an interpolation pixel is obtained, which is located between pixels in a digital image obtained by taking a photograph of a subject, detecting whether there is an edge between pixels in the vicinity of the interpolation pixel in the digital image;

selecting a different reference pixel from the pixels in the vicinity of the interpolation pixel depending on whether the edge is detected;

obtaining the pixel value of the interpolation pixel by performing an interpolation operation by using the pixel value of the selected reference pixel; and judging whether the reference pixel is an intermediate value pixel, which is a pixel representing an edge part in the subject, and of which pixel value is an intermediate value between signal values in the parts on both sides of the edge, wherein the interpolation operation is performed by giving a less weight to a reference pixel, which is judged to be the intermediate value pixel, than the weight of a reference pixel, which is judged not to be the intermediate value pixel.

A first image interpolation apparatus according to the present invention is an image interpolation apparatus comprising:

an edge detection means for, when the pixel value of an interpolation pixel is obtained, which is located between pixels in a digital image obtained by taking a photograph of a subject, detecting whether there is an edge between pixels in the vicinity of the interpolation pixel in the digital image;

a reference pixel selection means for selecting a different reference pixel from the pixels in the vicinity of the interpolation pixel depending on whether the edge is detected; and an interpolation operation means for obtaining the pixel value of the interpolation pixel by performing an interpolation operation by using the pixel value of the selected reference pixel, wherein the interpolation operation means performed the interpolation operation by giving a less weight to an edge neighboring pixel, which is one of two adjacent pixels on both sides of the edge detected by the edge detection means, than the weight of the reference pixel other than the edge neighboring pixel.

A second image interpolation apparatus according to the present invention is an image interpolation apparatus comprising:

an edge detection means for when the pixel value of an interpolation pixel is obtained, which is located between pixels in a digital image obtained by taking a photograph of a subject, detecting whether there is an edge between pixels in the vicinity of the interpolation pixel in the digital image;

a reference pixel selection means for selecting a different reference pixel from the pixels in the vicinity of the interpolation pixel depending on whether the edge is detected;

an interpolation operation means for obtaining the pixel value of the interpolation pixel by performing an interpolation operation by using the pixel value of the selected reference pixel; and an intermediate value pixel judgment means for judging whether the reference pixel is an intermediate value pixel, which is a pixel representing an edge part in the subject, and of which pixel value is an intermediate value between signal values in the parts on both sides of the edge, wherein the interpolation operation means performs the interpolation operation by giving a less weight to a reference pixel, which is judged to be the intermediate value pixel, than the weight of a reference pixel, which is judged not to be the intermediate value pixel.

If the edge detection means detects the edge between each pair of mutually adjacent pixels among three serially adjacent pixels in the digital image, the intermediate value pixel judgment means may judge that the pixel located at the middle among the three pixels is the intermediate value pixel.

It is preferable that if the edge detection means detects the edge between each pair of mutually adjacent pixels among three serially adjacent pixels in the digital image, the intermediate value pixel judgment means selects the pixel located at the middle among the three pixels as a candidate pixel for the intermediate value pixel, and compares the pixel values of the three adjacent pixels including the selected candidate pixel, and only if the compared pixel values of the three pixels monotonically increase or monotonically decrease along the arrangement direction of the three pixels, the intermediate value pixel judgment means judges that the candidate pixel is the intermediate value pixel.

In this case, it is preferable that the edge detection means includes an edge direction distinction means for distinguishing the extension direction of the detected edge, and only if the edge detection means detects the edge between each pair of mutually adjacent pixels among three serially adjacent pixels on the image and the extension directions of the two detected edges are the same, the intermediate value pixel judgment means selects the pixel located at the middle among the three pixels as the candidate pixel.

An edge adjustment method according to the present invention is an edge adjustment method comprising the steps of:

detecting an edge located between pixels in a digital photograph image obtained by taking a photograph of a subject; and if the edge is detected between each pair of mutually adjacent pixels among three serially adjacent pixels in the digital photograph image, merging the two edges at a position in the vicinity of the middle pixel among the three pixels.

It is preferable that the edge adjustment method according to the present invention is an edge adjustment method comprising the steps of:

comparing the pixel values of the three pixels of the two edges with each other, wherein only if the pixel values of the three pixels monotonically increase or monotonically decrease along the arrangement direction of the three pixels, the two edges are merged.

It is preferable that the edge adjustment method according to the present invention is an edge adjustment method, wherein only if the extension directions of the two edges are the same, the two edges are merged.

The phrase "position in the vicinity of the middle pixel" refers to the position between the midpoint of each pixel pair, which includes two mutually adjacent pixels, among the three pixels. The position in the vicinity of the middle pixel includes the position of the middle pixel. For example, if the three pixels are G1, G2 and G3, the vicinity of the middle pixel G2 is the position between the midpoint between the pixels G1 and G2 and the midpoint between the pixels G2 and G3.

An edge adjustment apparatus according to the present invention is an edge adjustment apparatus comprising:

an edge detection means for detecting an edge located between pixels in a digital photograph image obtained by taking a photograph of a subject; and an edge merger means for, if the edge detection means detects the edge between each pair of mutually adjacent pixels among three serially adjacent pixels in the digital photograph image, merging the two edges at a position in the vicinity of the middle pixel among the three pixels.

It is preferable that the edge merger means compares the pixel values of the three pixels of the two edges with each other, and only if the pixel values of the three pixels monotonically increase or monotonically decrease along the arrangement direction of the three pixels, the edge merger means merges the two edges.

It is preferable that the edge detection means detects the extension direction of the edge, and only if the extension directions of the two edges are the same, the edge merger means merges the two edges.

A first edge detection method according to the present invention is an edge detection method comprising the steps of:

judging whether there is an edge between two adjacent pixels in an image;

obtaining edge information, based on the judgment, representing whether there is an edge within a 2×2 pixel block in the image and an edge pattern including the position of the edge and the extension direction of the edge in an edge-including block, which includes the edge; and if the edge information of each of the pixel blocks, which are adjacent to the edge-including block, indicates that there is no edge connected to the edge in the edge-including block, rejudging that the edge in the edge-including block is not an edge.

The clause "if . . . indicates that there is no edge connected to the edge in the edge-including block" refers to a case, in which all pixel blocks, which are adjacent to a single edge-including block, are pixels without an edge or a case, in which any edge in the single edge-including block is not connected to any one of edge in each of edge-including blocks, which are adjacent to the single edge-including block.

Further, the edge in the edge-including block is not limited to a single edge. A plurality of edges may be detected in a pixel block. If all the pixel blocks, which are adjacent to an edge-including block, which includes a plurality of edges, are blocks without an edge, it is judged that all the plurality of edges included in the edge-including block are "not edges". Specifically, it is rejudged that there is no edge in the edge-including block. Meanwhile, if there is an edge-including block among the adjacent pixel blocks, it is rejudged that only the edges, which are not connected to any edge in the adjacent edge-including blocks, are not edges among the plurality of edges included in the edge-including block.

A second edge detection method according to the present invention is an edge detection method comprising the steps of:

judging whether there is an edge between two adjacent pixels in an image;

obtaining edge information, based on the judgment, representing whether there is an edge within a 2×2 pixel block in the image and an edge pattern including the position of the edge and the extension direction of the edge in an edge-including block, which includes the edge; and in an area including at least two adjacent edge-including blocks, performing processing on each pair of mutually connected edges on a zigzag line, which is formed by consecutively connecting edges, each represented by the edge pattern in each of the edge-including blocks, so that a point, which is located between the point of contact between two mutually connected edges on the zigzag line and an intersection of a straight line connecting two adjacent pixels on both sides of the point of contact in the image and a straight line connecting the outer endpoints of the two connected edges, becomes a new point of contact, which corresponds to the two connected edges, and using a new zigzag line, which is formed by sequentially connecting the outer endpoint of each edge at both ends of the zigzag line and each of the new points of contact, as an edge in the area.

Here, the clause "outer endpoints of the two connected edges" refers to an endpoint of each of the two edges, other than the point of contact between the two edges".

Here, for the purpose of explanation, the point of contact between the two mutually connected edges, is point A. An intersection of a straight line, which connects two adjacent pixels located on both sides of the point A, and a straight line, which connects the outer endpoints of the two edges, is point B. A new point of contact, which corresponds to the two edges, is point C. The distance between the point A and the point B is L. The distance between the point A and the point C is 1. In the present invention, the relationship between 1 and L is 1=L/M (M: integer, which is 1 or larger). In the present invention, it is preferable that the value of M is larger than 1, however, the value may be 1. Specifically, the point B may become the new point of contact (point C).

A first edge detection apparatus according to the present invention is an edge detection apparatus comprising:

a judgment means for judging whether there is an edge between two adjacent pixels in an image;

an edge information obtainment means for obtaining edge information, based on the judgment, representing whether there is an edge within a 2×2 pixel block in the image and an edge pattern including the position of the edge and the extension direction of the edge in an edge-including block, which includes, the edge; and a correction means for, if the edge information of each of the pixel blocks, which are adjacent to the edge-including block, indicates that there is no edge connected to the edge in the edge-including block, rejudging that the edge in the edge-including block is not an edge.

A second edge detection apparatus according to the present invention is an edge detection apparatus comprising:

a judgment means for judging whether there is an edge between two adjacent pixels in an image;

an edge information obtainment means for obtaining edge information, based on the judgment, representing whether there is an edge within a 2×2 pixel block in the image and an edge pattern including the position of the edge and the extension direction of the edge in an edge-including block, which includes the edge; and an edge smoothing means for, in an area including at least two adjacent edge-including blocks, performing processing on each pair of mutually connected edges on a zigzag line, which is formed by consecutively connecting edges, each represented by the edge pattern in each of the edge-including blocks, so that a point, which is located between the point of contact between two mutually connected edges on the zigzag line and an intersection of a straight line connecting two adjacent pixels on both sides of the point of contact in the image and a straight line connecting the outer endpoints of the two connected edges, becomes a new point of contact, which corresponds to the two connected edges, and using a new zigzag line, which is formed by sequentially connecting the outer endpoint of each edge at both ends of the zigzag line and each of the new points of contact, as an edge in the area.

Further, each of the intermediate value pixel judgment method, the image interpolation method, the edge adjustment method, and the edge detection method according to the present invention may be provided as a program for causing a computer to execute the methods.

According to the first intermediate value pixel judgment method and apparatus of the present invention, if edges are detected between a pixel, which is located at the middle, and the other two pixels among three serially adjacent pixels in an image (For the purpose of explanation, hereinafter, if an edge is detected between each pair of two mutually adjacent pixels among three serially adjacent pixels, the two edges are referred to as "adjacent edges."), it is judged that the pixel, which is located at the middle, is an intermediate value pixel. For example, if a method, such as the second edge detection method as described above, for detecting whether there is an edge between pixels is applied to an image of a subject, which is illustrated in FIG. 33A, an edge A is detected between pixels Ga and Gb and an edge B is detected between pixels Gb and Gc as illustrated in FIG. 33B. Specifically, the second edge detection method is a method for detecting an edge by obtaining primary differences and secondary differences for four serially adjacent pixels, and judging, based on the obtained relationship among the positive/negative of each of the primary differences and secondary differences, whether there is an edge between the two adjacent pixels at the middle of the four pixels. Then, the pixel Gb between the edge A and the edge B, which are adjacent edges, may be judged to be an intermediate value pixel, which represents an intermediate value between signal values in the parts on both sides of a boundary line L (an edge in a subject), which is illustrated in FIG. 33A.

According to the second intermediate value pixel judgment method and apparatus of the present invention, first, the intermediate value pixel, which is judged by the first intermediate value pixel judgment method and apparatus of the present invention, is used as a candidate pixel for the intermediate value pixel. Then, the pixel values of the three adjacent pixels including this candidate pixel, which are used for selecting the candidate pixel, are compared with each other. Only if the pixel values of the three pixels monotonically increase or monotonically decrease along the arrangement direction of the pixels, this candidate pixel is judged to be an intermediate value pixel. If the pixel value of each pixel, which is compared with each other, does not represent the monotonically increasing or monotonically decreasing relationship as described above, the candidate pixel is not judged to be the intermediate value pixel.

For example, when a single thin line exists in the image of a subject as illustrated in FIG. 34A, the composition of pixels in the X direction of the image is as illustrated in FIG. 34B. In this case, if the first edge detection method as described above is applied, an edge A' is detected between pixels G'a and G'b, and an edge B' is detected between pixels G'b and G'c. The first edge detection method is a method for detecting an edge by obtaining a difference in pixel value between two adjacent pixels and judging that there is an edge between the two pixels if the absolute value of the difference is equal to or larger than a predetermined threshold value. According to the first intermediate value pixel judgment method and apparatus of the present invention, the pixel G'b, which is located at the middle of the pixels, is judged to be the intermediate value pixel. However, in this case, the candidate pixel G'b is a pixel representing the thin line, and the candidate pixel G'b is not the intermediate value pixel. There is also a possibility that this kind of misjudgment is made when the fourth edge detection method as described above is used. Meanwhile, if the second or third edge detection method as described above is used as a method for detecting the edge, an edge is not detected between the pixels G'a and G'b and an edge is not detected between the pixels G'b and G' c. Therefore, the pixel G'b is not misjudged to be the intermediate value pixel in the first intermediate value judgment method and apparatus of the present invention. Specifically, according to the first intermediate value pixel judgment method and apparatus of the present invention, the intermediate value pixel may be detected. However, there is a possibility of misjudging a pixel, which is not the intermediate value pixel, to be the intermediate value pixel depending on the method used for detecting whether there is an edge between pixels in the image. In contrast, in the second intermediate value pixel judgment method and apparatus according to the present invention, a pixel between the adjacent edges is used as a candidate pixel, and the pixel value of the candidate pixel is compared with the pixel values of the pixels on the both sides of the candidate pixel. The judgment as to whether the candidate pixel is the intermediate value pixel is made based on how the pixel values of the pixels change. Therefore, the pixel G'b, which is illustrated in FIG. 34B, is not misjudged to be the intermediate value pixel. The intermediate value pixel can be detected more accurately without regard to the edge detection method for detecting whether there is an edge between two adjacent pixels.

Further, in the second intermediate value pixel judgment method and apparatus according to the present invention, the extension directions of the edges are distinguished. Only if two adjacent edges extend in the same direction, the pixel between the two adjacent edges is used as a candidate pixel for the intermediate value pixel. Accordingly, the accuracy in the judgment of the intermediate value pixel can be improved.

According to the first image interpolation method and apparatus of the present invention, the fact that the intermediate value pixel is always an edge neighboring pixel, which is one of two adjacent pixels on both sides of an edge between pixels, is utilized. If there is an edge between pixels in the vicinity of the interpolation pixel, a less weight is given to the edge neighboring pixel among reference pixels than the weight given to the reference pixels other than the edge neighboring pixel to perform interpolation operation. Since the pixel value of the interpolation pixel is obtained as described above, a remaining blur, caused by the intermediate value pixel, in an image (enlarged/reduced image) including the interpolation pixel can be reduced. It is also possible to prevent the blur from becoming larger. Hence, the quality of the enlarged/reduced image is good.

According to the second pixel interpolation method and apparatus of the present invention, the fact that the edge neighboring pixel is not always the intermediate value pixel is utilized. Judgment is made as to whether the reference pixel is the intermediate value pixel, and a less weight is given to the reference pixel, which is the intermediate value pixel, than the weight given to the reference pixels, which is not the intermediate value pixel to perform interpolation operation. Since the pixel value of the interpolation pixel is obtained as described above, a remaining blur, caused by the intermediate value pixel, in an enlarged/reduced image can be more accurately reduced. It is also possible to prevent the blur from becoming larger more accurately. If an edge is detected between each pair of two mutually adjacent pixels among the three serially adjacent pixels in the image, the two edges are merged at a position in the vicinity of the middle pixel among the three pixels.

If edges are detected between the pixel, which is located at the middle, and the other two pixels among the three serially adjacent pixels in the image (For the purpose of explanation, hereinafter, if an edge is detected between each pair of two mutually adjacent pixels among three serially adjacent pixels, the two edges are referred to as "adjacent edges"), it can may be judged that the pixel, which is located at the middle, is the intermediate value pixel. For example, if a method for detecting whether there is an edge between pixels, such as the second edge detection method as described above is applied to the detection of an edge in an image of a subject, which is illustrated in FIG. 33A, an edge A is detected between pixels Ga and Gb and an edge B is detected between pixels Gb and Gc as illustrated in FIG. 33B. The second edge detection method is a method for detecting an edge by obtaining primary differences and secondary differences for four serially adjacent pixels, and judging, based on the obtained relationship among the positive/negative of each of the primary differences and the secondary differences, whether there is an edge between the two adjacent pixels at the middle of the four pixels. Then, the pixel Gb, which is located between the edge A and the edge B, which are adjacent edges, may be regarded as an intermediate value pixel, which represents an intermediate value between signal values in the parts on both sides of a boundary line L (an edge in a subject), which is illustrated in FIG. 33A.

According to the edge adjustment method and apparatus of the present invention, the fact that a pixel, which is located between the adjacent edges, can be regarded as the intermediate value pixel, is utilized, and the adjacent edges are merged. Accordingly, when the image is enlarged or reduced, first, among the pixels located on the same side of the edge as the interpolation pixel, a pixel, which is not the intermediate value pixel, is used as the reference pixel. When an interpolation operation is performed by using the pixel value of the reference pixel to obtain the pixel value of the interpolation pixel, the problem, can be solved, that the pixel value of the interpolation pixel may not be obtained because there is no reference pixel located between the adjacent edges to obtain the pixel value of the interpolation pixel.

Further, for example, if the adjacent edges are merged at the position of the middle pixel among three pixels corresponding to the adjacent edges, in other words, the position of a pixel, which can be judged to be the intermediate value pixel, the position of the intermediate value pixel is the same as the position of the edge. Therefore, even if the judgment as to whether the reference pixel is the intermediate value pixel is not made, the intermediate value pixel is not used as the reference pixel. Accordingly, it is possible to easily prevent a blur from remaining or becoming larger in the enlarged/reduced image.

Further, when the position at which the adjacent edges are merged is not the same as the position of the aforementioned middle pixel, other reference pixels besides the middle pixel may be obtained as the reference pixel for the interpolation pixel located between the adjacent edges. Therefore, an interpolation operation is performed without using the middle pixel as the reference pixel or by giving a less weight to the middle pixel than the weight given to other reference pixels. Accordingly, a high quality enlarged/reduced image can be obtained.

Meanwhile, for example, when a single thin line exists in an image of a subject as illustrated in FIG. 34A, the composition of pixels in the X direction of the image is as illustrated in FIG. 34B. In this case, if the first edge detection method as described above is applied, an edge A' is detected between pixels G' a and G'b, and an edge B' is detected between pixels G'b and G'c. The first edge detection method is a method for detecting an edge by obtaining a difference in pixel value between two adjacent pixels and judging that there is an edge between the two pixels if the absolute value of the difference is equal to or larger than a predetermined threshold value. If a pixel, which is sandwiched by adjacent edges is judged to be an intermediate value pixel, the pixel G'b, which is located at the middle, is judged to be the intermediate value pixel. However, in this case, the candidate pixel G'b is not the intermediate value pixel but a pixel representing the thin line. There is also a possibility that this kind of misjudgment is made when the fourth edge detection method as described above is used. Meanwhile, if the second or third edge detection method as described above is used as an edge detection method, an edge is not detected between the pixels G'a and G'b and an edge is not detected between the pixels G'b and G'c. Therefore, even if the pixel, which is sandwiched by the adjacent edges is judged to be the intermediate value pixel, the pixel G'b is not misjudged to be the intermediate value pixel. Specifically, if the pixel, which is sandwiched by the adjacent edges, is judged to be the intermediate value pixel, there is a possibility that the pixel, which is not the intermediate value pixel, is judged as the intermediate value pixel depending on the method for detecting whether there is an edge between pixels in the image. Therefore, in the example, which is illustrated in FIGS. 34A and 34B, if the adjacent edges A' and B' are merged, there is a possibility that the pixel G'b, which is sandwiched by the two adjacent edges, is not used as the reference pixel or a less weight is given to the pixel G'b when the pixel G'b is used as the reference pixel. Therefore, there is a problem that a line, which actually exists in the subject, (line L' in FIG. 34A) disappears or becomes thinner in the enlarged/reduced image.

In contrast, according to the edge adjustment method and apparatus of the present invention, the adjacent edges are not always merged. The three pixel values, which correspond to the adjacent edges, are compared with each other. Only if the pixel values monotonically increase or monotonically decrease along the arrangement direction of the pixels, the adjacent edges are merged. Specifically, only if the pixel, which is sandwiched by the adjacent edges, is a true intermediate value pixel, the adjacent edges are merged. Accordingly, the problem as described above can be prevented, and a blur is reduced in the enlarged/reduced image. It is also possible to prevent the line, which exists in the subject, from disappearing.

Further, the fact that the reliability that a pixel, which is sandwiched by the adjacent edges extending in different directions, is an intermediate value pixel is lower than the reliability that a pixel, which is sandwiched by the adjacent edges extending in the same direction, is an intermediate value pixel is utilized. In the present invention, only the adjacent edges, which extend in the same direction, are merged. Accordingly, the problem that the pixel, which is not the intermediate value pixel, is removed from the reference pixel for the interpolation pixel, can be solved.

According to the first edge detection method and apparatus of the present invention, the fact that there is substantially no possibility that an edge in the image exists independently within a 2×2 pixel block is utilized. If there is no edge connected to the edge in an image block, which is judged to include the edge, the edge may be regarded as a noise. Therefore, it is rejudged that the edge is not an edge. Accordingly, it is possible to prevent the noise from being detected as an edge. The accuracy in the edge detection can be improved. When an image is enlarged or reduced based on the edge detection result, the noise in the image can be reduced.

According to the second edge detection method and apparatus, a zigzag line, which is formed by consecutively connecting edges in a plurality of adjacent edge-including blocks, may be smoothed. The zigzag line is a line representing an edge in an area including a plurality of adjacent edge-including blocks. Further, the original shape of the detected edge can be reflected. Therefore, when an image is enlarged or reduced based on the edge detection result, the sharpness in the image can be maintained. Further, the deterioration of the image quality caused by the zigzag shape of the edge can be prevented.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 16 is a flow chart illustrating a second interpolation operation B2;

FIG. 17 is a flow chart illustrating a third interpolation operation B3;

FIG. 24 is a diagram (No. 1) illustrating an edge pattern according to the position, at which an edge exists;

FIG. 25 is a diagram (No. 2) illustrating an edge pattern according to the position, at which an edge exists;

FIG. 26 is a diagram (No. 3) illustrating an edge pattern according to the position, at which an edge exists;

FIG. 31 is a flow chart illustrating intermediate value pixel judgment processing C;

FIG. 32 is a flow chart illustrating a second interpolation operation D2;

FIG. 33A is a diagram illustrating an example of a relationship between an edge in a subject and an edge, which is detected in a digital image;

FIG. 33B is a diagram illustrating an example of a relationship between an edge in a subject and an edge, which is detected in a digital image;

FIG. 34A is a diagram illustrating an example of a relationship between a thin line in a subject and an edge, which is detected in a digital image;

FIG. 34B is a diagram illustrating an example of a relationship between a thin line in a subject and an edge, which is detected in a digital image;

FIG. 35 is a diagram for explaining three serially adjacent pixels;

FIG. 54 is a flow chart illustrating a second interpolation operation D2;

FIG. 55 is a block diagram illustrating the configuration of an image enlargement/reduction apparatus according to a fifth embodiment of the present invention;

DESCRIPTION OF THE PREFERRED EMBODIMENTS

Hereinafter, embodiments of the present invention will be described with reference drawings.

Figure 1:
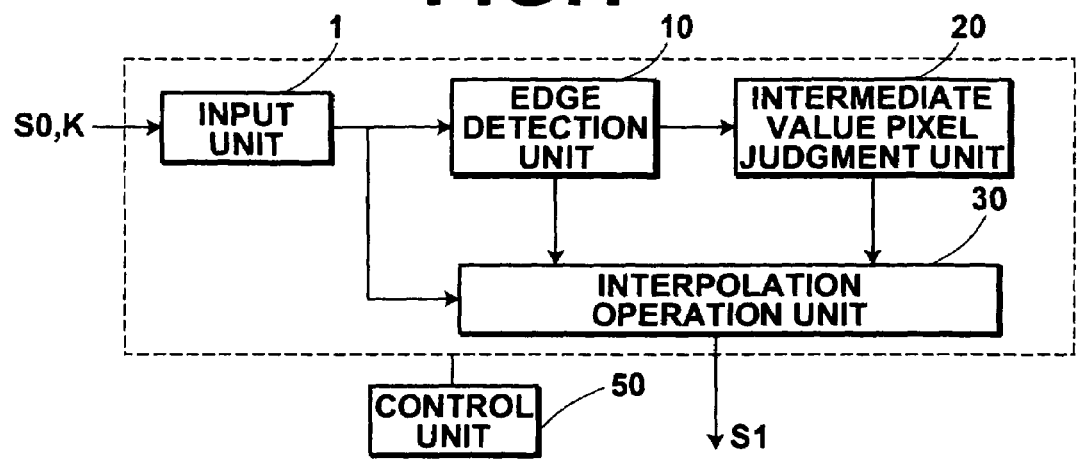
FIG. 1 is a block diagram illustrating the configuration of an image enlargement/reduction apparatus according to a first embodiment of the present invention.

FIG. 1 is a block diagram illustrating the configuration of an image enlargement/reduction apparatus according to a first embodiment of the present invention. As illustrated in FIG. 1, the image enlargement/reduction apparatus according to the present embodiment includes an input unit 1 for receiving an input of image data S0 and an enlargement/reduction ratio K of the image data S0. The image enlargement/reduction apparatus also includes an edge detection unit 10, an intermediate value pixel judgment unit 20, and an interpolation operation unit 30 for calculating the pixel value of an interpolation pixel. The image enlargement/reduction apparatus also includes a control unit 50 for controlling the operations of the input unit 1, the edge detection unit 10, the intermediate value pixel judgment unit 20, and the interpolation operation unit 30.

Figure 2:
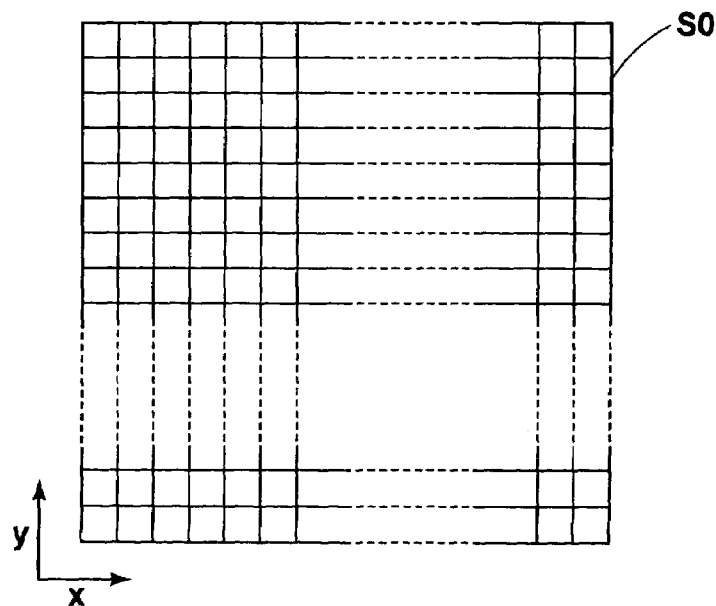
FIG. 2 is a diagram illustrating a pixel arrangement in an image represented by image data.

Here, an image represented by the image data S0 is composed of pixels, which are two-dimensionally arranged as illustrated in FIG. 2. In the following descriptions, it is assumed that the x direction and they direction are set as illustrated in FIG. 2. Further, in the following descriptions, the image data and the image, which is represented by the image data, are not discriminated from each other, and the same reference numeral (S0 in this case) is assigned to both of them.

Figure 3:
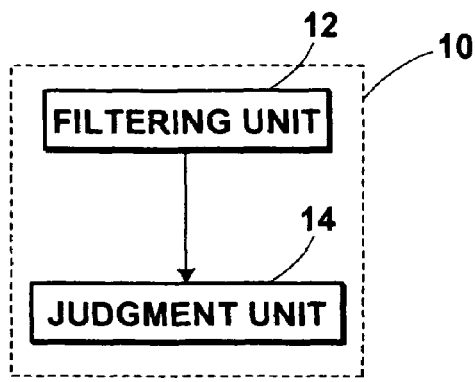
FIG. 3 is a block diagram illustrating the configuration of an edge detection unit 10 in the image enlargement/reduction apparatus, which is illustrated in FIG. 1.

FIG. 3 is a block diagram illustrating the configuration of the edge detection unit 10 in the image enlargement/reduction apparatus of the present embodiment. As illustrated in FIG. 3, the edge detection unit 10 includes a filtering unit 12 and a judgment unit 14 for judging whether there is an edge between two adjacent pixels.

Figure 4:
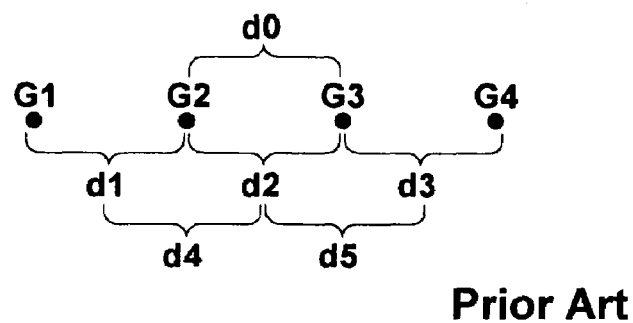
FIG. 4 is a diagram for explaining filtering processing performed by a filtering unit 12.

The filtering unit 12 performs filtering processing as described below. The filtering unit 12 performs filtering processing on four serially adjacent pixels, which are pixels G1-G4, for each row or column in the x direction and the y direction of the image S0 as illustrated in FIG. 4. The four serially adjacent pixels G1-G4 include two adjacent pixels G2 and G3 and two pixels, which are adjacent to the two pixels G2 and G3, respectively. The filtering unit 12 performs filtering processing, by using a difference filter, on three pixel pairs (G1, G2), (G2, G3), and (G3, G4), each including two mutually adjacent pixels. Accordingly, the filtering unit 12 calculates a difference in pixel value between each pixel pair (G1, G2), (G2, G3), and (G3, G4) as primary differences d1, d2, and d3, respectively.

Figure 5:
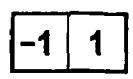
FIG. 5 is a diagram illustrating an example of a difference filter.

FIG. 5 is a diagram illustrating an example of the difference filter. As illustrated in FIG. 5, the difference filter, which is used in the present embodiment, is a two-tap filter with a filter value of (−1, 1). The difference filter is not limited to this filter. A filter with a filter value for obtaining a weighting difference in pixel value between a pixel pair or a filter, which has an even number of taps, which is two taps or more, may be used as the filter.

Then, the filtering unit 12 performs filtering processing on two primary difference pairs (d1, d2) and (d2, d3) by using the difference filter, which is illustrated in FIG. 5. The two primary difference pairs (d1, d2) and (d2, d3) are pairs of adjacent primary differences among three primary differences d1, d2, and d3. The filtering unit 12 calculates a difference between the primary difference pair (d1, d2) and a difference between the primary difference pair (d2, d3) as secondary differences d4 and d5, respectively.

Further, the filtering unit 12 performs filtering processing on the pixel pair (G2, G3), including two pixels located at the middle among the serially adjacent pixels G1-G4, and calculates a difference d0 (=d2) in pixel value between the pixel pair (G2, G3). The primary difference d2 as described above may be used as the difference d0 without calculating the difference d0.

The judgment unit 14 performs first judgment. In the first judgment, the judgment unit 14 judges whether there is an edge between two adjacent pixels G2 and G3 based on the relationship among the positives/negatives of the primary differences d1, d2, and d3 and the secondary differences d4 and d5.

Figure 6:
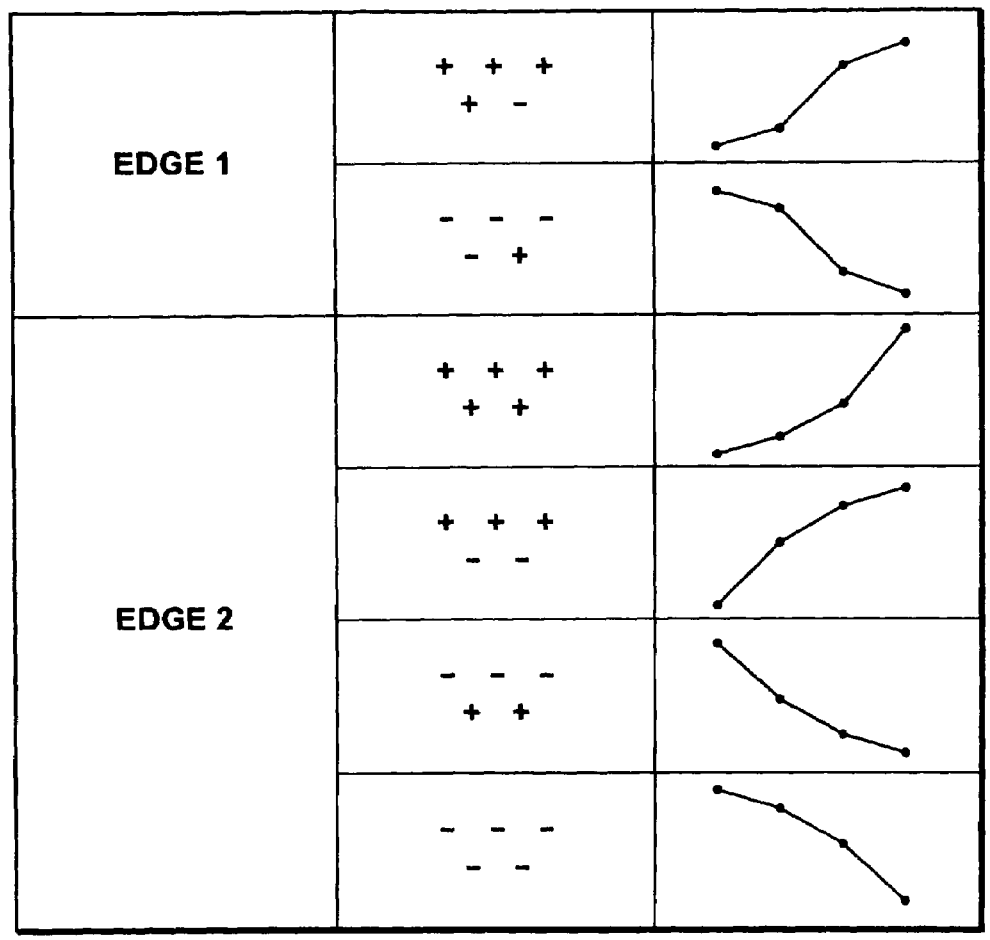
FIG. 6 is a table (No. 1) illustrating relationships between the positives/negatives of primary differences d1, d2, and d3 and secondary differences d4 and d5 and the profile shapes of four serially adjacent pixels.
Figure 7:
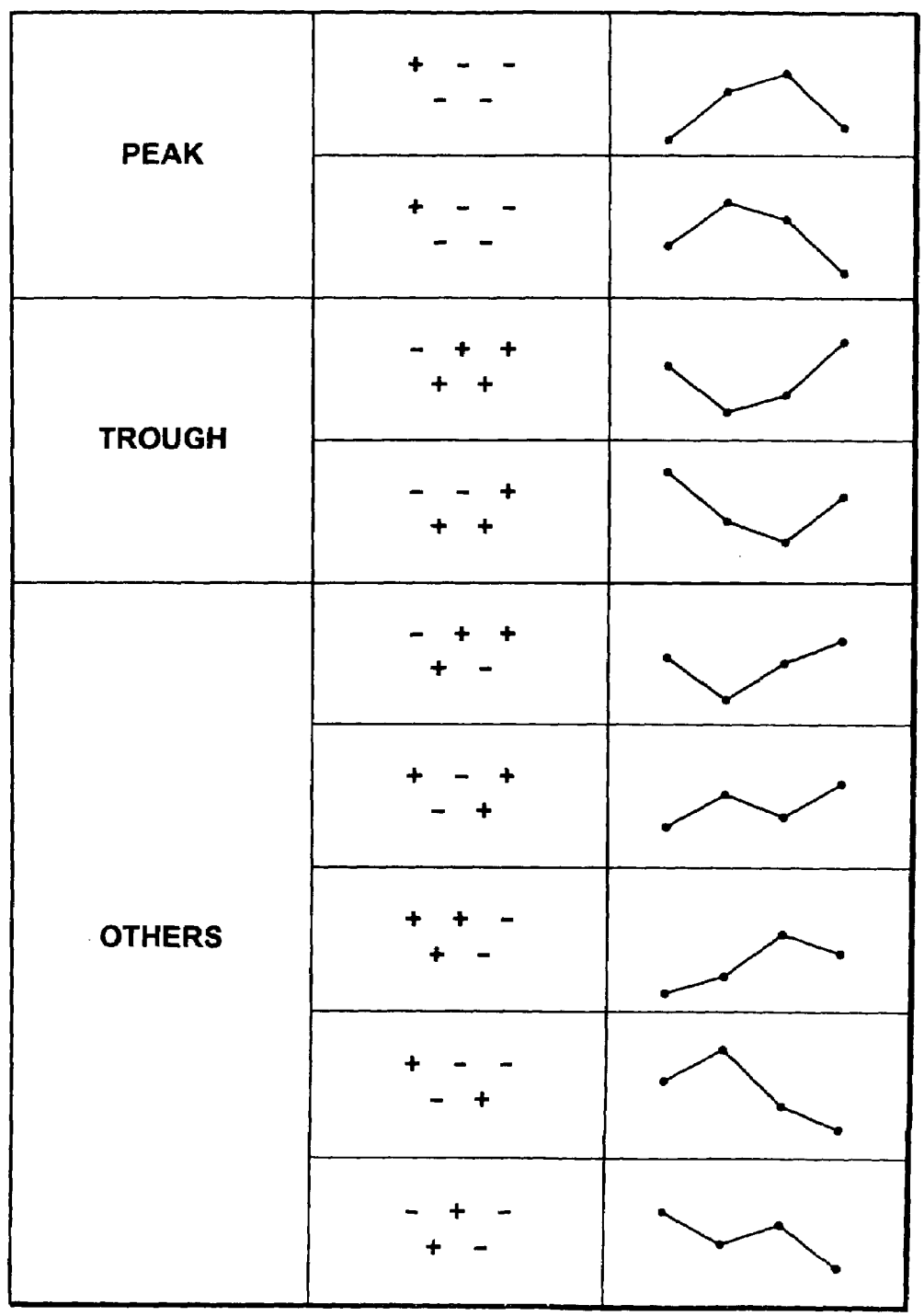
FIG. 7 is a table (No. 2) illustrating relationships between the positives/negatives of primary differences d1, d2, and d3 and secondary differences d4 and d5 and the profile shapes of four serially adjacent pixels.
Figure 8:
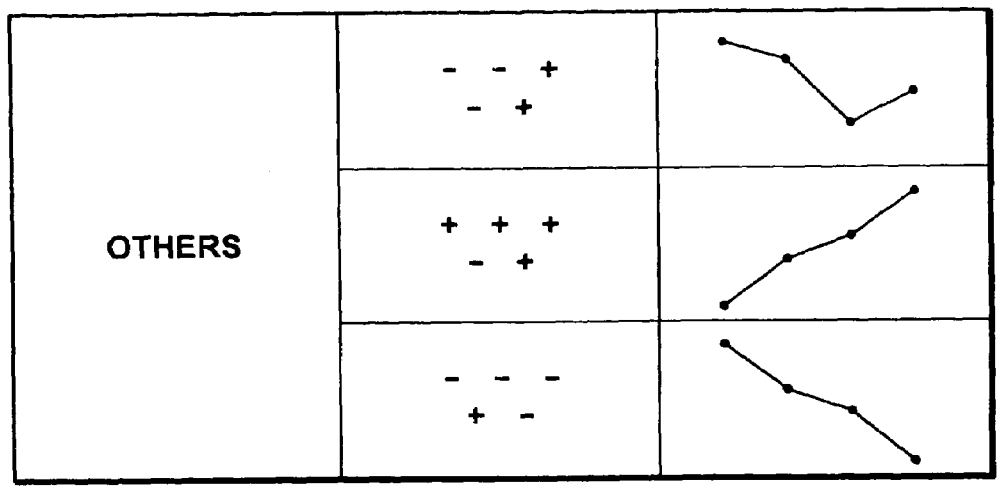
FIG. 8 is a table (No. 3) illustrating relationships between the positives/negatives of primary differences d1, d2, and d3 and secondary differences d4 and d5 and the profile shapes of four serially adjacent pixels.

FIGS. 6-8 are tables illustrating the relationship between the positives/negatives of the primary differences d1, d2, and d3 and the secondary differences d4 and d5 and the profile shape of four serially adjacent pixels. The number of combinations of the positives/negatives of the primary differences d1, d2, and d3 and the secondary differences d4 and d5 among four serially adjacent pixels is 18 in total. The number of combinations of the positives/negatives indicating that there is an edge between two adjacent pixels G2 and G3 is 2, and the combinations are edge 1 and edge 2, which are illustrated in FIG. 6. There are two kinds of edge 1, namely, an edge rising from left to right, which corresponds to the combination (d1, d2, d3, d4, d5)=(+, +, +, +, −), and an edge rising from right to left, which corresponds to the combination (d1, d2, d3, d4, d5)=(−, −, −, −, +). There are four kinds of edge 2, namely, a downwardly convex edge rising from left to right, which corresponds to the combination (d1, d2, d3, d4, d5)=(+, +, +, +, +), an upwardly convex edge rising from left to right, which corresponds to the combination (d1, d2, d3, d4, d5)=(+, +, +, −, −), a downwardly convex edge rising from right to left, which corresponds to the combination (d1, d2, d3, d4, d5)=(−, −, −, +, +), and an upwardly convex edge rising from right to left, which corresponds to the combination (d1, d2, d3, d4, d5)=(−, −, −, −, −).

The judgment unit 14 stores the tables, which are illustrated in FIGS. 6-8. If the relationship among the positive/negative of each of the preliminary differences d1, d2, and d3 and the secondary differences d4 and d5 of the four serially adjacent pixels indicates the relationship of the edge 1 or the edge 2, which is illustrated in FIG. 6, the judgment unit 14 judges that there is an edge between the two adjacent pixels G2 and G3. If the relationship among the positive/negative of each of the differences is the relationship indicating a peak, trough, or the like, which is illustrated in FIGS. 7 and 8, the judgment unit 14 judges that there is no edge between the two adjacent pixels G2 and G3.

Figure 9:
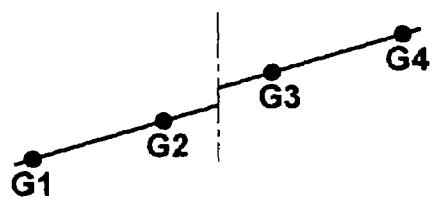
FIG. 9 is a diagram illustrating an example of a profile shape, which is judged to be a profile shape indicating an edge even though a difference in pixel value between two adjacent pixels is very little.

Further, if the judgment unit 14 judges that there is an edge in the first judgment as described above, the judgment unit 14 further performs a second judgment. In the second judgment, the judgment unit 14 judges whether the absolute value of the difference d0 in pixel value between the pixels G2 and G3 is equal to or larger than a predetermined threshold value Th1. If the second judgment is YES, the judgment unit 14 judges that there is a true edge between the pixels G2 and G3. Even if it is judged that there is an edge in the first judgment, when the difference in pixel value between the pixels G2 and G3 is very little as illustrated in FIG. 9, the difference may be regarded as a noise. The second judgment is made to prevent the interpolation operation unit 30 from performing an interpolation operation, which is appropriate for the edge part, as described later when the difference in pixel value is regarded as the noise. When the difference can be regarded as a noise, if the interpolation operation, which is appropriate for the edge part, is performed, the noise is emphasized on the contrary. The judgment unit 14 judges the difference in pixel value between each pair of two adjacent pixels, and the edge detection unit 10 outputs the judgment result to the intermediate value pixel judgment unit 20 and the interpolation operation unit 30.

The intermediate value pixel judgment unit 20 detects adjacent edges, namely a pair of edges, between which only a single pixel is located, among edges detected by the edge detection unit 10. The intermediate value pixel judgment unit 20 also judges that the single pixel between the detected adjacent edges is an intermediate value pixel. The intermediate value pixel judgment unit 20 outputs the judgment result to the interpolation operation unit 30.

Figure 10:
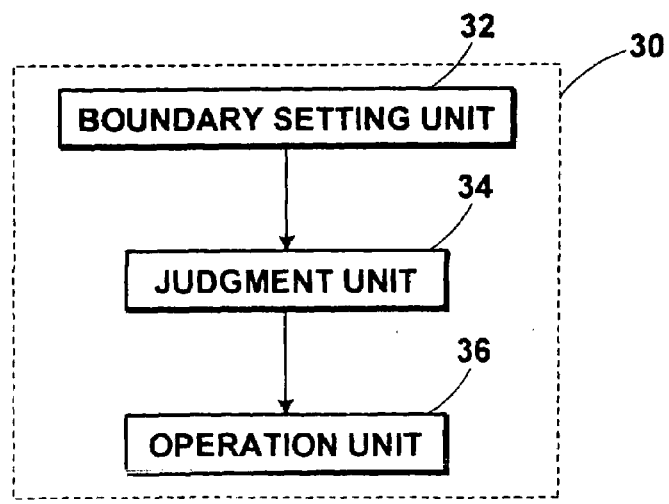
FIG. 10 is a block diagram illustrating the configuration of an interpolation operation unit 30 in the image enlargement/reduction apparatus, which is illustrated in FIG. 1.

FIG. 10 is a block diagram illustrating the configuration of the interpolation operation unit 30. As illustrated in FIG. 10, the interpolation operation unit 30 includes a boundary setting unit 32, a judgment unit 34 and an operation unit 36. The interpolation operation unit 30 calculates the pixel value of an interpolation pixel P, which is located between pixels in the image S0, based on the judgment result by the edge detection unit 10 and the intermediate value pixel judgment unit 20. The interpolation operation unit 30 will be described in details below.

If it is judged that the difference in pixel value between two adjacent pixels, between which the interpolation pixel P is located, does not indicate an edge, the interpolation operation unit 30 calculates the pixel value of the interpolation pixel P using the bicubic method.

Here, the bicubic method is a method of three-dimensional interpolation. In the bicubic method, the pixel value of the interpolation pixel P is obtained by using 16 pixels in the vicinity of the interpolation pixel P. The bicubic method will be described below.

Figure 11:
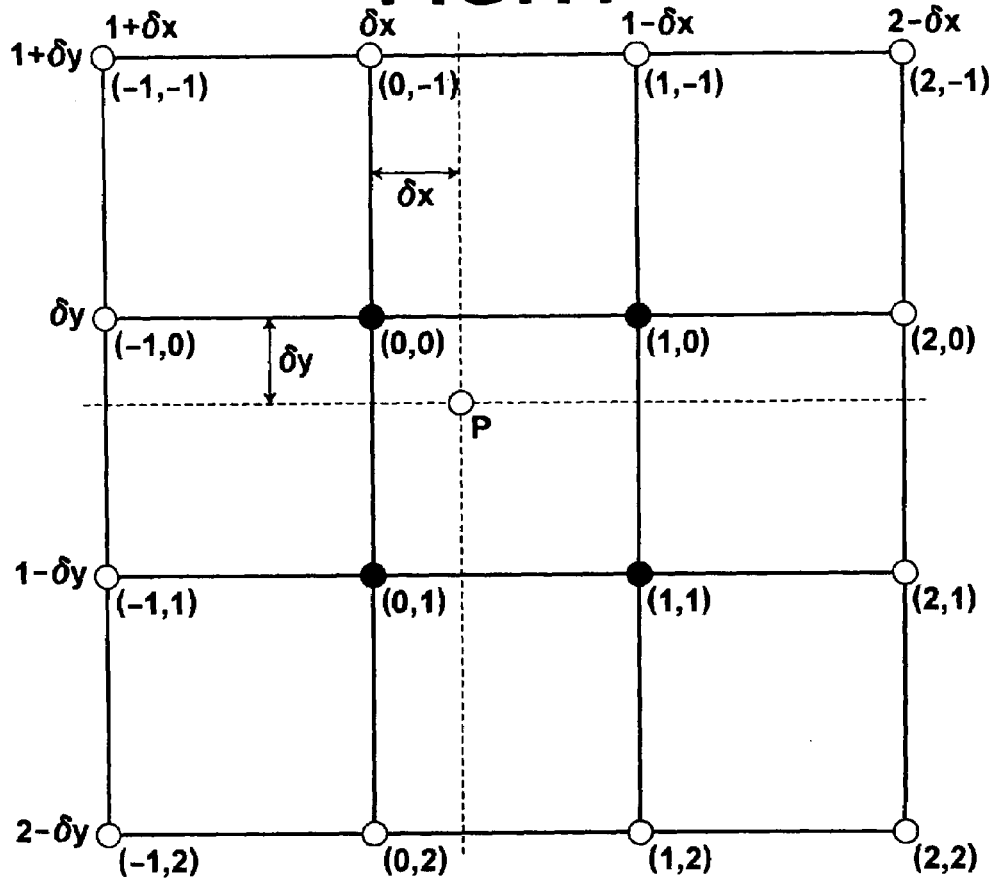
FIG. 11 is a diagram for explaining a bicubic method.

FIG. 11 is a diagram for explaining the bicubic method. When the interpolation pixel P is located at point P as illustrated in FIG. 11, pixels indicated with black circles are referred to as "primary neighborhood", and pixels indicated with white circles are referred to as "secondary neighborhood". For each of the primary neighborhood and the secondary neighborhood, weights Wx and Wy with respect to distances dx and dy (simply indicated as d in the equations (1)) are obtained separately in the x direction and the y direction, respectively, as illustrated in the following equations (1). Then, a weight given to the pixel is finally obtained as W=Wx×Wy.

$$W = \begin{cases} (d-1)(d^2-d-1) & \text{primary neighborhood} \\ -(d-1)(d-2)^2 & \text{secondary neighborhood} \end{cases} \quad (1)$$

For example, when the weights Wx, Wy, and W are calculated for the pixel (−1, −1) (second neighborhood), which is illustrated in FIG. 11, the following result is obtained:

$$Wx = \delta x (\delta x - 1)^2 \quad (2)$$

$$Wy = \delta y (\delta y - 1)^2 \quad (3)$$

$$W = \delta x (\delta x - 1)^2 \delta y (\delta y - 1)^2 \quad (4)$$

If W(i, j) is the weight for the pixel (i, j), and f(i, j) is the pixel value of the pixel (i, j), the pixel value f' (P) of the interpolation pixel P may be calculated by using the following equations (5):

$$f'(P) = \sum_{i=-1}^{2} \sum_{j=-1}^{2} W(i, j) f(i, j) \quad (5)$$

In the present embodiment, it is assumed that the bicubic method is applied only to a one-dimensional direction of either the x direction or the y direction to calculate the pixel value of the interpolation pixel P.

Figure 12A:
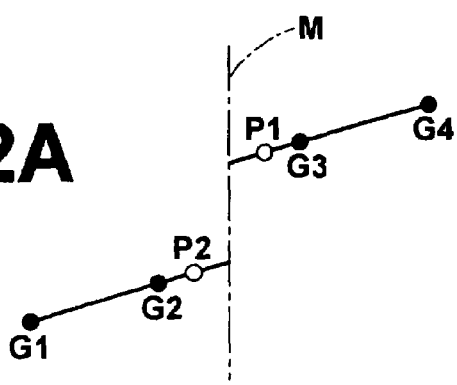
FIG. 12A is a diagram for explaining calculation of the pixel value of an interpolation pixel in a part, which is judged to be an edge (second interpolation operation B2)
Figure 12B:
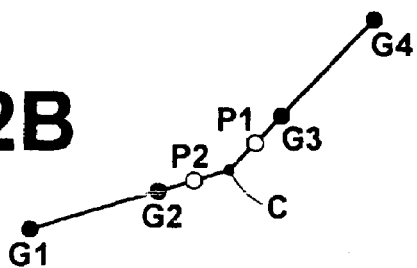
FIG. 12B is a diagram for explaining calculation of the pixel value of the interpolation pixel in the part, which is judged to be the edge (second interpolation operation B2)

Meanwhile, the interpolation operation unit 30 obtains the pixel value of the interpolation pixel P in the part, which is judged to be an edge, as described below. First, the case, in which the intermediate value pixel judgment unit 20 has judged that any one of the two adjacent pixels, which are located on both sides of the edge, is not an intermediate value pixel, will be described. FIGS. 12A and 12B are diagrams illustrating the profiles of the pixel values in the part, which is judged to be the edge. In FIGS. 12A and 12B, the arrangement direction of the pixels is the horizontal direction. The magnitude of the pixel values is represented in the vertical direction. If it is judged that there is an edge between two adjacent pixels G2 and G3, the profile of pixel values of four serially adjacent pixels G1-G4 is as illustrated in FIG. 12A and FIG. 12B. The four serially adjacent pixels G1-G4 include the two pixels G2 and G3 and two pixels G1 and G4, which are adjacent to the pixels G2 and G3, respectively.

If the profile has a step-edge shape as illustrated in FIG. 12A, the boundary setting unit 32 sets a median line M (dot-dashed line), which bisects the distance between the pixels G2 and G3 in the arrangement direction of the pixels, as a boundary line. Then, the judgment unit 34 judges whether the interpolation pixel P is located on the right side of the boundary line M or the left side of the boundary line M. If the interpolation pixel P (referred to as "P1") is located on the right side of the boundary line M, the operation unit 36 calculates a value on the extended line of a straight line, which connects the pixels G3 and G4, as the pixel value of the interpolation pixel P1. If the interpolation pixel (referred to as "P2") is located on the left side of the boundary line M, the operation unit 36 calculates a value on the extended line of a straight line, which connects the pixels G1 and G2, as the pixel value of the interpolation pixel P2.

If the profile has an edge shape as illustrated in FIG. 12B, the boundary setting unit 32 sets the intersection C of the extended line of the straight line, which connects the pixels G1 and G2, and the extended line of the straight line, which connects the pixels G3 and G4, as a boundary point. Then, the judgment unit 34 judges whether the interpolation pixel P is located on the right side of the boundary point C or the left side of the boundary point C. If the interpolation pixel P1 is located on the right side of the boundary point C, the operation unit 36 calculates a value on the extended line of the straight line, which connects the pixels G3 and G4, as the pixel value of the interpolation pixel P1. If the interpolation pixel P2 is located on the left side of the boundary point C, the operation unit 36 calculates a value on the extended line of the straight line, which connects the pixels G1 and G2, as the pixel value of the interpolation pixel P2.

Here, only the pixel values of two pixels are used to calculate the pixel value of the interpolation pixel P. However, three or more pixel values may be used. When three or more pixel values are used, it is difficult to connect the pixels with a straight line in some cases. In that case, the pixels may be connected with a curve, which is defined by an arbitrary function, such as a spline curve. A value on the extended line of the curve may be used as the pixel value of the interpolation pixel P.

Next, regarding the part, which is judged to be the edge, calculation of the pixel value of the interpolation pixel will be described. When the intermediate value pixel judgment unit 20 has judged that one of the two adjacent pixels, which are located on both sides of the edge, is an intermediate value pixel, the interpolation operation unit 30 calculates the pixel value of the interpolation pixel as described below.

Figure 13A:
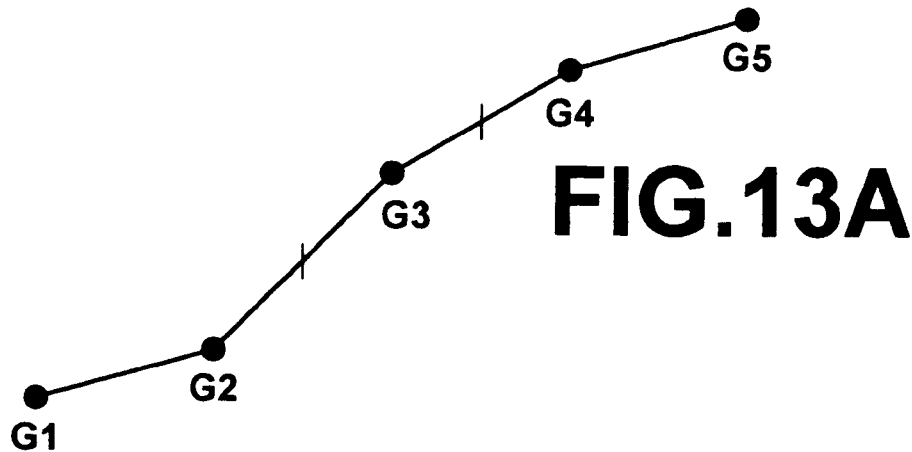
FIG. 13A is a diagram for explaining calculation of the pixel value of an interpolation pixel in the part, which is judged to be the edge (third interpolation operation B3)

First, the profile of the pixel values of pixels in this case will be described. The pixels include three pixels, which sandwich the adjacent edges, and two pixels, each of which is adjacent to each of the two pixels, which are located outside the adjacent edges, among the three pixels. FIG. 13A is a diagram illustrating an example of the profile as described above in the case that a pair of adjacent edges is an edge, which belongs to the type of (d1, d2, de, d4, d5)=(+, +, +, +, −) in the edge 1, which is illustrated in FIG. 6, and an edge, which belongs to the type of (d1, d2, de, d4, d5)=(+, +, +, −, −) in the edge 2, which is illustrated in FIG. 6. In the example, which is illustrated in FIG. 13A, the edge detection unit 10 has detected an edge between the adjacent pixels G2 and G3 and an edge between the adjacent pixels G3 and G4. The intermediate value pixel judgment unit 20 has judged the pixel G3 to be the intermediate value pixel.

Figure 13B:
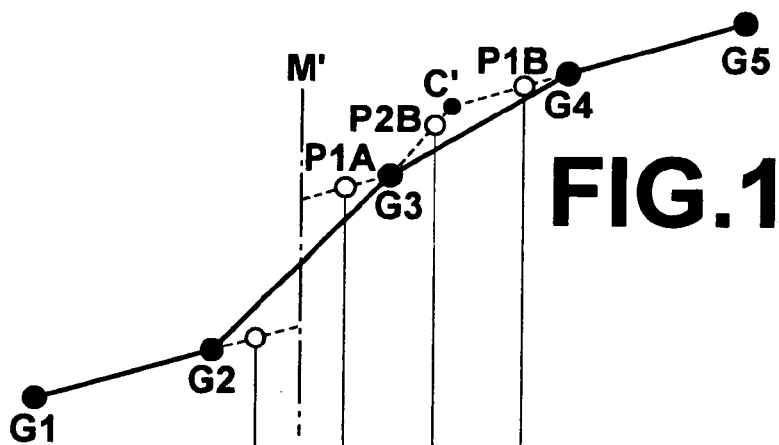
FIG. 13B is a diagram for explaining calculation of the pixel value of the interpolation pixel in the part, which is judged to be the edge (third interpolation operation B3)

Here, first, the calculation result of the pixel value of the interpolation pixel in the case that when the interpolation pixel is located between the pixels G2 and G3, although the pixel G3 is judged to be the intermediate value pixel, the pixel value of the interpolation pixel is obtained in the same manner as the case in which the pixel G3 is not the intermediate pixel will be described. The pixel value of the interpolation pixel is calculated as described below. In this case, as illustrated in FIG. 13B, a median line M' (dot-dashed line), which bisects the distance between the pixels G2 and G3 in the arrangement direction of the pixels G1, G2, G3, and G4, is set as a boundary line. If an interpolation pixel (referred to as "P1A") is located on the right side of the boundary line M', a value on the extended line of a straight line, which connects the pixels G3 and G4, is calculated as the pixel value of the interpolation pixel P1A. If an interpolation pixel (referred to as "P2A") is located on the left side of the boundary line M', a value on the extended line of a straight line, which connects the pixels G1 and G2, is calculated as the pixel value of the interpolation pixel P2A.

Similarly, when the interpolation pixel is located between the pixels G3 and G4, although the pixel G3 is judged to be an intermediate value pixel, if the pixel value of the interpolation pixel is calculated in the same manner as the case in which the pixel G3 is not the intermediate value pixel, the pixel value of the interpolation pixel is obtained as described below. An intersection C' of the extended line of a straight line, which connects the pixels G2 and G3, and the extended line of a straight line, which connects the pixels G4 and G5, is set as a boundary point. Then, if an interpolation pixel (referred to as "P1B") is located on the right side of the boundary point C', a value on the extended line of the straight line, which connects the pixels G4 and G5, is calculated as the pixel value of the interpolation pixel P1B. If an interpolation pixel (referred to as "P2B") is located on the left side of the boundary point C', a value on the extended line of the straight line, which connects the pixels G2 and G3, is calculated as the pixel value of the interpolation pixel P2B.

Since the intermediate value pixel G3 is a blurred pixel already, if the intermediate value pixel G3 is used as a reference pixel to obtain the pixel values of the interpolation pixels (P1A and P2B), the interpolation pixels P1A and P1B also become blurred pixels by the influence of the intermediate value pixel G3. Consequently, there is a problem that a blur remains in an enlarged/reduced image, and the blur becomes even larger in the worst case.

Figure 13C:
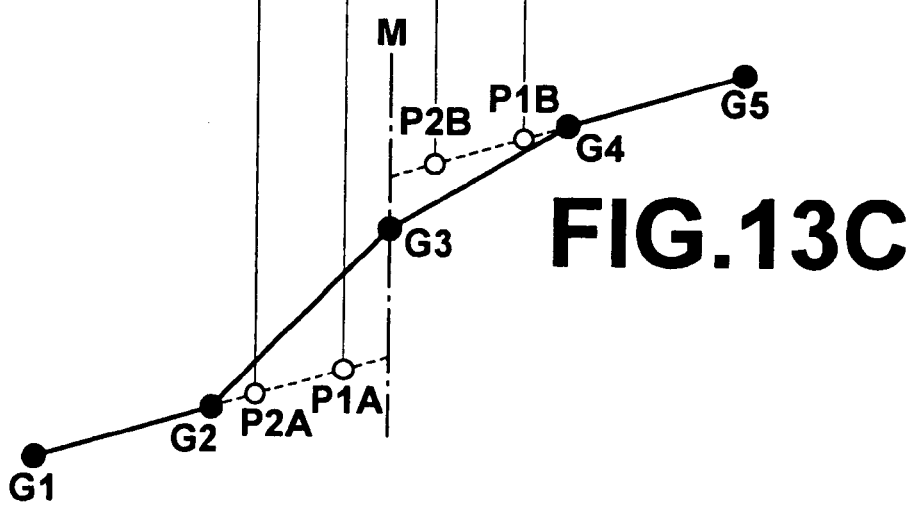
FIG. 13C is a diagram for explaining calculation of the pixel value of the interpolation pixel about the part, which is judged to be the edge (third interpolation operation B3)

Therefore, in the present embodiment, if an intermediate value pixel is detected, the interpolation operation unit 30 obtains the pixel value of the interpolation pixel without using the pixel value of the intermediate value pixel. The interpolation operation unit 30 calculates the pixel value of the interpolation pixel as described below so that the quality of the enlarged/reduced image is improved. Specifically, first, the boundary setting unit 32 sets a boundary. As illustrated in FIG. 13A, if the pixel G3 is judged to be the intermediate value pixel, the boundary setting unit 32 does not set a boundary or a boundary point between the pixels G2 and G3 or between pixels G3 and G4. The boundary setting unit 32 sets a vertical line (dot-dashed line in FIG. 13C) M, which passes through the pixel G3, as a boundary line as illustrated in FIG. 13C. Then, the judgment unit 34 judges whether the interpolation pixel is located on the right side of the boundary line M or the left side of the boundary line M. If the interpolation pixels (P1B and P2B) are located on the right side of the boundary line M, the operation unit 36 calculates values on the extended line of a straight line, which connects the pixels G4 and G5, as the pixel values of the interpolation pixels. If the interpolation pixels (P1A and P2A) are located on the left side of the boundary line M, the operation unit 36 calculates values on the extended line of a straight line, which connects the pixels G1 and G2, as the pixel values of the interpolation pixels.

Here, only the pixel values of two pixels are used to calculate the pixel values of the interpolation pixels. However, three or more pixel values may be used. If three or more pixel values are used, it is difficult to connect the pixels with a straight line in some cases. In that case, the pixels may be connected with a curve, which is defined by an arbitrary function, such as a spline curve. Values on the extended line of the curve should be used as the pixel values of the interpolation pixels.

The pixel values of the interpolation pixels, which are calculated as described above, are not influenced by the intermediate value pixel. When the pixel values of the interpolation pixels in FIGS. 13B and 13C are compared, the pixel value of the interpolation pixel P2B in FIG. 13C is less than the pixel value of the interpolation pixel P1A in FIG. 13B. The pixel value of the interpolation pixel P2B in FIG. 13C is larger than the pixel value of the interpolation pixel P2B in FIG. 13B. Therefore, since there is an edge, which originally exists in a subject, between the pixels G2 and G4, the edge between the pixels G2 and G4 is not blurred in an image including the interpolation pixels. Further, the quality of the enlarged/reduced image is good.

In the following descriptions, an operation (operation by the bicubic method) for obtaining the pixel value of an interpolation pixel, which is located in the part, in which there is no edge, is referred to as "first interpolation operation". An operation for obtaining the pixel value of an interpolation pixel, which is located in the part, in which there is an edge, however any one of two adjacent pixels on both sides of the edge is not an intermediate value pixel, is referred to as "second interpolation operation". An operation for obtaining the pixel value of an interpolation pixel, which is located in the part, in which there is an edge, and only one of two adjacent pixels on both sides of the edge is an intermediate value pixel, is referred to as "third interpolation operation".

Figure 14:
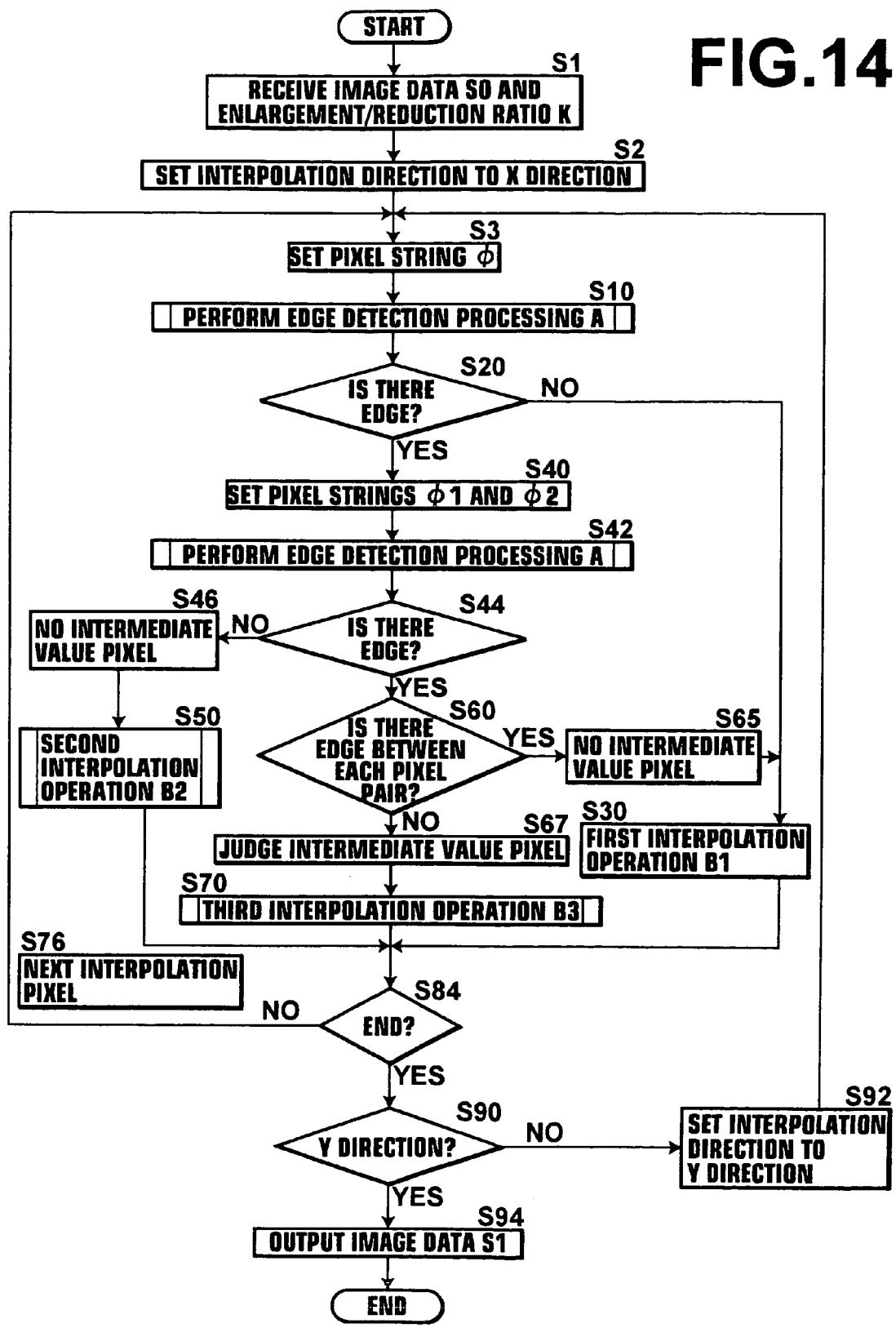
FIG. 14 is a flow chart illustrating processing in the present embodiment.
Figure 18:
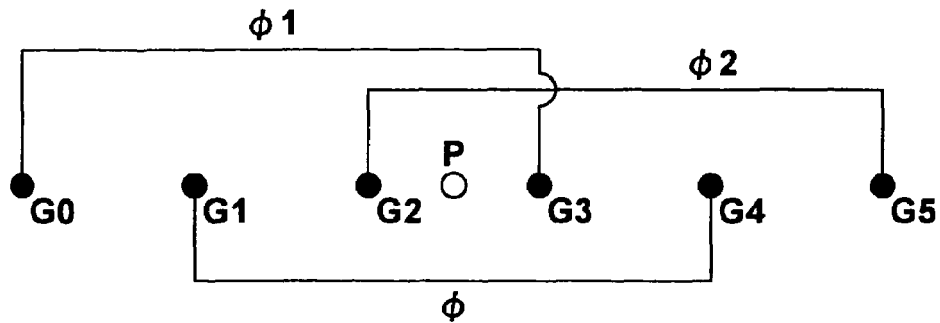
FIG. 18 is a diagram illustrating a pixel string, which is set for judging an intermediate value pixel.

Next, processing performed in the present embodiment will be described. FIG. 14 is a flow chart illustrating processing performed in the present embodiment. In the present embodiment, it is assumed that the interpolation pixel P is located between pixels in the image S0. First, the input unit 1 receives an input of image data S0, on which enlargement/reduction processing will be performed, and an enlargement/reduction ratio K of the image data S0 (step S1). Then, the input unit 1 sets the processing direction for interpolating a pixel to the x direction (step S2). Next, the filtering unit 12 in the edge detection unit 10 sets, based on the enlargement/reduction ratio K, a pixel string Φ with respect to a first interpolation pixel P (for example, a pixel located in the upper left corner of the enlarged/reduced image S1). The pixel string Φ includes four serially adjacent pixels G1-G4 with the interpolation pixel P located at the middle among the four pixels as illustrated in FIG. 18 (step S3). The filtering unit 12 detects whether there is an edge between the pixels G2 and G3 by using the pixel value of each of the pixels in the set pixel string Φ (step S10). Edge detection processing A, which is performed in step S10, will be described later in details. If it is judged that there is no edge between the pixels G2 and G3 (step S20: NO), the interpolation operation unit 30 performs the first interpolation operation B1, namely the interpolation operation by the bicubic method as described above, and obtains the pixel value of the interpolation pixel P (step S30).

If it is judged that there is an edge between the pixels G2 and G3 in step S10 (step S20: YES), the filtering unit 12 in the edge detection unit 10 sets a pixel string Φ1 (G0-G3) and a pixel string Φ2 (G2-G5) by shifting the pixel string Φ by one pixel to the left and to the right, respectively, as illustrated in FIG. 18 (step S40). The edge detection unit 10 performs the edge detection processing A on the two pixel strings Φ1 and Φ2, which have been set by the filtering unit 12, to detect whether there is an edge between the pixels G1 and G2 or an edge between the pixels G3 and G4 (step S42). Then, the result that there is an edge between the pixels G2 and G3 and the detection result as to whether there is an edge between the pixels G1 and G2 and whether there is an edge between the pixels G3 and G4 are output to the interpolation operation unit 30 and the intermediate value pixel judgment unit 20. If an edge is not detected between the pixels G1 and G2 and an edge is not detected between the pixels G3 and G4 (step S44: NO), the intermediate value pixel judgment unit 20 judges that neither the pixel G2 nor the pixel G3 is the intermediate value pixel (step S46). If an edge is detected between only one of the pair of the pixels G1 and G2 and the pair of the pixels G3 and G4 (step S44:YES, step S60: NO), the intermediate value pixel judgment unit 20 judges that a pixel (G2 or G3 in the example, which is illustrated in FIG. 18), which is sandwiched by the edge between the pixels G2 and G3 and the edge detected between the pixels G1 and G2 or the pixels G3 and G4, is an intermediate value pixel (step S67). If an edge is detected between the pixels G1 and G2 and an edge is also detected between the pixels G3 and G4 (step S44: YES, step S60: YES), the intermediate value pixel judgment unit 20 judges that neither the pixel G2 nor the pixel G3 is the intermediate value pixel (step S65).

The judgment result by the intermediate value pixel judgment unit 20 in steps S46, S67, and S65 is output to the interpolation operation unit 30. The interpolation operation unit 30 performs an interpolation operation based on the detection result by the edge detection unit 10 and the judgment result by the intermediate value pixel judgment unit 20, and calculates the pixel value of the pixel P. Specifically, if there is an edge between the pixels G2 and G3, and neither the pixel G2 nor the pixel G3 is the intermediate value pixel (step S20: YES, step S44: NO, step S46), the interpolation operation unit 30 performs the second interpolation operation B2 (the details will be described later), and calculates the pixel value of the interpolation pixel P (step S50). Further, if there is an edge between the pixels G2 and G3, and only one of the pixels G2 and G3 is the intermediate value pixel (step S20: YES, step S44: YES, step 60: NO, step S67), the interpolation operation unit 30 performs the third interpolation operation B3 (the details will be described later), and calculates the pixel value of the interpolation pixel P (step S70). Further, if there is an edge between the pixels G2 and G3, and both of the pixels G2 and G3 are intermediate value pixels (step S20: YES, step S44: YES, step S60: YES, step S65), the interpolation operation unit 30 performs the first interpolation operation B1, namely the interpolation operation by the bicubic method, and calculates the pixel value of the interpolation pixel P (step S30). Here, if there is an edge between the pixels G2 and G3 and both of the pixels G2 and G3 are intermediate value pixels, the pixel values of the interpolation pixels are calculated by performing the first interpolation operation B1 because of the following reasons. If there is an edge between the pixels G2 and G3 and both of the pixels G2 and G3 are intermediate value pixels, in other words, if three adjacent edges are located successively, the possibility that each of the edges is not generated from an edge in a subject, but the edges are generated by the gradation of the image is high. Therefore, it is possible to judge that there is no edge between the pixels G2 and G3.

Figure 15:
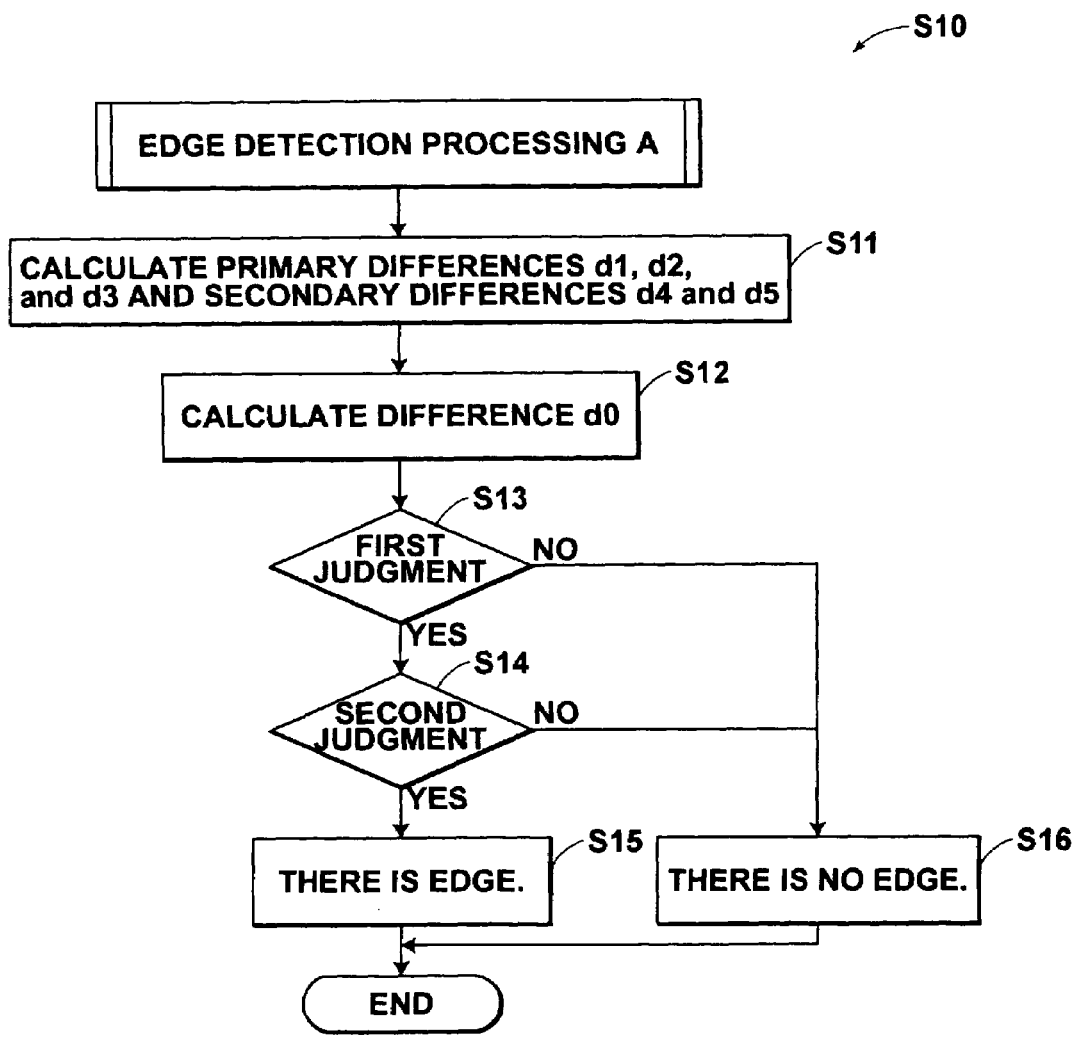
FIG. 15 is a flow chart illustrating edge detection processing A.

FIG. 15 is a flow chart illustrating the edge detection processing A by the edge detection unit 10. As illustrated in FIG. 15, the filtering unit 12 in the edge detection unit 10 performs filtering processing on the set pixel string (the pixel string Φ, or the pixel string Φ1 or pixel string Φ2, which is illustrated in FIG. 18), and calculates the primary differences d1, d2, and d3 and the secondary differences d4 and d5 of the four pixels included in the pixel string (step S11). The filtering unit 12 also performs filtering processing on the two pixels, which are located at the middle of the pixel string, and calculates the difference d0 (=d2) (step S12). Then, the judgment unit 14 judges whether there is an edge between the pixels, which are located at the middle of the pixel string, based on the combination of the positives/negatives of the primary differences d1, d2, and d3 and the secondary differences d4 and d5 (first judgment, step S13). If the first judgment in step S13 is YES (step S13: YES), the judgment 14 judges whether the absolute value of the difference d0 is equal to or larger than a predetermined threshold value Th1 (step S14, second judgment). If the second judgment in step S14 is YES (step S14: YES), the judgment unit 14 judges that there is an edge between the two pixels at the middle of the pixel string (step S15). Meanwhile, if the first judgment in step S13 is NO (step S13, NO), and the second judgment in step S14 is NO (S14: NO), the judgment unit 14 judges that there is no edge between the two pixels at the middle of the pixel string (step S16).

FIG. 16 is a flow chart illustrating the processing of the second interpolation operation B2. As illustrated in FIG. 16, the boundary setting unit 32 in the interpolation operation unit 30 sets a boundary line or a boundary point between two adjacent pixels, between which the interpolation pixel P is located, as a boundary (step S52). The judgment unit 34 judges on which side of the boundary the interpolation pixel P is located (step S54). The operation unit 36 performs an interpolation operation by using only pixels, which are located on the same side of the boundary as the interpolation pixels P, and obtains the pixel value of the interpolation pixel P (step S56).

FIG. 17 is a flow chart illustrating the processing of the third interpolation operation B3. As illustrated in FIG. 17, the boundary setting unit 32 in the interpolation operation unit 30 sets a vertical line, which passes through an intermediate value pixel in two adjacent pixels, between which the interpolation P is located, as a boundary (step S72). The judgment unit 34 judges on which side of the boundary the interpolation pixel P is located (step S74). The operation unit 36 performs an interpolation operation by using only pixels, which are located on the same side of the boundary as the interpolation pixel P, and obtains the pixel value of the interpolation pixel P (step S76).

Processing goes back to the steps illustrated in FIG. 14. The control unit 50 judges whether the pixel values of all the interpolation pixels P have been calculated in the set interpolation direction (step S84). If step S84 is NO, the control unit 50 sets an interpolation pixel P, of which pixel value should be calculated, as the next interpolation pixel P (step S86), and processing goes back to the process from step S3.

Meanwhile, if step S84 is YES, the control unit 50 judges whether the interpolation direction, in which the pixel values of all the interpolation pixels have been calculated, is the x direction or y direction (step S90). If the direction, in which the pixel values of all the interpolation pixels have been calculated, is the x direction (step S90: NO), the control unit 50 sets the interpolation direction to the y direction (step S92), and processing goes back to the process from step S3. If the direction, in which the pixel values of all the interpolation pixels have been calculated, is the y direction (step S90: YES), the control unit 50 outputs enlarged/reduced image data S1 including the interpolation pixel P (step S94), and processing ends.

Figure 19:
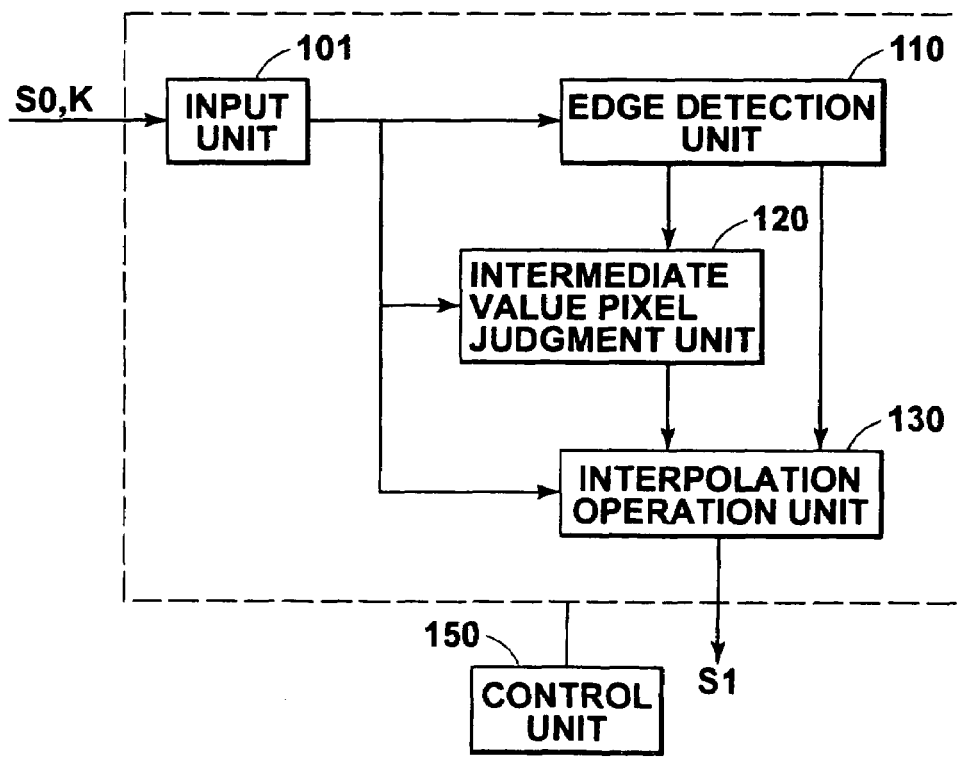
FIG. 19 is a block diagram illustrating the configuration of an image enlargement/reduction apparatus according to a second embodiment of the present invention.

FIG. 19 is a block diagram illustrating the configuration of an image enlargement/reduction apparatus according to a second embodiment of the present invention. As illustrated in FIG. 19, the image enlargement/reduction apparatus according to the present embodiment includes an input unit 101 for receiving an input of image data S0 and an enlargement/reduction ratio K of the image data. The image enlargement/reduction apparatus also includes an edge detection unit 110 for detecting whether there is an edge between pixels in an image, an intermediate value pixel judgment unit 120, and an interpolation operation unit 130 for calculating the pixel value of an interpolation pixel. The image enlargement/reduction apparatus also includes a control unit 150 for controlling the operations of the input unit 101, the edge detection unit 110, the intermediate value pixel judgment unit 120, and the interpolation operation unit 130. The configuration of each of the units will be described below in details.

Figure 20:
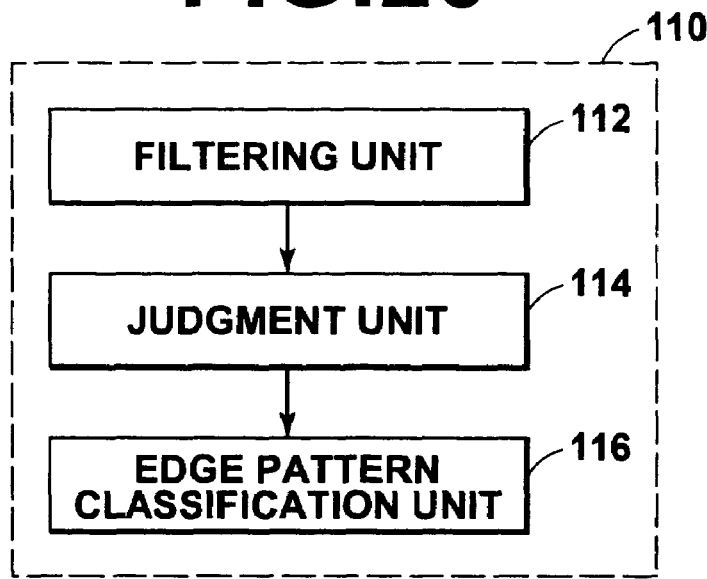
FIG. 20 is a block diagram illustrating the configuration of an edge detection unit 110 in the image enlargement/reduction apparatus, which is illustrated in FIG. 19.
Figure 22:
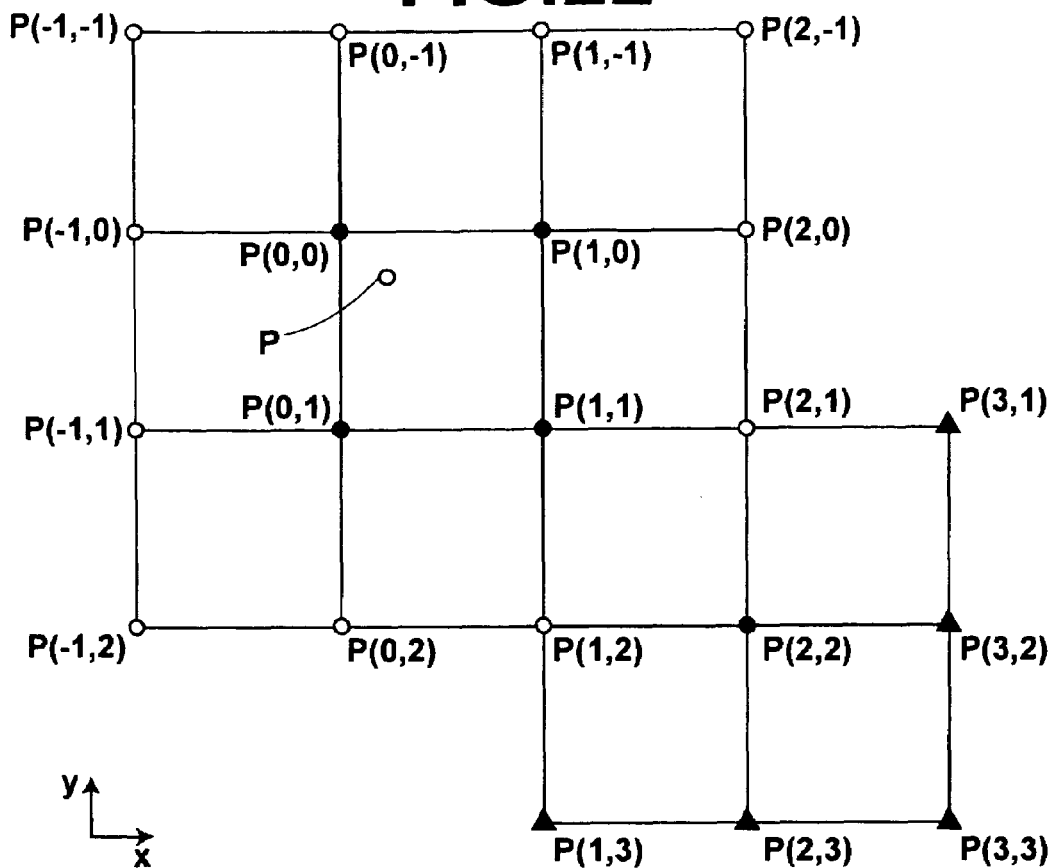
FIG. 22 is a diagram for explaining processing performed by a filtering unit 112.

As illustrated in FIG. 20, the edge detection unit 110 includes a filtering unit 112, a judgment unit 114, and an edge pattern classification unit 116. First, the filtering unit 112 performs filtering processing, by using the difference filter illustrated in FIG. 5, on each pixel pair including two mutually adjacent pixels in a 4×4 pixel block of 16 pixels (16 pixels P (i, j), (i, j=1 to 2), which are illustrated in FIG. 22, hereinafter, referred to as "16 pixels of an interpolation pixel P"), which are located in the vicinity of the interpolation pixel P in the image S0. Then, the filtering unit 112 calculates the difference in pixel value between each pixel pair (hereinafter, the difference between the pixel pair of adjacent pixels is referred to as "d"). Here, the two mutually adjacent pixels are not limited to two pixels such as the pair of P(−1, 0) and P(0, 0) or the pair of P(−1, −1) and P(−1, 0), which are adjacent to each other in the x direction or the y direction of the arrangement direction of the pixels. The two mutually adjacent pixels also include two pixels such as the pair of P(−1, −1) and P(0, 0) or the pair of P(0, 1) and P(1, 0), which are adjacent to each other in the diagonal directions of the 2×2 pixel block.

The judgment unit 114 judges whether the absolute value of the difference d between each pixel pair is equal to or larger than a predetermined threshold value Th. If the judgment is YES, the judgment unit 114 judges that there is an edge between the pixel pair corresponding to the difference, and outputs the judgment result to the edge pattern classification unit 116.

Further, if one of two pixels in the pixel pair, between which an edge is judged to exist, is a pixel, which is located at the periphery of a 4×4 block of 16 pixels surrounding the interpolation pixel P, which are illustrated in FIG. 22 (12 pixels in FIG. 22, which are pixels P(−1, −1), P(0, −1), P(1, −1), P(2, −1), P(2, 0), P(2, 1), P(2, 2), P(1, 2), P(0, 2), P(−1, 2), P(−1, 1), and P(−1, 0), hereinafter, referred to as "peripheral pixels".), the filtering unit 112 calculates the difference in pixel value between two mutually adjacent pixels in a 2×2 pixel group, to which each pixel, which is not included in the 16 pixels of the interpolation pixel P but adjacent to the peripheral pixel, belongs to. The judgment unit 14 judges whether there is an edge between the pixel pair, between which difference in pixel value has been calculated.

For example, as illustrated in FIG. 22, if it is judged that there is an edge between the pixel P(2, 2) and the pixel P(1, 1), since the pixel P(2, 2) is the peripheral pixel, the pixels, which are not included in the 16 pixels of the interpolation pixel P but are adjacent to the pixel P(2, 2), are P(3, 1), P(3, 2), P(3, 3), P(2, 3), and P(1, 3) (▲ in FIG. 22). The difference in pixel value between the two pixels in each pixel pair is calculated for each of the pixel pairs, which are P(2, 1) and P(3, 1), P(2, 1) and P(3, 2), P(3, 1) and P(3, 2), P(3, 1) and P(2, 2), P(3, 2) and P(2, 2), P(2, 2) and P(2, 3), P(2, 2) and P(3, 3), P(3, 2) and P(3, 3), P(3, 2) and P(2, 3), P(3,3) and P(2, 3), P(1, 2) and P(1, 3), P(1, 2) and P(2, 3), P(2, 2) and P(1, 3), P(2, 2) and P(2, 3), and P(1, 3) and P (2, 3). Accordingly, the judgment unit 114 judges whether there is an edge between the pixels in each of these pixel pairs.

Further, for example, if the judgment unit 114 judges that there is an edge between the pixel P(2, 2) and pixel P(1, 2), since the pixel P(1, 2) is a peripheral pixel, the same processing as the processing as described above is also performed on the pixel P(1, 2). If it is judged that there is an edge between the pixel P(2, 2) and the pixel P(2, 1), the same processing is also performed on the pixel P(2, 1). These judgment results are also output to the edge pattern classification unit 116.

Figure 23:
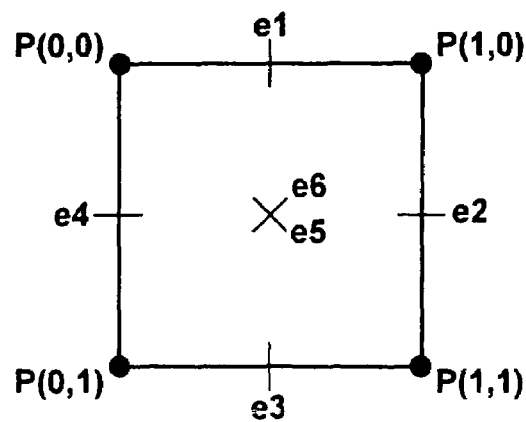
FIG. 23 is a diagram for explaining the operation of an edge pattern classification unit 116.

The edge pattern classification unit 116 classifies the edge pattern within each 2×2 pixel block of four pixels based on the judgment result, which is output from the judgment unit 114. First, the edge pattern classification of the edge in four pixels, P(0, 0), the pixel (1, 0), the pixel(1, 1), and the pixel (0, 1), will be described. As illustrated in FIG. 23, the edge pattern classification unit 116 classifies the edge pattern based on a straight line, which connects each of midpoints between pixels, between which an edge exists. FIGS. 24-26 are diagrams illustrating edge patterns according to the positions, in which the edges are located. As illustrated in FIGS. 24-26, the edge patterns are classified into nine patterns of a pattern 0 to a pattern 8 according to the positions, at which the edges are located.

When edges are located at points e1, e2, e3, and e4 between pixels, or when edges are located at points e1, e2, e3, e4, e5, and e6 between pixels, the edge pattern may be either the pattern 7 or the pattern 8. Therefore, if there are edges at the points e1, e2, e3, and e4 between pixels, or at points e1, e2, e3, e4, e5, and e6 between pixels, the edge pattern classification unit 116 calculates the absolute value (referred to as "|d11|") of the difference in pixel value between the pixel P (0, 0) and the pixel (1, 1) and the absolute value (referred to as "|d12|") of the difference in pixel value between the pixel (0, 1) and the pixel (1, 0). If |d11|<|d12|, the edge pattern classification unit 116 classifies the edge pattern into the pattern 7. If |d11|≧|d12|, the edge pattern classification unit 116 classifies the edge pattern into the pattern 8.

Figure 27:
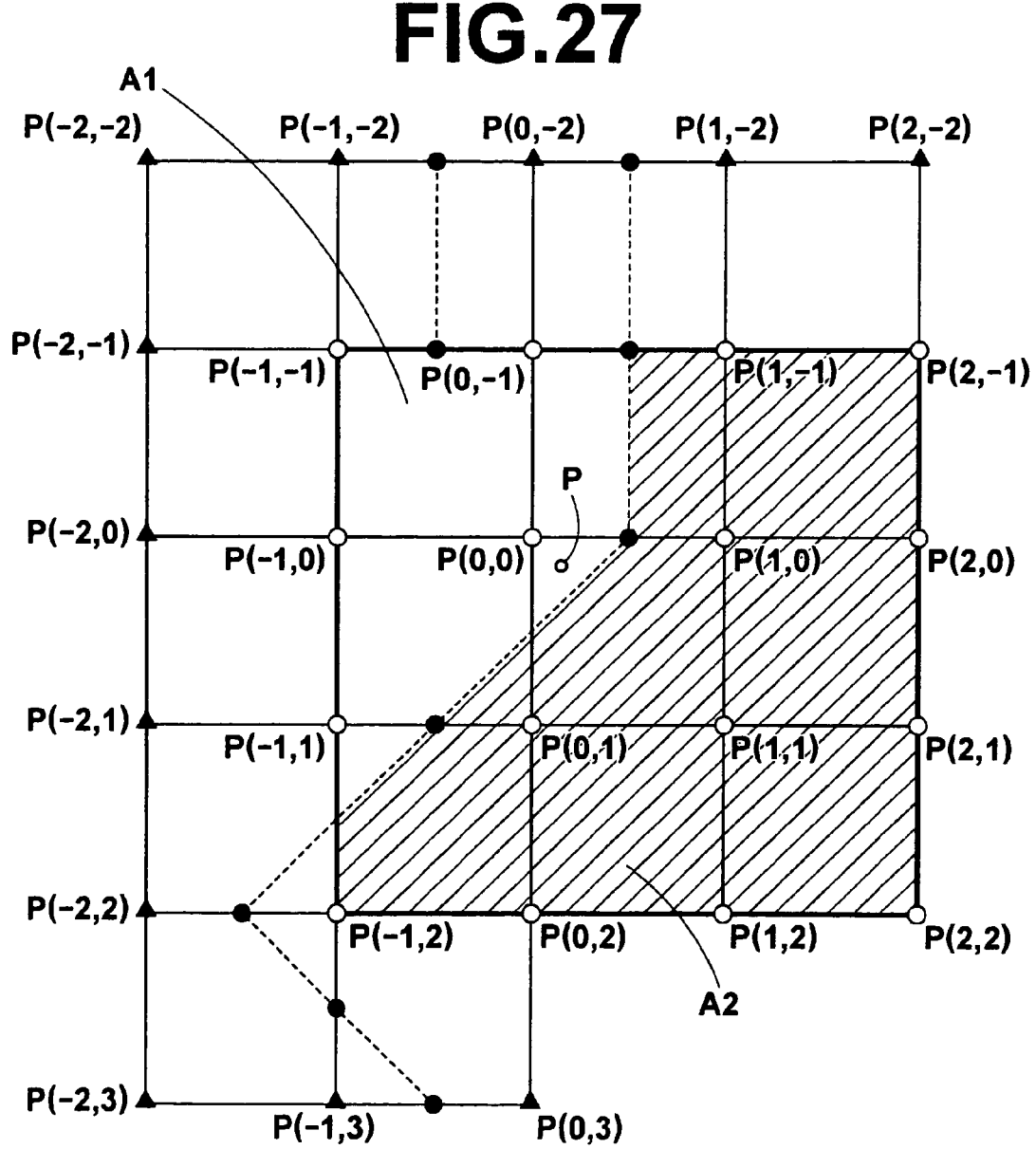
FIG. 27 is a diagram illustrating an example of a classification result by the edge pattern classification unit 116.

Then, the edge pattern classification unit 116 performs edge pattern classification processing as described above on four pixels in each of the 2×2 pixel blocks, and outputs the classification result to the intermediate value pixel judgment unit 120 and the interpolation operation unit 130. FIG. 27 shows an example of the classification result by the edge pattern classification unit 116. In this example, in the area within a bold black frame in FIG. 27, the edge pattern of four pixels, which are adjacent to the interpolation pixel P, is a pattern 4. The edge pattern of the four pixels, P(−1, −1), P(0, −1), P(0, 0), and P(−1, 0), is a pattern 0. The edge pattern of four pixels, P(0, −1), P(1, −1), P(1, 0), and P(0, 0), is a pattern 5. The edge pattern of four pixels, P(1, −1), P(2, −1), P(2, 0), and P(1, 0), is the pattern 0. The edge pattern of four pixels, P(−1, 0), P(0, 0), P(0, 1), and P(−1, 1), is a pattern 2. The edge pattern of four pixels, P(1, 0), P(2, 0), P(2, 1), and P(1, 1), is the pattern 0. The edge pattern of four pixels, P(−1, 1), P(0, 1), P(0, 2), and P(−1, 2), is a pattern 4. The edge pattern of four pixels, P(0, 1), P(1, 1), P(1, 2), and P(0, 2), is the pattern 0. The edge pattern of four pixels, P(1, 1), P(2, 1), P(2, 2), and P(1, 2), is the pattern 0. In the area outside the bold black frame, the edge pattern within four pixels, P(−1, −2), P(−1, −1), P(0, −1), and P (0, −2), is the pattern 5. The edge pattern within four pixels, P(−2, 1), P(−2, 2), P(−1, 2), and P(−1, 1), is the pattern 2. The edge pattern within four pixels, P(−2, 2), P(−2, 3), P(−1, 3), and P(−1, 2), is a pattern 1. The edge pattern within four pixels, P(−1, 2), P (−1, 3), P (0, 3), and P (0, 2), is a pattern 3. The edge pattern within the other four pixels is the pattern 0. In FIG. 27, these edge patterns are indicated by dotted lines. As illustrated in FIG. 27, the area within the 16 pixels (within the bold black frame illustrated in FIG. 27) surrounding the interpolation pixel P, is divided into two areas of an area A1 and an area A2 by the edge. The area A2 is a shaded area in FIG. 27.

Figure 21:
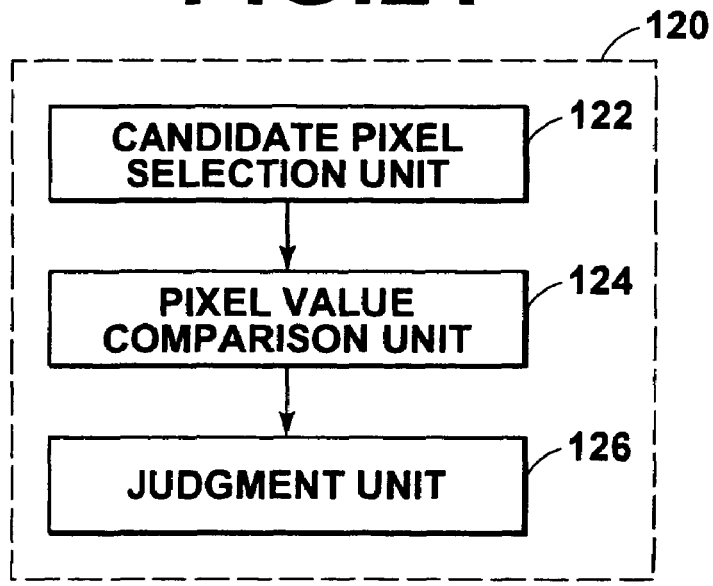
FIG. 21 is a block diagram illustrating the configuration of an intermediate value pixel judgment unit 120 in the image enlargement/reduction apparatus, which is illustrated in FIG. 19.

FIG. 21 is a block diagram illustrating the configuration of the intermediate value pixel judgment unit 120. As illustrated in FIG. 21, the intermediate value pixel judgment unit 120 includes a candidate pixel selection unit 122 for selecting a pixel, which is a candidate pixel for the intermediate value pixel, in the 4×4 pixel block of 16 pixels surrounding the interpolation pixel P. The intermediate value pixel judgment unit 120 also includes a pixel value comparison unit 124 for comparing the pixel values of three pixels among each other. The three pixels are the candidate pixel, which is selected by the candidate pixel selection unit 122, and the pixels, on both sides of the candidate pixel. The intermediate value pixel judgment unit 120 also includes a judgment unit 126 for judging whether the candidate pixel is an intermediate value pixel based on the comparison result by the pixel value comparison unit 124. The judgment unit 126 outputs the judgment result to the interpolation operation unit 130. Specifically, first, the candidate pixel selection unit 122 checks, for each of the 16 pixels in the 4×4 block surrounding the interpolation pixel P, whether there is an edge between each pair of two pixels among three serially adjacent pixels with each of the pixels at the middle among the three pixels. If there is an edge between each pair of two mutually adjacent pixels among the three pixels, the candidate pixel selection unit 122 further checks whether the directions of the two edges are the same. Only if the directions of the two edges are the same, the candidate pixel selection unit 122 selects the pixel as the candidate pixel. In the other cases, the candidate pixel selection unit 122 judges that the pixel is not the candidate pixel.

In the example illustrated in FIG. 27, only pixel P(0, −1) is selected as the candidate pixel. There is an edge between the pixel P(−1, 1) and the pixel P(−1, 2) and between the pixel P(−1, 2) and the pixel P(−1, 3). However, since the two adjacent edges on both sides of the P(−1, 2) are not the same, the pixel P(−1, 2) is not selected as the candidate pixel.

The pixel value comparison unit 124 compares the pixel values of the aforementioned three adjacent pixels for the candidate pixel, which is selected by the candidate pixel selection unit 122, (In the case of the pixel P(−1, 2), the pixel values of the pixels P(−1, 1), P(−1, 2), and P(−1, 3)), are compared with each other. The pixel value comparison unit 124 outputs the comparison result to the judgment unit 126.

The judgment unit 126 judges, based on the comparison result by the pixel value comparison unit 124, that the candidate pixel is the intermediate value pixel only if the compared pixel values of the three pixels (with the candidate pixel located at the middle among the three pixels) monotonically increase or monotonically decrease along the arrangement direction of the three pixels. Here, it is assumed that the candidate pixel P(0, −1) is judges to be the intermediate value pixel.

The edge detection result by the edge detection unit 110 and the judgment result by the intermediate value pixel judgment unit 120 are output to the interpolation operation unit 130. The interpolation operation unit 130 calculates the pixel value of the interpolation pixel P based on the two results. Specifically, if there is no edge within the 16 pixels surrounding the interpolation pixel P, the interpolation operation unit 130 calculates the pixel value of the interpolation pixel P using the bicubic method. The interpolation operation by the bicubic method is similar to the first interpolation operation, which is performed by the interpolation operation unit 30 in the embodiment illustrated in FIG. 1. Therefore, the detailed descriptions are omitted. In the following descriptions on the present embodiment, when there is no edge within the 16 pixels surrounding the interpolation pixel P, the operation for calculating the pixel value of the interpolation pixel P using the bicubic method is referred to as a first interpolation operation in the present embodiment.

Meanwhile, if there is an edge within the 16 pixels surrounding the interpolation pixel P, the interpolation operation unit 130 calculates the pixel value of the interpolation pixel P by a second interpolation operation. Here, the second interpolation operation will be specifically described with reference to the example illustrated in FIG. 27.

Figure 28:
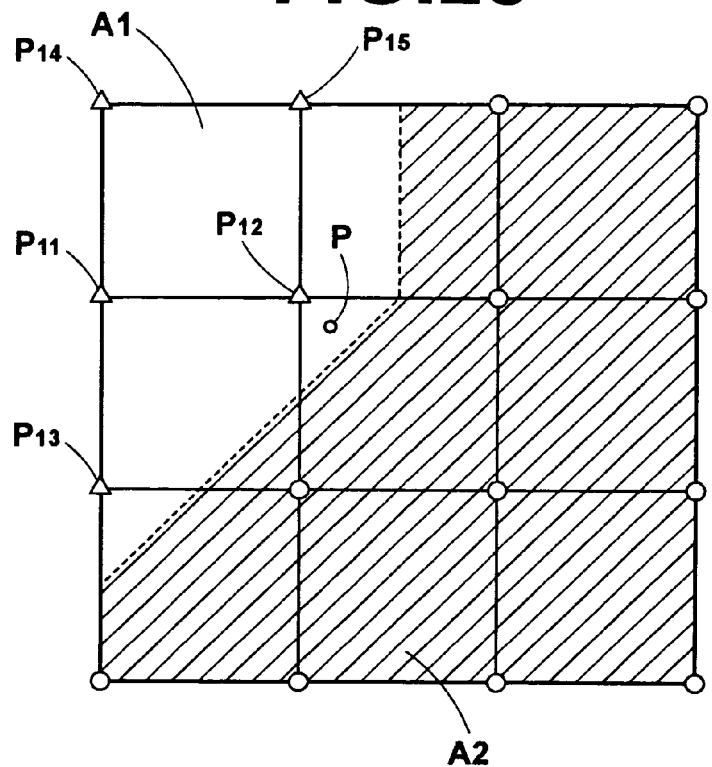
FIG. 28 is a diagram illustrating an example of an edge pattern within 16 pixels surrounding an interpolation pixel P.

Here, for the purpose of simplifying the explanation, the area within the bold black frame in FIG. 27 is illustrated in FIG. 28. In FIG. 28, the pixels P(−1, 1), P(−1, 0), P(−1, 1), P(0, 0), and P(0, −1) are replaced by signs P14, P11, P13, P12, and P15, respectively. As illustrated in FIG. 28, the area within the 16 pixels surrounding the interpolation pixel P is divided into two areas of the area A1 and the area A2 by the edge. The area A2 is illustrated as a shaded area. First, the interpolation operation unit 130 determines, based on the edge pattern in the 16 pixels, the pixel, which will be used for the interpolation operation, based on which side of the edge the interpolation pixel P exists (first determination). For example, if the interpolation pixel P exists in the area A1 as illustrated in FIG. 28, the interpolation operation unit 130 determines that the pixels P11, P12, P13, P14, and P15 (illustrate with Δ in FIG. 28) are the pixels, which will be used for the interpolation operation, in the first determination. Next, the interpolation operation unit 130 checks whether there is a pixel, which is judged to be the intermediate value pixel by the intermediate value pixel judgment unit 120, among the pixels, which are determined in the first determination. If there is the intermediate value pixel, the interpolation operation unit 130 removes the pixel from the pixels, which will be used for the interpolation operation, and determines that the remaining pixels are the pixels, which will be used for the interpolation operation (second determination). In contrast, if the interpolation pixel exists in the area A2, first, the interpolation operation unit 130 determines that the pixels in the area A2 (illustrate with ○ in FIG. 27) are the pixels, which will be used for the interpolation operation (the first determination). Then, the interpolation operation unit 130 checks whether there is a pixel, which is judged to be the intermediate value pixel by the intermediate value pixel judgment unit 120, among the pixels, which are determined in the first determination. If there is the intermediate value pixel, the interpolation operation unit 130 removes the pixel from the pixels, which will be used for the interpolation operation, and determines that the remaining pixels are the pixels, which will be used for the interpolation operation (second determination). In the example illustrated in FIG. 28, the pixels which are determined in the first determination are pixels P13, P11, P14, and P15. Since the pixel P15 (pixel P(0, −1) in FIG. 27) is the intermediate value pixel, the pixel P15 is removed in the second determination. Specifically, the interpolation operation unit 130 determines that four pixels, pixels P13, P11, P12, and P14, are the pixels, which will be used for the interpolation operation of the interpolation pixel P, which is located in the side of the area A1 illustrated in FIG. 28.

Next, the interpolation operation unit 130 performs an interpolation operation to obtain the pixel value of the interpolation pixel P by giving a more weight to the pixel, which is located closer to the interpolation pixel P. Specifically, the interpolation operation unit 130 sets the weights W11-W14 for each of the pixels P11-P14 so that the largest weight W12 is given to the pixel P12. The interpolation operation unit 130 calculates the pixel value (referred to as "Pt" in this case) of the interpolation pixel P by performing the operation according to the following equations (6) by using the pixel values Pt11-Pt14 of the pixels $$Pt = \sum_{i=1}^{4} W1i \cdot Pt1i \text{ wherein,} \tag{6}$$

$$\sum_{i=1}^{4} W1i = 1$$

Figure 29:
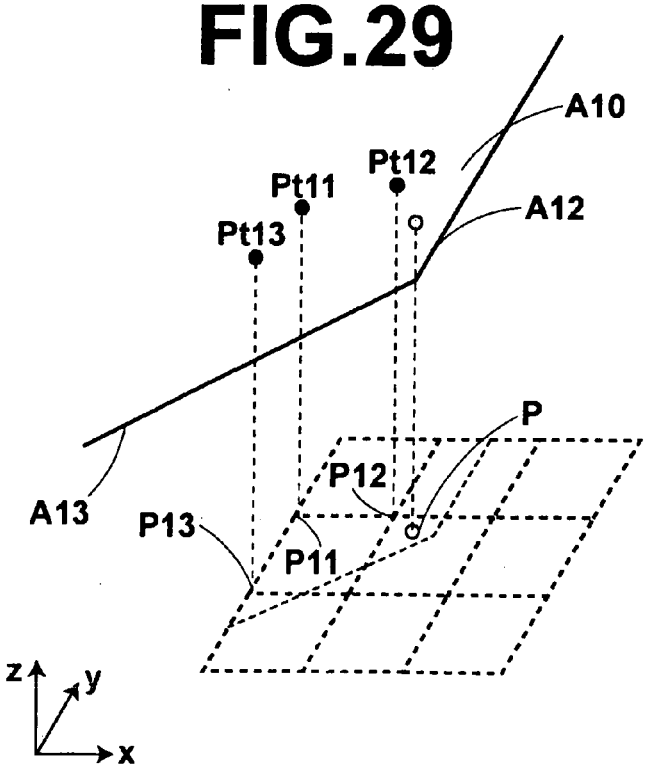
FIG. 29 is a diagram for explaining an interpolation operation (second interpolation operation D2), which is performed if there is an edge within 16 pixels surrounding the interpolation pixel P.

For calculating the pixel value of the interpolation pixel P, it is not required to use all the determined pixels. Further, the calculation method is not limited the method as descried above. For example, the pixel value of the interpolation pixel P may be obtained by applying the second interpolation operation (Refer to FIG. 12A.) by the interpolation operation unit 30 in the embodiment illustrated in FIG. 1 to the second dimension. Specifically, as illustrated in FIG. 29, a plane A10, which passes through the pixel values Pt11, Pt12, and Pt13 of the pixels P11, P12, and P13 (Refer to FIG. 28), which are pixels other than the intermediate value pixels in the area A1, is set in a three-dimensional space with the x coordinate and the y coordinate, which represent the position of the pixel, and the z coordinate, which represents the pixel value. In the plane A10, sides A12 and A13 correspond to the positions of the edges. The value of the z coordinate, which corresponds to the x coordinate and the y coordinate of the interpolation pixel P, on the plane A10 should be obtained as the pixel value of the interpolation pixel P.

Figure 30:
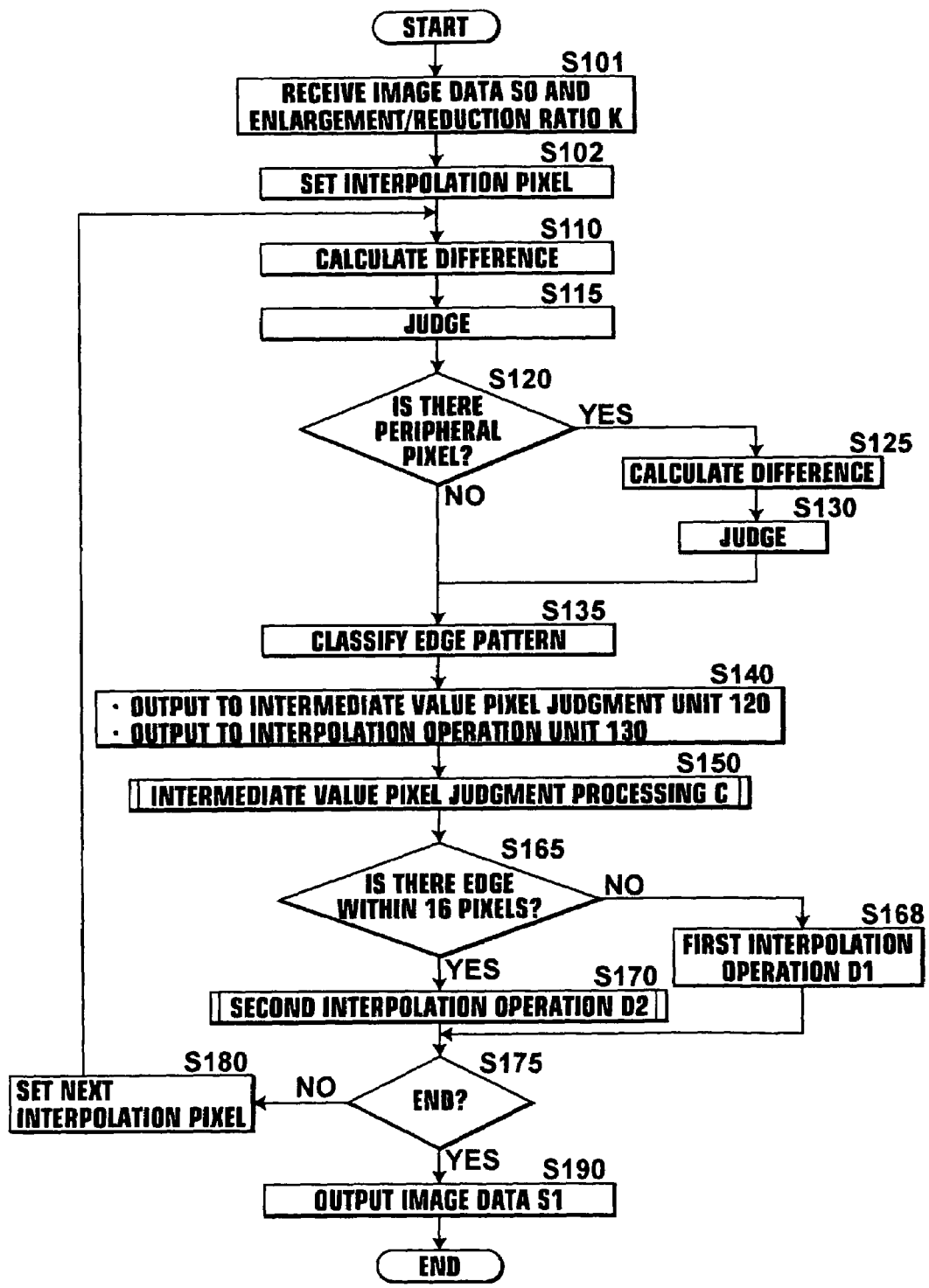
FIG. 30 is a flow chart illustrating processing performed in the present embodiment.

FIG. 30 is a flow chart illustrating processing performed in the image enlargement/reduction apparatus of the present embodiment. In the present embodiment, it is assumed that the interpolation pixel P is located between pixels in the image S0. First, the input unit 101 receives an input of image data S0, which will be enlarged or reduced, and an enlargement/reduction ratio K of the image data S0 (step S101). Then, the filtering unit 112 performs filtering processing, based on the enlargement/reduction ratio K, on a pixel pair, which includes two adjacent pixels, within the 4×4 pixel block of 16 pixels (16 pixels surrounding the interpolation pixel P), which are located in the vicinity of a first interpolation pixel P (a pixel located in the upper left corner of the image, which is represented by the enlarged/reduced image data S1) by using a difference filter. Accordingly, the filtering unit 112 calculates the difference in pixel value between each pixel pair (step S110).

Next, the judgment unit 114 judges whether there is an edge between the two pixels in each pixel pair based on whether the absolute value of the difference in pixel value between each pixel pair is equal to or larger than a predetermined threshold value Th. Specifically, if the absolute value of the difference in pixel value between the pixel pair is equal to or larger than the threshold value Th, the judgment unit 114 judges that there is an edge between the two pixels in the pixel pair. If the absolute value of the difference in pixel value between the pixel pair is less than the threshold value Th, the judgment unit 114 judges that there is no edge between the two pixels of the pixel pair. Next, the judgment unit 114 judges whether one of the two pixels in the pixel pair, between which it is judged that there is an edge, is a peripheral pixel (step S115). If the judgment is YES (step S120: YES), the filtering unit 112 calculates the difference in pixel value between two mutually adjacent pixels in 2×2 pixel group, to which each of pixels, which are not included in the 16 pixels of the interpolation pixel P but adjacent to the peripheral pixel, belongs to. The filtering unit 112 outputs the result to the judgment unit 114 (step S125). The judgment unit 114 judges whether there is an edge between pixels in each of the pixel pair, of which difference in pixel value has been obtained (step S130).

The edge pattern classification unit 116 classifies the edge pattern in each 2×2 pixel block based on the judgment result by the judgment unit 114 (step S135), and outputs the classification result to the intermediate value pixel judgment unit 120 and the interpolation operation unit 130 (step S140). The intermediate value pixel judgment unit 120 judges the intermediate value pixel in the 16 pixels surrounding the interpolation pixel P, and outputs the judgment result to the interpolation operation unit 130 (step S150). The interpolation operation unit 130 judges that there is no edge within the 16 pixels surrounding the interpolation pixel P based on the classification result by the edge pattern classification unit 116, if the edge pattern in each 2×2 pixel block within the 16 pixels is the pattern 0 (step S165: NO). The interpolation operation unit 130 also performs the first interpolation operation D1, namely the interpolation operation by the bicubic interpolation method, and obtains the pixel value of the interpolation pixel P (step S168). Meanwhile, if there is a 2×2 pixel block, of which edge pattern is not the pattern 0, within the area of 16 pixels surrounding the interpolation pixel P, the interpolation operation unit 130 judges that there is an edge within the 16 pixels surrounding the interpolation pixel P (step S165: YES). The interpolation operation unit 130 also performs the second interpolation operation D2, and obtains the pixel value of the interpolation pixel P (step S170).

The control unit 150 judges whether the pixel values of all the interpolation pixels P in the image S0 have been calculated (step S175). If step S175 is NO, the control unit 150 sets an interpolation pixel P, of which pixel value should be calculated, as the next interpolation pixel P (step S180). The processing goes back to the process from step S110. Meanwhile, if step S180 is YES, the control unit 150 outputs the enlarged/reduced image data S1 including the interpolation pixel P (step S190), and the processing ends.

FIG. 31 is a flow chart illustrating intermediate value pixel judgment processing C in step S150 in details. As illustrated in FIG. 31, first, the candidate pixel selection unit 122 in the intermediate value pixel judgment unit 120 judges, for each pixel in the 4×4 pixel block of 16 pixels surrounding the interpolation pixel, whether there is an edge between two mutually adjacent pixels among three serially adjacent pixels, with the pixel at the middle among the three pixels (step S151). If there is an edge between the two mutually adjacent pixels in each pair among the three pixels (step S151: YES), the candidate pixel selection unit 122 further judges whether the directions of the two edges are the same (step S152). Only if the directions of the two edges are the same (step S152: YES), the candidate pixel selection unit 122 selects the pixel as the candidate pixel (step S153).

Next, the pixel value comparison unit 124 compares the pixel values of the three adjacent pixels as described above for the candidate pixel selected by the candidate pixel selection unit 122 in step S153, and outputs the comparison result to the judgment unit 126 (step S154).

Only if the compared pixel values of the three pixels monotonically increase or monotonically decrease along the arrangement direction of the three pixels (step S155: YES), the judgment unit 126 judges, based on the comparison result from the pixel value comparison unit 124, that the candidate pixel is the intermediate value pixel (step S156). In the other cases (step 151: NO, or step S151: YES and step S152: NO, or step S151: YES and step S152: YES, step S152: YES, and step S155: NO), the judgment unit 126 judges that the pixel is not the intermediate value pixel (step S157).

If the judgment as to whether a pixel is the intermediate pixel has been performed for all of the 16 pixels surrounding the interpolation pixel P (step S158: YES), the control unit 150 causes the intermediate value pixel judgment unit 120 to end the processing. However, if there is a pixel, on which the judgment has not been made, among the 16 pixels surrounding the interpolation pixel (step S158: NO), the control unit 150 causes the intermediate value pixel judgment unit 120 to judge the next pixel (step S159), and the processing goes back to step S151.

FIG. 32 is a flow chart illustrating the second interpolation operation D2, which is performed by the interpolation operation unit 130 when there is an edge within the 16 pixels surrounding the interpolation pixel P. As illustrated in FIG. 32, the interpolation operation unit 130 judges on which side of the edge the interpolation pixel P is located in the area of the 16 pixels (step S171). Then, the interpolation operation unit 130 determines that a pixel, which is located on the same side of the edge as the interpolation pixel P, is the pixel, which is used for the interpolation operation (first determination, step S172). Next, the interpolation operation unit 130 removes the intermediate value pixel from the pixels, which are determined in the first determination, and determines that the remaining pixels are the pixels, which are used for the interpolation operation (second determination). Next, the interpolation operation unit 130 performs an interpolation operation to obtain the pixel value of the interpolation pixel P by giving a more weight to the pixel, which is located closer to the interpolation pixel P, among the determined pixels.

In the embodiments as described above, the interpolation operation method, which is used when there is an edge in the vicinity of the interpolation pixel or there is no edge in the vicinity of the interpolation pixel, is not limited the interpolation operation method as described above. Other methods such as a Gaussian method may also be used.

Further, the method for detecting whether there is an edge between pixels is not limited the method as described above. Other method such as the methods listed in the description of the related art in this specification may also be used.

Further, besides the enlargement/reduction processing, the present invention may be applied to sharpness processing or the like for enhancing the sharpness of the image by using the pixel value of the intermediate value pixel as the pixel value for one of the outsides of the adjacent edges.

Figure 36:
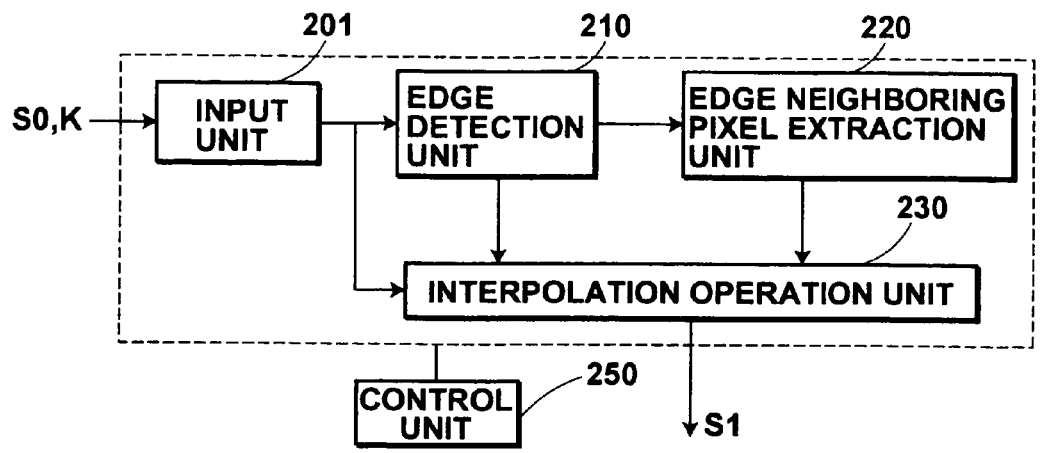
FIG. 36 is a block diagram illustrating an image enlargement/reduction apparatus according to a third embodiment of the present invention.

FIG. 36 is a block diagram illustrating an image enlargement/reduction apparatus according to a third embodiment of the present invention. As illustrated in FIG. 36, the image enlargement/reduction apparatus according the present embodiment includes an input unit 201 for receiving an input of image data S0 and an enlargement/reduction ratio K of the image data S0. The image enlargement/reduction apparatus also includes an edge detection unit 210, an edge neighboring pixel extraction unit 220, and an interpolation operation unit 230 for calculating the pixel value of an interpolation pixel. The image enlargement/reduction apparatus also includes a control unit 250 for controlling the operations of the input unit 201, the edge detection unit 210, the edge neighboring pixel extraction unit 220, and the interpolation operation unit 230.

Figure 37:
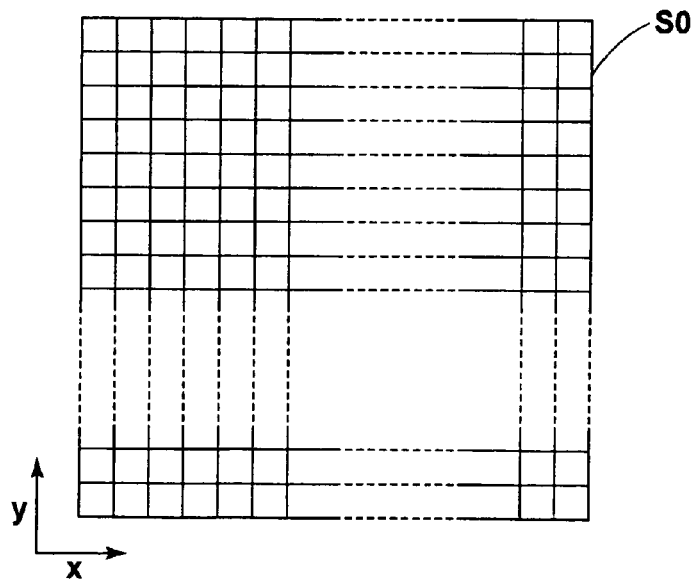
FIG. 37 is a diagram illustrating a pixel arrangement in an image represented by image data.

Here, the image represented by the image data S0 is composed of pixels, which are arranged two-dimensionally, as illustrated in FIG. 37. In the following description, it is assumed that the x direction and the y direction are set as illustrated in FIG. 37. Further, in the following explanation, the image data and the image, which is represented by the image data, are not discriminated from each other, and the same reference numeral (S0 in this case) is assigned to both of them.

Figure 38:
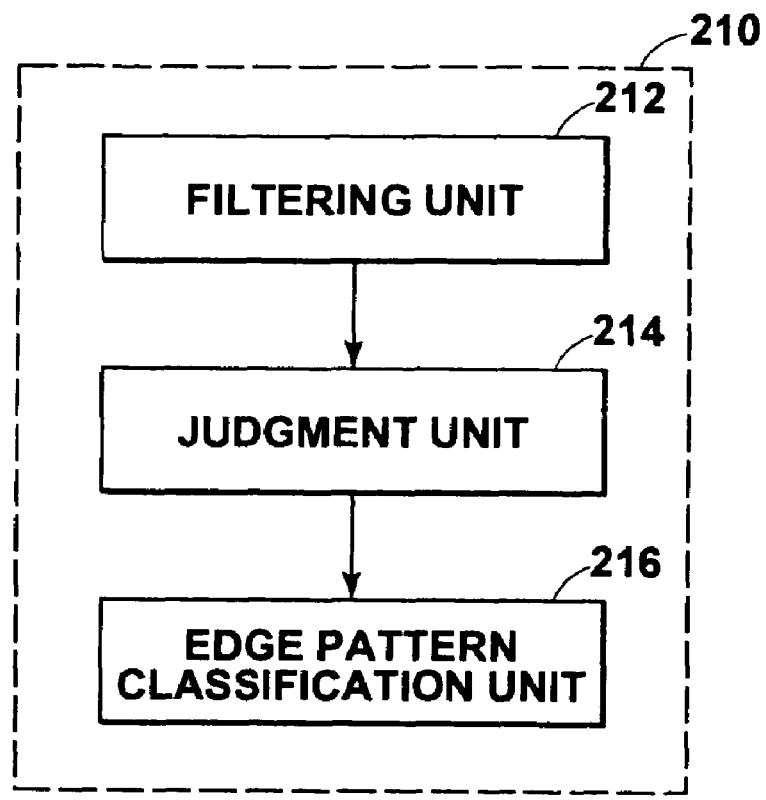
FIG. 38 is a block diagram illustrating the configuration of an edge detection unit 210 in the image enlargement/reduction apparatus, which is illustrated in FIG. 36.
Figure 39:
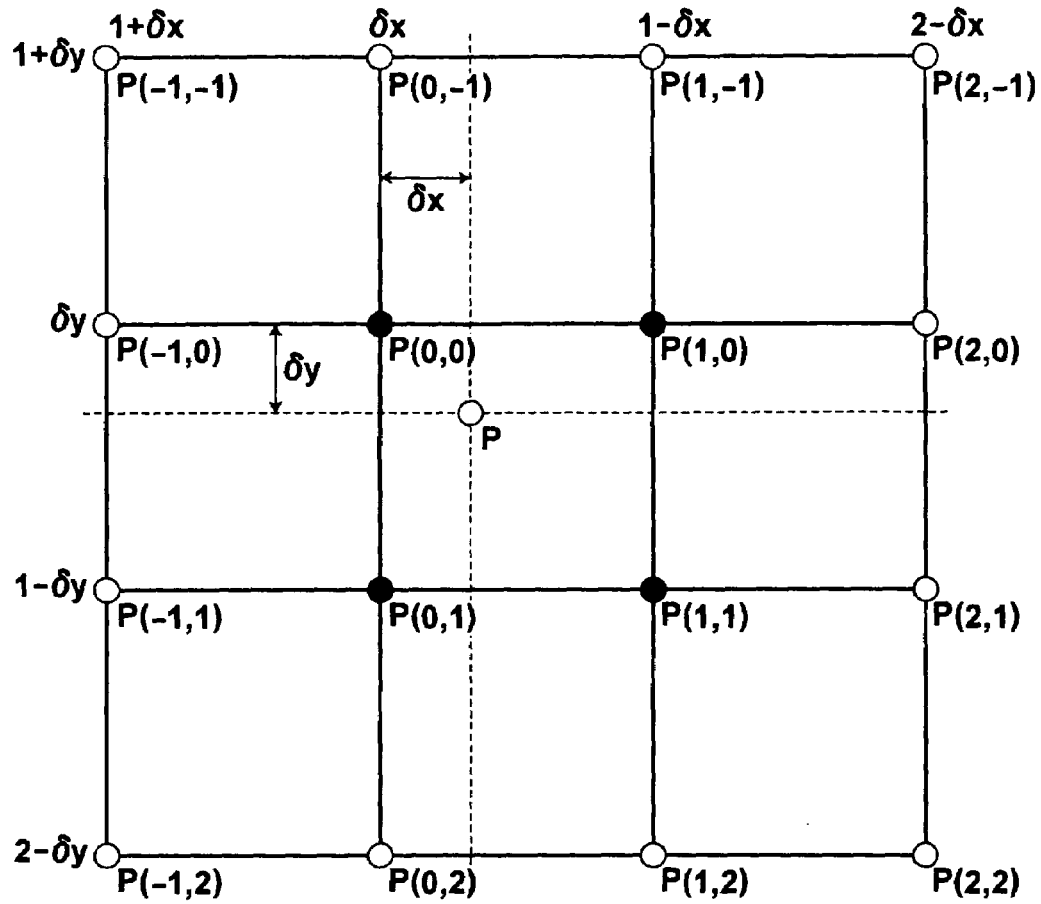
FIG. 39 is a diagram for explaining an interpolation operation.
Figure 40:
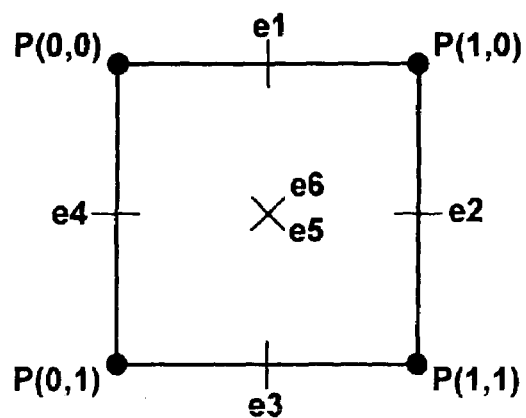
FIG. 40 is a diagram for explaining the operation by an edge pattern classification unit 216.

As illustrated in FIG. 38, the edge detection unit 210 includes a filtering unit 212, a judgment unit 214, and an edge pattern classification unit 216. First, the filtering unit 212 performs filtering processing, on each pixel pair including two mutually adjacent pixels in a 4×4 pixel block of 16 pixels (16 pixels, P (i, j), (i, j=−1 to 2), which are illustrated in FIG. 39, hereinafter referred to as "16 pixels of the interpolation pixel P1") which are located in the vicinity of the interpolation pixel P in the image S0, by using a difference filter is illustrated in FIG. 5. Then, the filtering unit 212 calculates the difference in pixel value between each pixel pair (hereinafter, the difference between the pixel pair of adjacent pixels is referred to as "d"). Here, the two mutually adjacent pixels are not limited to two pixels such as the pair of P(−1, 0) and P(0, 0), which are adjacent to each other in the x direction of the arrangement direction of the pixels, and the pair of P(−1, −1) and P(−1, 0), which are adjacent to each other in the y direction of the arrangement direction of the pixels. The two mutually adjacent pixels also include two pixels such as the pair of P(−1, −1) and P(0, 0) and the pair of P(0, 1) and P(1, 0), which are adjacent to each other in the diagonal directions of the 2×2 pixel block.

The judgment unit 214 judges whether the absolute value of the difference d in pixel value between each pixel pair is equal to or larger than a predetermined threshold value Th. If the judgment is YES, the judgment unit 214 judges that there is an edge between the two pixels in the pixel pair corresponding to the difference, and outputs the judgment result to the edge pattern classification unit 216.

Figure 41:
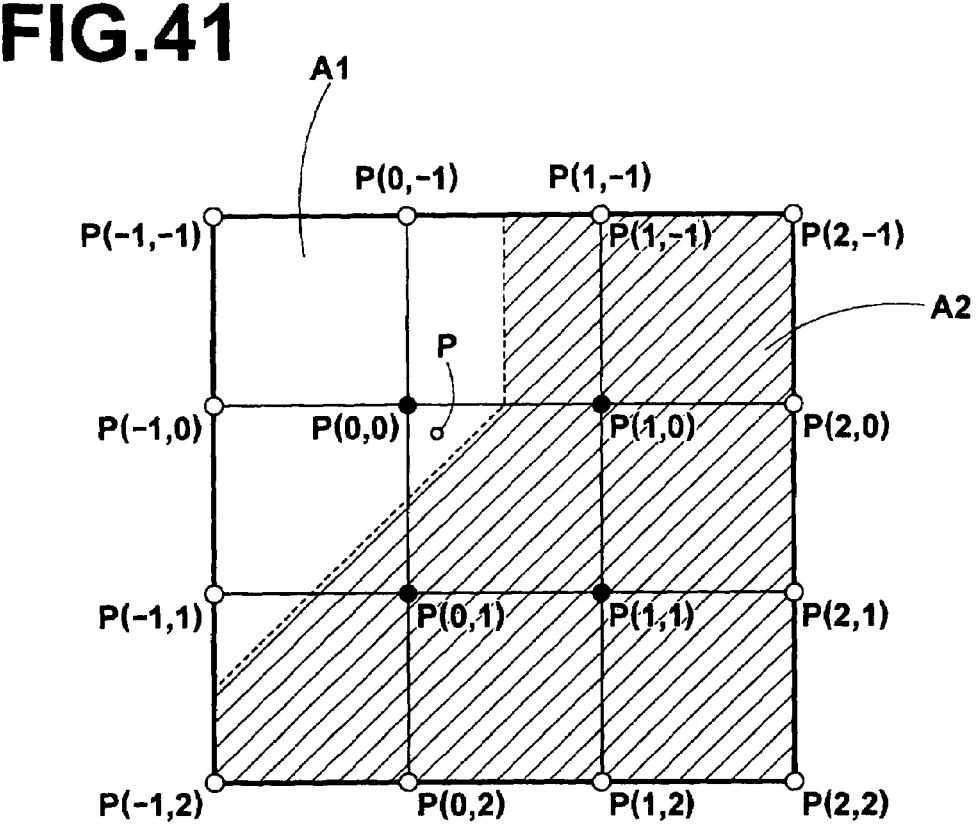
FIG. 41 is a diagram illustrating an example of a classification result by the edge pattern classification unit 216.

The edge pattern classification unit 216 classifies the edge pattern in each 2×2 pixel block of four pixels based on the judgment result output from the judgment unit 214. The edge pattern classification processing by the edge pattern classification unit 216 is the same as the edge pattern classification processing by the edge pattern classification unit 116 in the edge detection unit 110 according the embodiment illustrated in FIG. 19. Therefore, detailed descriptions are omitted. The edge pattern classification unit 216 performs the edge pattern classification processing on each of the four pixels in the 2×2 pixel block, and outputs the classification result to the edge neighboring pixel extraction unit 220 and the interpolation operation unit 230. FIG. 41 shows an example of the classification result by the edge pattern classification unit 216. In this example, the edge pattern in the four pixels (black circles in FIG. 41), which are adjacent to the interpolation pixel P, is a pattern 4. The edge pattern in the four pixels, P(−1, −1), P(0, −1), P(0, 0), and P(−1, 0), is a pattern 0. The edge pattern in the four pixels, P(0, −1), P(1, −1), P(1, 0), and P(0, 0), is a pattern 5. The edge pattern in the four pixels, P(1, −1), P(2, −1), P(2, 0), and P(l, 0), is the pattern 0. The edge pattern in the four pixels, P(−1, 0), P(0, 0), P(0, 1), and P(−1, 1), is a pattern 2. The edge pattern in the four pixels, P(1, 0), P(2, 0), P(2, 1), and P(1, 1), is the pattern 0. The edge pattern in the four pixels, P(−1, 1), P(0, 1), P(0, 2), and P(−1, 2), is a pattern 4. The edge pattern in the four pixels, P(0, 1), P(1, 1), P(1, 2), and P(0, 2), is the pattern 0. The edge pattern in the four pixels, P(1, 1), P(2, 1), P(2, 2), and P(1, 2), is the pattern 0. In FIG. 41, these edge patterns are indicated by dotted lines. As illustrated in FIG. 41, the area within the 16 pixels surrounding the interpolation pixel P, is divided into two areas of an area A1 and an area A2 by the edge. The area A2 is a shaded area in FIG. 41.

The edge detection unit 210 outputs the edge pattern classification result by the edge pattern classification unit 216 to the edge neighboring pixel extraction unit 220 and the interpolation operation unit 230.

The edge neighboring pixel extraction unit 220 extracts an edge neighboring pixel from the 16 pixels surrounding the interpolation pixel P based on the edge pattern classification result, which is output from the edge detection unit 210. Specifically, the edge neighboring pixel extraction unit 220 extracts the adjacent pixels on both sides of the edge, as the edge neighboring pixels. In the example illustrated in FIG. 41, seven pixels, P(0, −1), P(1, −1), P(0, 0), P(1, 0), P(−1, 1), P(0, 1), and P(−1, 2), are extracted as the edge neighboring pixels.

Figure 42:
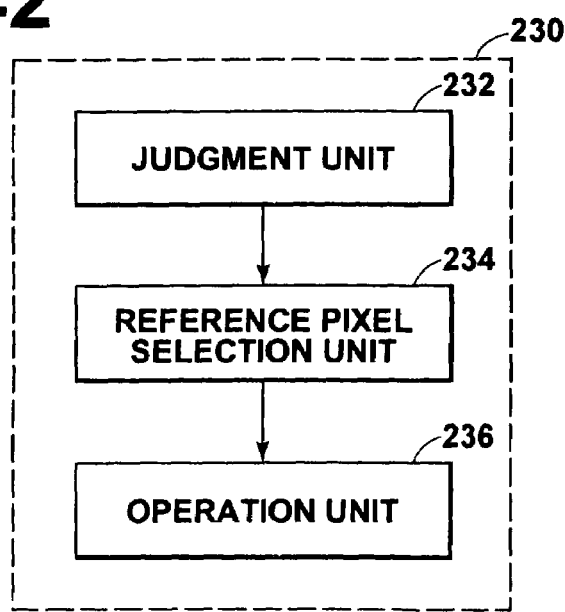
FIG. 42 is a block diagram illustrating the configuration of an interpolation operation unit 230 in the image enlargement/reduction apparatus, which is illustrated in FIG. 36.

The interpolation operation unit 230 calculates the pixel value of the interpolation pixel P based on the edge detection result by the edge detection unit 210 and the extraction result by the edge neighboring pixel extraction unit 220. FIG. 42 is a block diagram illustrating the configuration of the interpolation operation unit 230. As illustrated in FIG. 42, the interpolation operation unit 230 includes a judgment unit 232 for judging on which side of the edge the interpolation pixel P exists. The interpolation operation unit 230 also includes a reference pixel selection unit 234 for selecting a pixel, which is located on the same side of the edge as the interpolation pixel P, as the reference pixel among the 16 pixels surrounding the interpolation pixel P. The interpolation operation unit 230 also includes an operation unit 236 for calculating the pixel value of the interpolation pixel P by performing an interpolation operation by using the pixel value of the reference pixel. Here, the interpolation operation unit 230 will be described in details.

If the edge pattern in 2×2 pixels, which are adjacent to the interpolation pixel P, is the pattern 0, in other words, if there is no edge in the area, the interpolation operation unit 230 calculates the pixel value of the interpolation pixel P using the bicubic method. The detailed explanation on the bicubic method is omitted here.

Meanwhile, if there is an edge within 2×2 block of 4 pixels, which are adjacent to the interpolation pixel P, the interpolation operation unit 230 performs an interpolation operation, which is different from the interpolation operation performed when there is no edge within the four pixels, which are adjacent to the interpolation pixel P. The interpolation operation, which is performed when there is no edge within four pixels, which are adjacent to the interpolation pixel P, is hereinafter referred to as a first interpolation operation (a bicubic interpolation operation, in this case). The interpolation operation, which is performed when there is an edge within four pixels, which are adjacent to the interpolation pixel P, is hereinafter referred to as a second interpolation operation.

With reference to the example illustrated in FIG. 41, the second interpolation operation by the interpolation operation unit will be specifically described.

As illustrated in FIG. 41, the area within the 16 pixels surrounding the interpolation pixel P is divided into two areas of the area A1 and the area A2 by an edge. The area A2 is the shaded area in FIG. 41. First, in the interpolation operation unit 230, the judgment unit 232 judges, based on the edge patterns in the 16 pixels, on which side of the edge the interpolation pixel P exists. For example, it is judged that the interpolation pixel P exists in the area A1 as illustrated in FIG. 41. Next, the reference pixel selection unit 234 in the interpolation operation unit 230 selects the pixel, which is located on the same side of the edge as the interpolation pixel P, in the 16 pixels surrounding the interpolation pixel P as the reference pixel. In the example illustrated in FIG. 41, five pixels, P(−1, −1), P(0, −1), P(−1, 0), P(0, 0), and P(−1, 1), in the area A1 are selected as the reference pixels, which are used for the interpolation operation. Next, the operation unit 236 sets a first weight W for each reference pixel by giving a more weight to the pixel, which is located closer to the interpolation pixel P, among the reference pixels, which are selected by the reference pixel selection unit 234. In the example illustrated in FIG. 41, the first weight W is set for each reference pixel so that the first weight W for the pixel P(0, 0) becomes the largest. Here, the pixel values of the reference pixels, P(−1, −1), P(0, −1), P(−1, 0), P(0, 0), and P(−1, 1) are Pt1-Pt5, respectively. The operation unit 236 sets the first weight Wi for each of the reference pixels.

Next, the operation unit 236 sets a second weight Q based on whether the reference pixel is the edge neighboring pixel so that the weight given to the edge neighboring pixel is less than the weight given to the reference pixel, which is not the edge neighboring pixel. In the example illustrated in FIG. 41, the second weight Q of the reference pixels, P(0, −1), P(0, 0), P(−1, 1), which are extracted by the edge neighboring pixel extraction unit 220 as the edge neighboring pixels is set so that the second weight for the reference pixels P(0, −1), P(0, 0), P(−1, 1) is less than the second weight Q of the reference pixels P(−1, 1) and P(−1, 0).

Then, the operation unit 236 calculates the pixel value (referred to as "Pt" in this case) of the interpolation pixel P by performing the operation according to the equations (7) as described below by using two weights W and Q, which have been set:

$$Pt = \sum_{i=1}^{5} WiQiPti \text{ wherein,} \qquad (7)$$

$$\sum_{i=1}^{5} WiQi = 1$$

Figure 43:
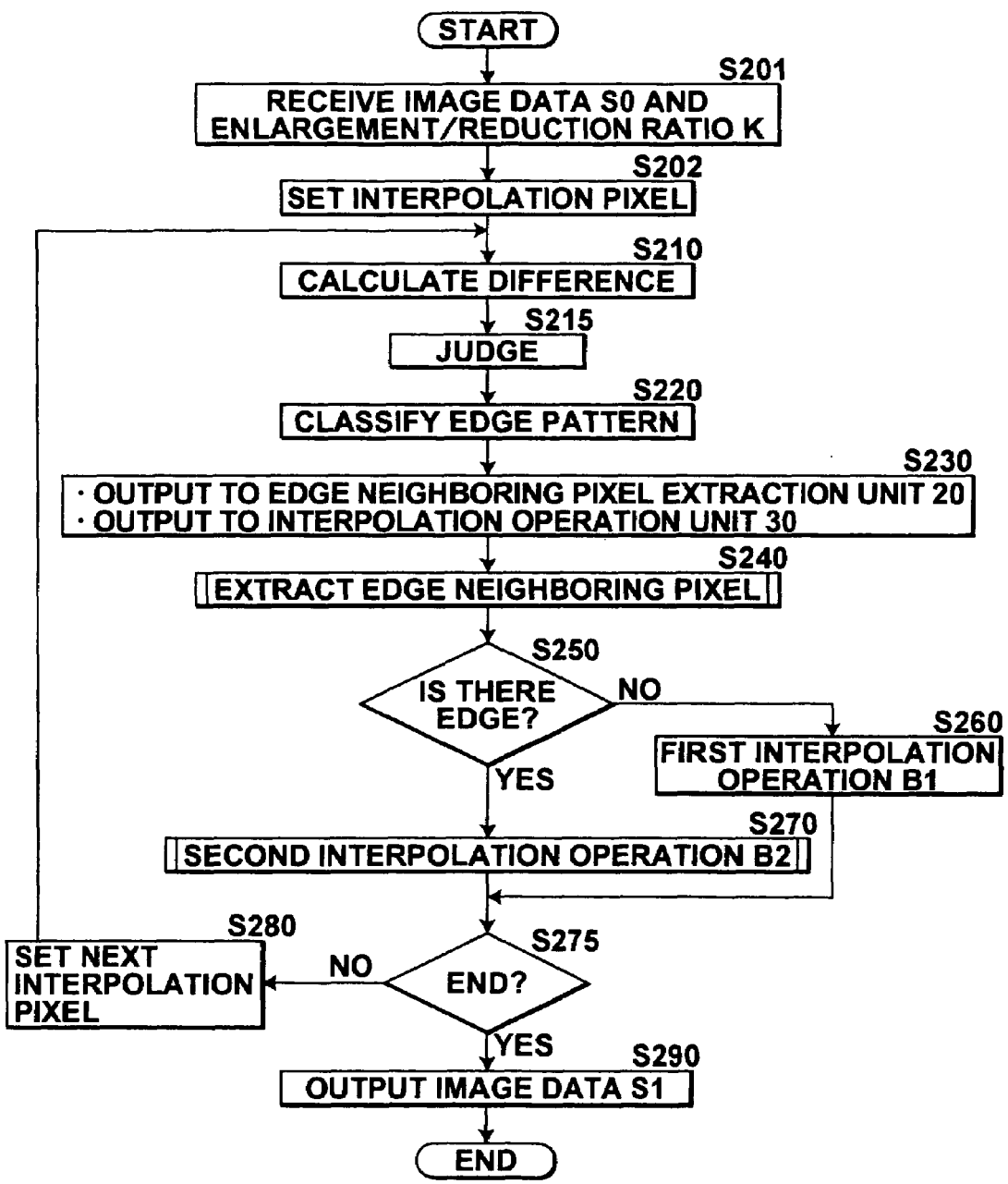
FIG. 43 is a flow chart illustrating processing performed in the image enlargement/reduction apparatus, which is illustrated in FIG. 36.

FIG. 43 is a flow chart illustrating processing performed in the image enlargement/reduction apparatus according to the present embodiment. In the present embodiment, it is assumed that the interpolation pixel P exists between pixels in the image S0. First, the input unit 201 receives an input of image data S0, on which enlargement/reduction processing will be performed, and an enlargement/reduction ratio K of the image data S0 (step S201). Then, the filtering unit 212 performs filtering processing, based on the enlargement/reduction ratio K, on a pixel pair including two adjacent pixels, within a 4×4 pixel block of 16 pixels (16 pixels surrounding the interpolation pixel P), which are located in the vicinity of a first interpolation pixel P (a pixel located in the upper left corner of the image, which is represented by an enlarged/reduced image data S1) by using a difference filter. Accordingly, the filtering unit 212 calculates the difference in pixel value between each pixel pair (step S210).

Next, the judgment unit 214 judges whether there is an edge between the two pixels in each pixel pair based on whether the absolute value of the difference in pixel value between each pixel pair is equal to or larger than a predetermined threshold value Th. Specifically, if the absolute value of the difference in pixel value between the pixel pair is equal to or larger than the threshold value Th, the judgment unit 214 judges that there is an edge between the two pixels in the pixel pair. If the absolute value of the difference in pixel value between the pixel pair is less than the threshold value Th, the judgment unit 214 judges that there is no edge between the two pixels in the pixel pair.

The edge pattern classification unit 216 classifies the edge pattern in each 2×2 pixel block of four pixels based on the judgment result by the judgment unit 214 (step S220), and outputs the classification result to the edge neighboring pixel extraction unit 220 and the interpolation operation unit 230 (step S230). The edge neighboring pixel extraction unit 220 extracts the pixel, which is the edge neighboring pixel, from the 16 pixels surrounding the interpolation pixel P, and outputs the extracted pixel to the interpolation operation unit 230 (step S240). If the edge pattern in each 2×2 pixel block of four pixels, which is adjacent to the interpolation pixel P, is the pattern 0, the interpolation operation unit 230 judges that there is no edge within this area based on the classification result by the edge pattern classification unit 216 (step S250: NO). The interpolation operation unit 230 also performs the first interpolation operation B1, namely the interpolation operation by the bicubic interpolation method, and obtains the pixel value of the interpolation pixel P (step S260). Meanwhile, if an edge pattern in a 2×2 pixel block, which is adjacent to the interpolation pixel P, is an edge pattern other than the pattern 0, the interpolation operation unit 230 judges that there is an edge in this area (step S250: YES). The interpolation operation unit 230 also performs the second interpolation operation B2, and obtains the pixel value of the interpolation pixel P (step S270).

The control unit 250 judges whether the pixel values of all the interpolation pixels P in the image S0 have been calculated (step S275). If step S275 is NO, the control unit 250 sets an interpolation pixel P, of which pixel value should be calculated, as the next interpolation pixel P (step S280). The processing goes back to the process from step S210. Meanwhile, if step S280 is YES, the control unit 250 outputs the enlarged/reduced image data S1 (step S290), and the processing ends.

Figure 44:
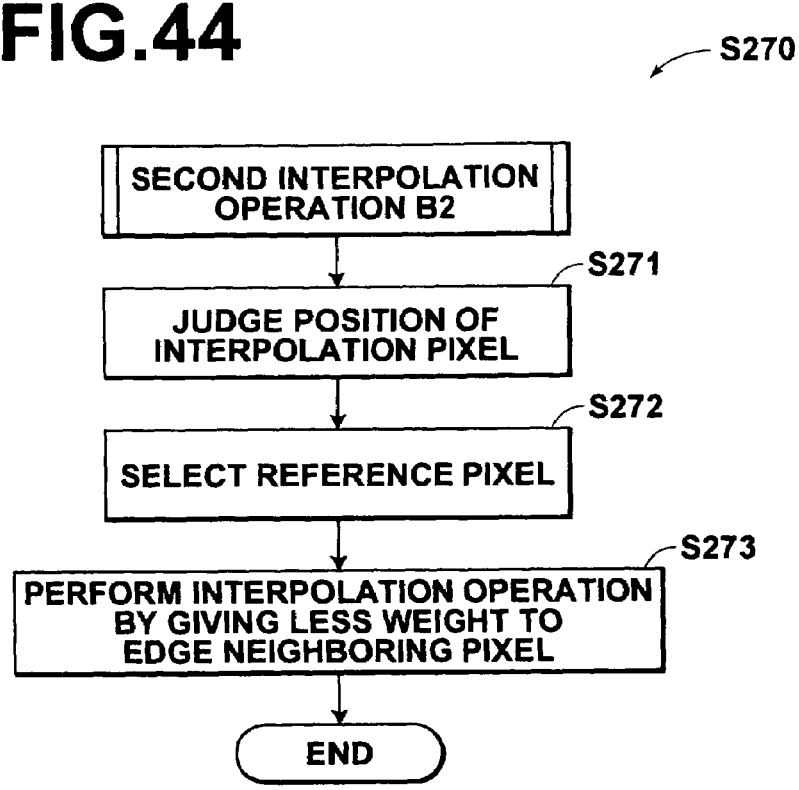
FIG. 44 is a flow chart illustrating the second interpolation operation B2.

FIG. 44 is a flow chart illustrating the second interpolation operation B2 in details, which is performed by the interpolation operation unit 230 when there is an edge within a 2×2 pixel block, which is adjacent to the interpolation pixel P. As illustrated in FIG. 44, first, in the interpolation operation unit 230, the judgment unit 232 judges on which side of the edge the interpolation pixel P exists in the area of 16 pixels (step S271). Then, the reference pixel selection unit 234 selects the pixel, which is located on the same side of the edge as the interpolation pixel P as the reference pixel (step S272). Then, the operation unit 236 sets a first weight W for each reference pixel by giving a more weight to the reference pixel, which is located closer to the interpolation pixel P. The operation unit 236 sets a second weight Q for each of the reference pixels based on whether the pixel is the edge neighboring pixel so that the weight given to the reference pixel, which is the edge neighboring pixel, is less than the weight given to the reference pixel, which is not the edge neighboring pixel. The operation unit 236 uses the two weights W and Q, which have been set, and performs the interpolation operation by using the pixel value of the reference pixel according to the expressions (7) as described above to calculate the pixel value of the interpolation pixel (step S273).

As described above, according to the image enlargement/reduction apparatus of the present embodiment, the fact that the intermediate value pixel is always an edge neighboring pixel, which is one of two adjacent pixels on both sides of an edge between pixels is utilized. When an interpolation pixel is interpolated between the pixels in an image, if there is an edge between pixels in the vicinity of an interpolation pixel, a less weight is given to the edge neighboring pixel than the weight given to the reference pixels other than the edge neighboring pixel among the reference pixels, which are used for obtaining the pixel value of the interpolation pixel for performing an interpolation operation. Since the pixel value of the interpolation pixel is obtained as described above, a remaining blur, caused by the intermediate value pixel, in the image (enlarge/reduced image) including the interpolation pixel can be reduced. Further, it is possible to prevent the blur from become larger in the enlarged/reduced image. Accordingly, the quality of the enlarged/reduced image is good.

Figure 45:
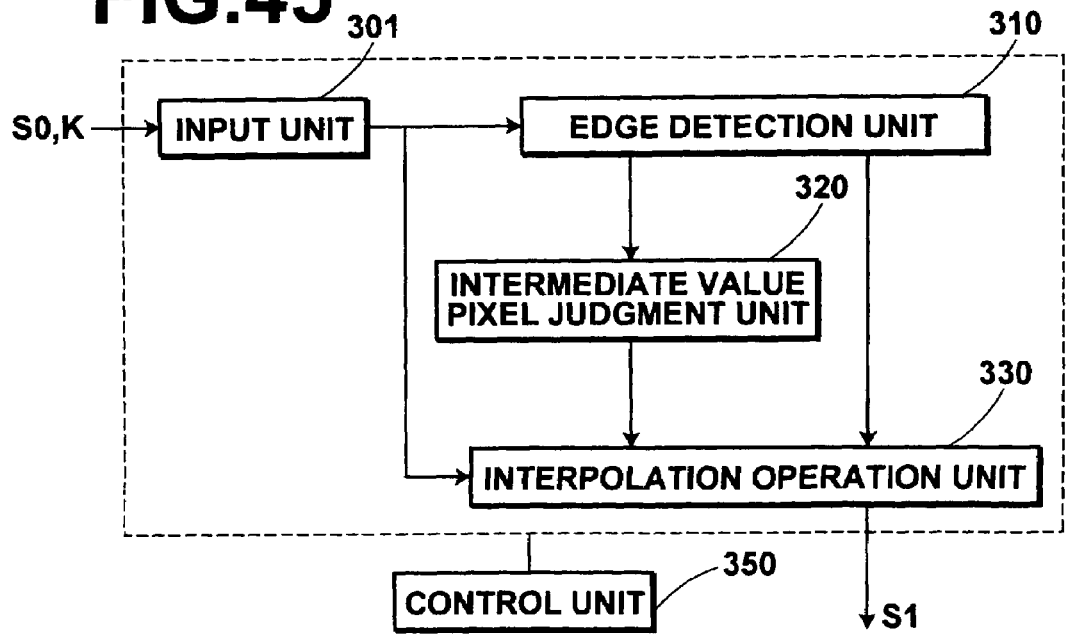
FIG. 45 is a block diagram illustrating the configuration of an image enlargement/reduction apparatus according to a fourth embodiment of the present invention.

FIG. 45 is a block diagram illustrating the configuration of an image enlargement/reduction apparatus according to a fourth embodiment of the present invention. As illustrated in FIG. 45, the image enlargement/reduction apparatus according to the present embodiment includes an input unit 301 for receiving an input of image data S0 and an enlargement/reduction ratio K of the image data S0. The image enlargement/reduction apparatus also includes an edge detection unit 310 for detecting whether there is an edge between pixels in the image, an intermediate value pixel judgment unit 320, and an interpolation operation unit 330 for calculating the pixel value of an interpolation pixel. The image enlargement/reduction apparatus also includes a control unit 350 for controlling the operations of the input unit 301, the edge detection unit 310, the intermediate value pixel judgment unit 320, and the interpolation operation unit 330. The configuration of each of the units will be described below in details.

Figure 46:
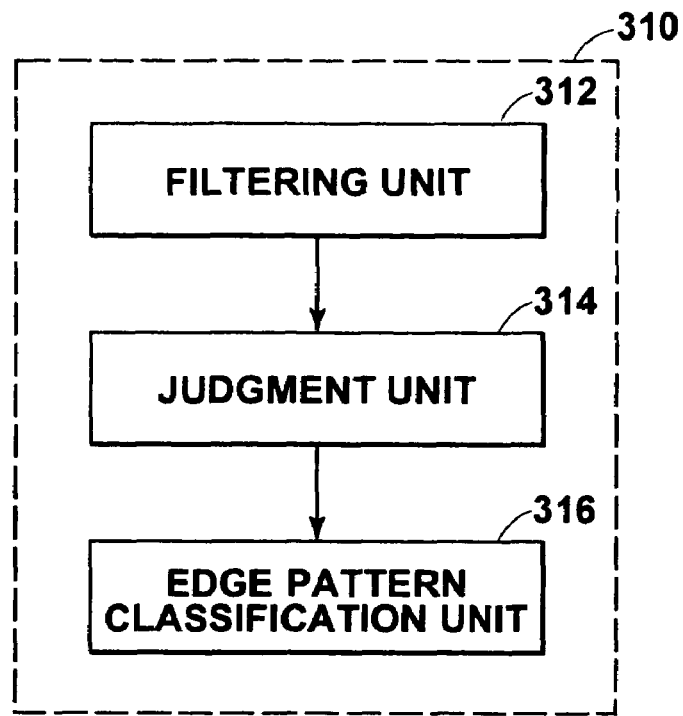
FIG. 46 is a block diagram illustrating the configuration of an edge detection unit 310 in the image enlargement/reduction apparatus, which is illustrated in FIG. 45.
Figure 48:
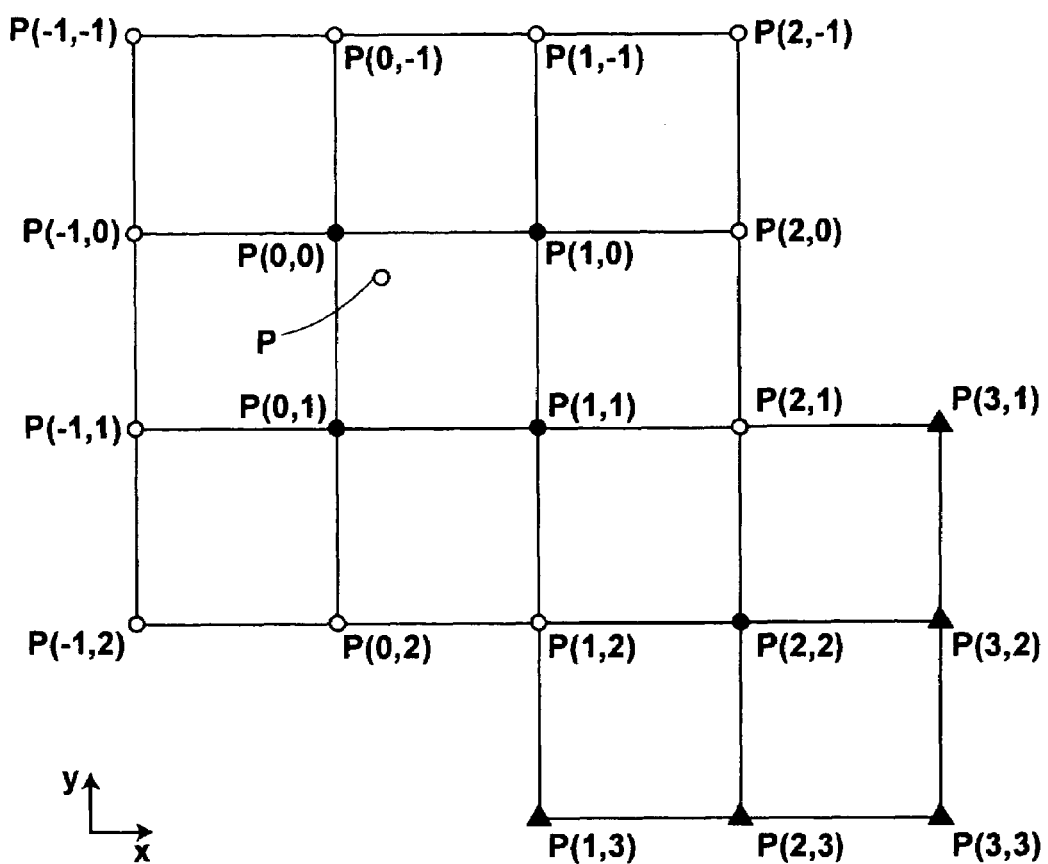
FIG. 48 is a diagram for explaining processing performed by a filtering unit 312.

As illustrated in FIG. 46, the edge detection unit 310 includes a filtering unit 312, a judgment unit 314, and an edge pattern classification unit 316. First, the filtering unit 312 performs filtering processing, by using the difference filter illustrated in FIG. 5, on each pixel pair including two mutually adjacent pixels in a 4×4 pixel block of 16 pixels (16 pixels, P (i, j), (i, j=−1 to 2), which are illustrated in FIG. 48, hereinafter referred to as "16 pixels of the interpolation pixel P"), which are located in the vicinity of the interpolation pixel P in the image S0. Then, the filtering unit 312 calculates the difference in pixel value between each pixel pair (hereinafter, the difference between the pixel pair of adjacent pixels is referred to as "d"). Here, the two mutually adjacent pixels are not limited to two pixels such as the pair of P(−1, 0) and P(0, 0), which are adjacent to each other in the x direction of the arrangement direction of the pixels, or the pair of P(−1, −1) and P(−1, 0), which are adjacent to each other in the y direction of the arrangement direction of the pixels. The two mutually adjacent pixels also include two pixels such as the pair of P(−1, −1) and P(0, 0) or the pair of P(0, 1) and P(1, 0), which are adjacent to each other in the diagonal directions of a 2×2 pixel block.

The judgment unit 314 judges whether the absolute value of the difference d is equal to or larger than a predetermined threshold value Th. If the judgment is YES, the judgment unit 314 judges that there is an edge between the pixel pair corresponding to the difference, and outputs the judgment result to the edge pattern classification unit 316.

Further, if one of two pixels in the pixel pair, between which an edge is judged to exist, is a pixel, which is located at the most periphery of a 4×4 pixel block of 16 pixels surrounding the interpolation pixel P, which are illustrated in FIG. 48 (In FIG. 48, 12 pixels, P(−1, −1), P(0, −1), P(1, −1), P(2, −1), P(2, 0), P(2, 1), P(2, 2), P(1, 2), P(0, 2), P(−1, 2), P(−1, 1), and P(−1, 0), hereinafter, referred to as "peripheral pixels".), the filtering unit 312 calculates the difference in pixel value between two mutually adjacent pixels in 2×2 pixel group, to which each of pixels, which are not included in the 16 pixels of the interpolation pixel P but adjacent to the peripheral pixel, belongs to. The judgment unit 314 judges whether there is an edge between the pixel pair, between which the difference in pixel value has been obtained.

For example, as illustrated in FIG. 48, if it is judged that there is an edge between the pixel P(2, 2) and the pixel P(1, 1), since the pixel P(2, 2) is the peripheral pixel, the pixels, which are adjacent to the pixel (2, 2) but not included in the 16 pixels of the interpolation pixel P are pixels, P(3, 1), P(3, 2), P(3, 3), P(2, 3), and P(1, 3) (▲ in FIG. 48). In this case, the difference in pixel value between the two pixels in each pixel pair is calculated for each of pixel pairs, P(2, 1) and P(3, 1), P(2, 1) and P(3, 2), P(3, 1) and P(3, 2), P(3, 1) and P(2, 2), P(3, 2) and P(2, 2), P(2, 2) and P(2, 3), P(2, 2) and P(3, 3), P(3, 2) and P(3, 3), P(3, 2) and P(2, 3), P(3, 3) and P(2, 3), P(1, 2) and P(1, 3), P(1, 2) and P(2, 3), P(2, 2) and P(1, 3), P(2, 2) and P(2, 3), and P(1, 3) and P(2, 3). Accordingly, the judgment unit 314 judges whether there is an edge between each pixel pair.

Further, for example, if it is judged that there is an edge between the pixel P(2, 2) and the pixel P(1, 2), since the pixel P (1, 2) is also a peripheral pixel, the same processing as described above is also performed on the pixel P(1, 2). If it is judged that there is an edge between the pixel P(2, 2) and the pixel P(2, 1), the same processing is also performed on the pixel P(2, 1). These judgment results are also output to the edge pattern classification unit 316.

The edge pattern classification unit 316 classifies the edge pattern within each 2×2 pixel block of four pixels based on the judgment result, which was output from the judgment unit 314. Here, the processing performed by the edge pattern classification unit 316 is the same as the processing performed by the edge pattern classification unit 216 in the image enlargement/reduction apparatus according to the embodiment illustrated in FIG. 36. Therefore, the detailed explanation is omitted.

Figure 49:
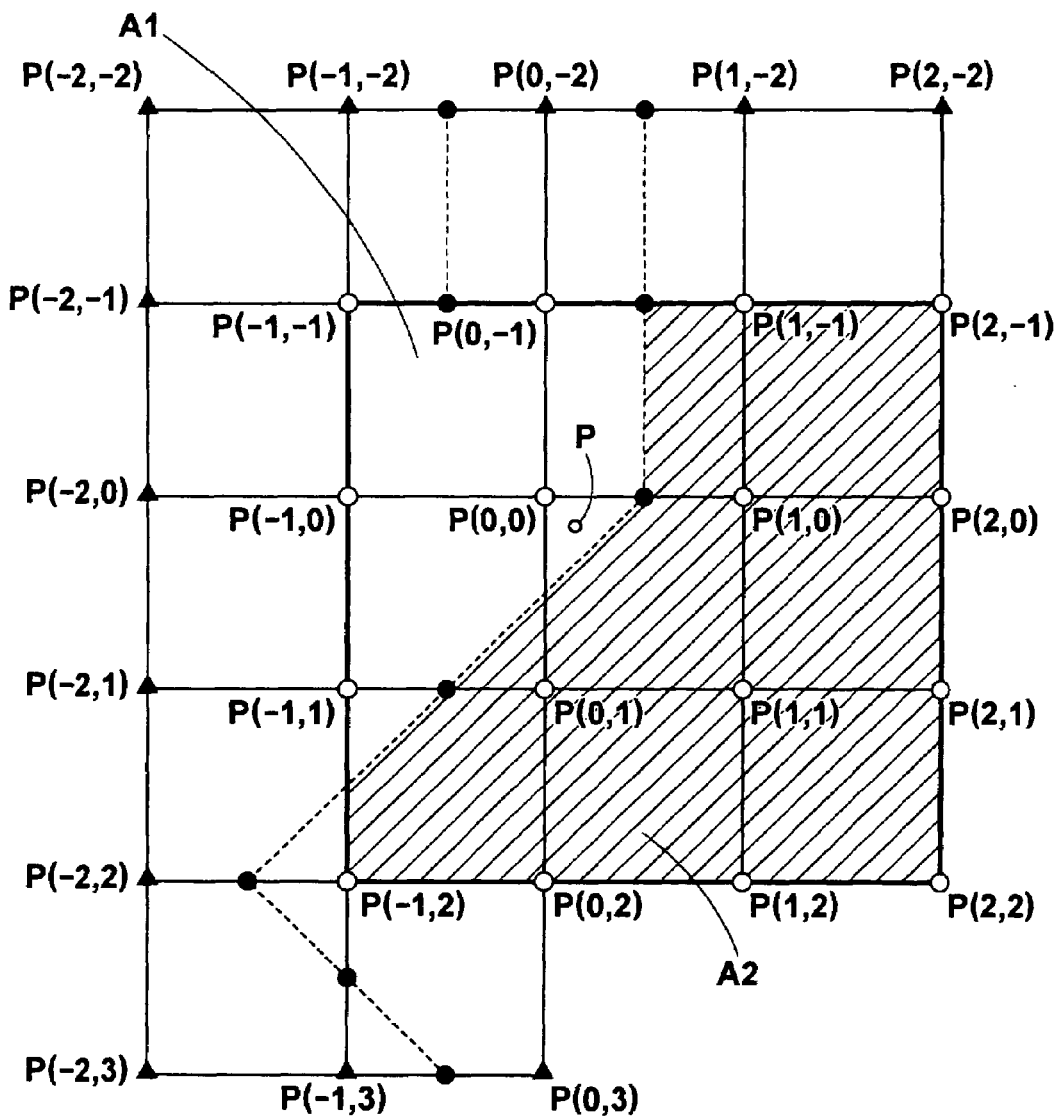
FIG. 49 is a diagram illustrating an example of a classification result by an edge pattern classification unit 316.

The edge pattern classification unit 316 performs edge pattern classification processing for each 2×2 pixel block of four pixels, and outputs the classification result to the intermediate value pixel judgment unit 320 and the interpolation operation unit 330. FIG. 49 shows an example of the classification result by the edge pattern classification unit 316. In this example, in the area within a bold black frame in FIG. 49, the edge pattern within four pixels, which are adjacent to the interpolation pixel P, is a pattern 4. The edge pattern of four pixels, P(−1, −1), P(0, −1), P(0, 0), and P(−1, 0), is a pattern 0. The edge pattern of four pixels, P(0, −1), P(1, −1), P(1, 0), and P(0, 0), is a pattern 5. The edge pattern of four pixels, P(1, −1), P(2, −1), P(2, 0), and P(1, 0), is the pattern 0. The edge pattern of four pixels, P(−1, 0), P(0, 0), P(0, 1), and P(−1, 1), is a pattern 2. The edge pattern of four pixels, P(1, 0), P(2, 0), P(2, 1), and P(1, 1), is the pattern 0. The edge pattern of four pixels, P(−1, 1), P(0, 1), P(0, 2), and P(−1, 2), is a pattern 4. The edge pattern of four pixels, P(0, 1), P(1, 1), P(1, 2), and P(0, 2), is the pattern 0. The edge pattern of four pixels, P(1, 1), P(2, 1), P(2, 2), and P(1, 2), is the pattern 0. In the area outside the bold black frame, the edge pattern within four pixels, P(−1, −2), P(−1, −1), P(0, −1), and P(0, −2), is the pattern 5. The edge pattern within four pixels, P(−2, 1), P(−2, 2), P(−1, 2), and P(−1, 1), is the pattern 2. The edge pattern within four pixels, P(−2, 2), P(−2, 3), P(−1, 3), and P(−1, 2), is a pattern 1. The edge pattern within four pixels, P(−1, 2), P(−1, 3), P(0, 3), and P(0, 2), is a pattern 3. The edge pattern within the other four pixels is the pattern 0. In FIG. 49, these edge patterns are indicated by dotted lines. As illustrated in FIG. 49, the area within the 16 pixels (within the bold black frame illustrated in FIG. 49) surrounding the interpolation pixel P, is divided into two areas of an area A1 and an area A2 by the edge. The area A2 is a shaded area in FIG. 49.

Figure 47:
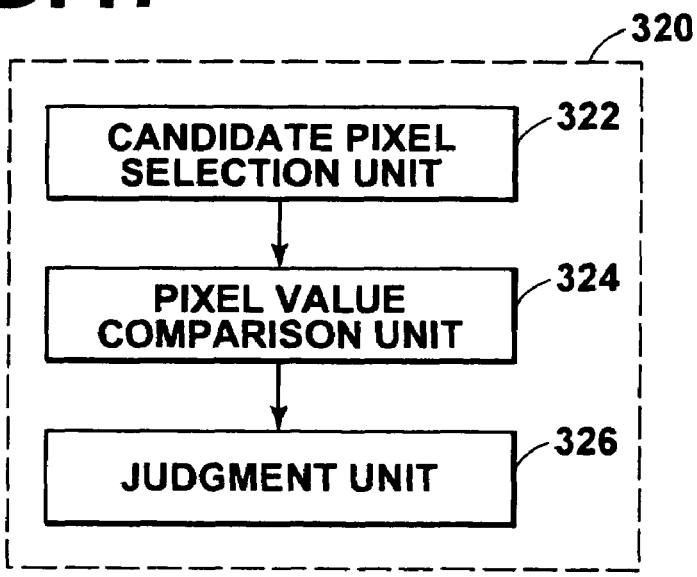
FIG. 47 is a block diagram illustrating the configuration of an intermediate value pixel judgment unit 320 in the image enlargement/reduction apparatus, which is illustrated in FIG. 45.

FIG. 47 is a block diagram illustrating the configuration of the intermediate value pixel judgment unit 320. The intermediate value pixel judgment unit 320 includes a candidate pixel selection unit 322 for selecting a candidate pixel for the intermediate value pixel, in the 4×4 pixel block of 16 pixels surrounding the interpolation pixel P, illustrated in FIG. 48. The intermediate value pixel judgment unit 320 also includes a pixel value comparison unit 324 for comparing the pixel values of three pixels among each other. The three pixels are a candidate pixel, which is selected by the candidate pixel selection unit 322, and two pixels on both sides of the candidate pixel. The intermediate value pixel judgment unit 320 also includes a judgment unit 326 for judging whether the candidate pixel is an intermediate value pixel based on the comparison result by the pixel value comparison unit 324. The judgment unit 326 outputs the judgment result to the interpolation operation unit 330. Specifically, first, the candidate pixel selection unit 322 checks, for each of 16 pixels in the 4×4 pixel block surrounding the interpolation pixel P, whether there is an edge between each pair of two mutually adjacent pixels among three serially adjacent pixels with the pixel at the middle among the three pixels. If there is an edge between each pair of two mutually adjacent pixels among the three pixels, the candidate pixel selection unit 322 further checks whether the directions of the two edges are the same. Only if the directions of the two edges are the same, the candidate pixel selection unit 322 selects the pixel as the candidate pixel. In the other cases, the candidate pixel selection unit 322 judges that the pixel is not the candidate pixel.

In the example illustrated in FIG. 49, only pixel P(0, −1) is selected as the candidate pixel. There are an edge between the pixel P(−1, 1) and the pixel P(−1, 2) and an edge between the pixel P(−1, 2) and the pixel P(−1, 3). However, since the directions of the two edges, which sandwich the pixel P(−1, 2), are not the same, the pixel P(−1, 2) is not selected as the candidate pixel.

The pixel value comparison unit 324 compares the pixel values of the above-mentioned three adjacent pixels (In the case of the pixel P(−1, 2), the pixel values of the pixel P(−1, 1), the pixel P(−1, 2), and the pixel P (−1, 3)) with each other, which correspond to the candidate pixel selected by the candidate pixel selection unit 322, and outputs the comparison result to the judgment unit 326.

The judgment unit 326 judges, based on the comparison result from the pixel value comparison unit 324, that the candidate pixel is the intermediate value pixel if the compared pixel values of the three pixels (with the candidate pixel located at the middle among the three pixels) monotonically increase or monotonically decrease along the arrangement direction of the three pixels. Here, it is assumed that the candidate pixel P(0, −1) is judged to be the intermediate value pixel.

The edge detection result by the edge detection unit 310 and the judgment result by the intermediate value pixel judgment unit 320 are output to the interpolation operation unit 330. The interpolation operation unit 330 calculates the pixel value of the interpolation pixel P based on the two results. Specifically, if there is no edge within the 2×2 pixel block, which is adjacent to the interpolation pixel P, the interpolation operation unit 330 calculates the pixel value of the interpolation pixel P using the bicubic method. The interpolation operation by the bicubic method is similar to the first interpolation operation, which is performed by the interpolation operation unit 230. Therefore, the detailed descriptions are omitted. In the following descriptions on the present embodiment, the operation for calculating the pixel value of the interpolation pixel P using the bicubic method when there is no edge within the 2×2 pixel block, which is adjacent to the interpolation pixel P, is referred to as a first interpolation operation in the present embodiment.

Figure 51:
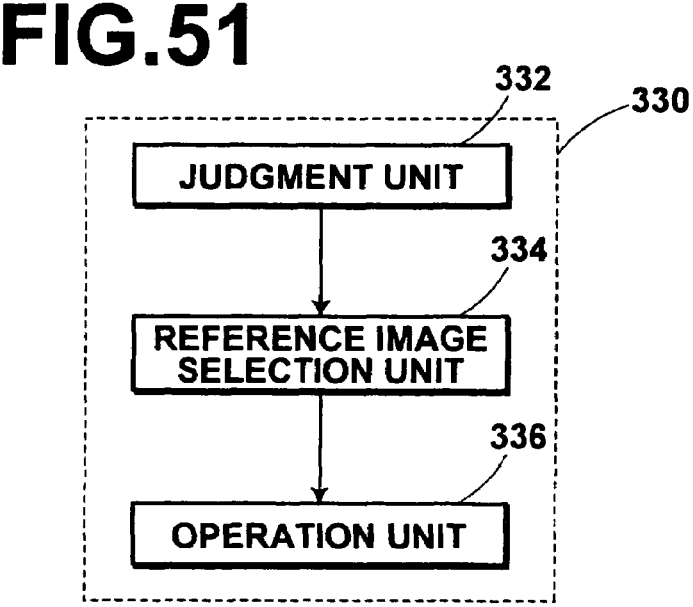
FIG. 51 is a block diagram illustrating the configuration of an interpolation operation unit 330 in the image enlargement/reduction apparatus, which is illustrated in FIG. 45.

Meanwhile, if there is an edge within the 2×2 pixel block, which is adjacent to the interpolation pixel P, the interpolation operation unit 330 calculates the pixel value of the interpolation pixel P by a second interpolation operation. Here, the second interpolation operation by the interpolation operation unit 230 will be specifically described with reference to the configuration of the interpolation operation unit 330, which is illustrated in FIG. 51, and the example illustrated in FIG. 49.

Figure 50:
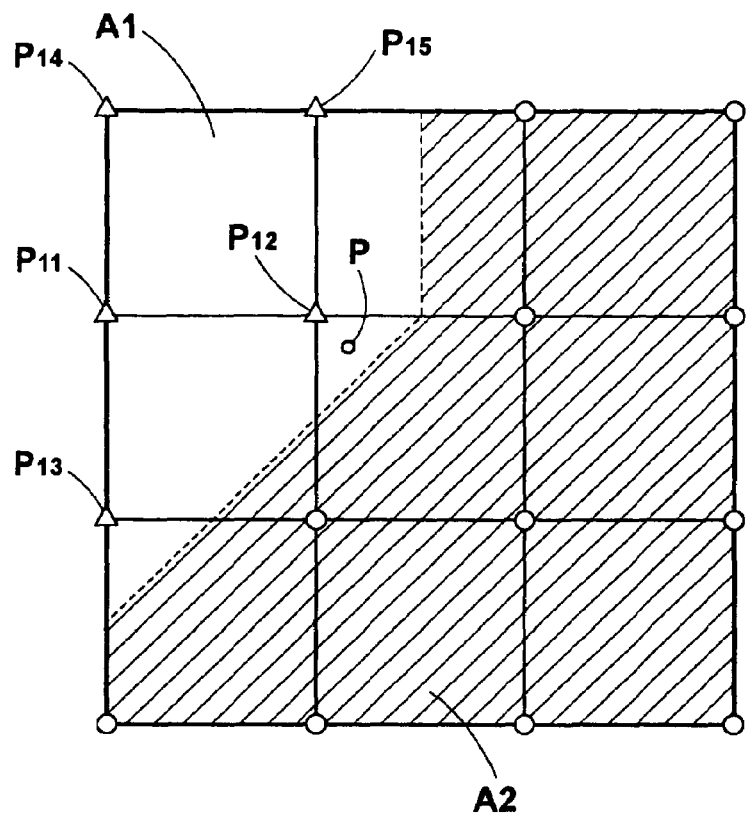
FIG. 50 is a diagram for explaining an interpolation operation (second interpolation operation D2), which is performed if there is an edge within 2×2 pixel of four pixels, which are adjacent to an interpolation pixel P.

Here, for the purpose of simplifying the explanation, only the area within the bold black frame in FIG. 49 is illustrated in FIG. 50. In FIG. 50, the pixels, P(−1, −1), P(−1, 0), P(−1, 1), P(0, 0), and P(0, −1) are replaced by signs P14, P11, P13, P12, and P15, respectively. As illustrated in FIG. 50, the area within the 16 pixels surrounding the interpolation pixel P is divided into two areas of the area A1 and the area A2 by the edge. The area A2 is illustrated as a shaded area. First, a judgment unit 332 in the interpolation operation unit 330 judges, based on the edge pattern within the 16 pixels, on which side of the edge the interpolation pixel exists. Then, a reference pixel selection unit 334 in the interpolation operation unit 330 selects a pixel, which is located on the same side of the edge as the interpolation pixel P, as the reference pixel, which is used for the interpolation operation. For example, if the interpolation pixel P exists in the area A1 as illustrated in FIG. 50, the reference pixel selection unit 334 selects the pixels P11, P12, P13, P14, and P15 (illustrate with Δ in FIG. 50) as the pixels, which are used for the interpolation operation. Next, an operation unit 336 in the interpolation operation unit 330 checks whether there is a pixel, which is judged to be the intermediate value pixel by the intermediate value pixel judgment unit 320. If there is the intermediate value pixel, the interpolation operation unit 330 sets the weight of the intermediate value pixel to 0. Setting the weight of the intermediate value pixel to 0 is the same as not using the intermediate value pixel as the reference pixel. Next, the operation unit sets the first weight W for each of the reference pixels based on the distance between the interpolation pixel P and each of the reference pixels so that a more weight is given to the pixel, which is closer to the interpolation pixel P. The operation unit 336 performs the interpolation operation according to the following equations (8), and calculates the pixel value of the interpolation pixel P:

$$Pt = \sum_{i=1}^{4} WiPti \text{ wherein,} \quad (8)$$

$$\sum_{i=1}^{4} Wi = 1$$

Figure 52:
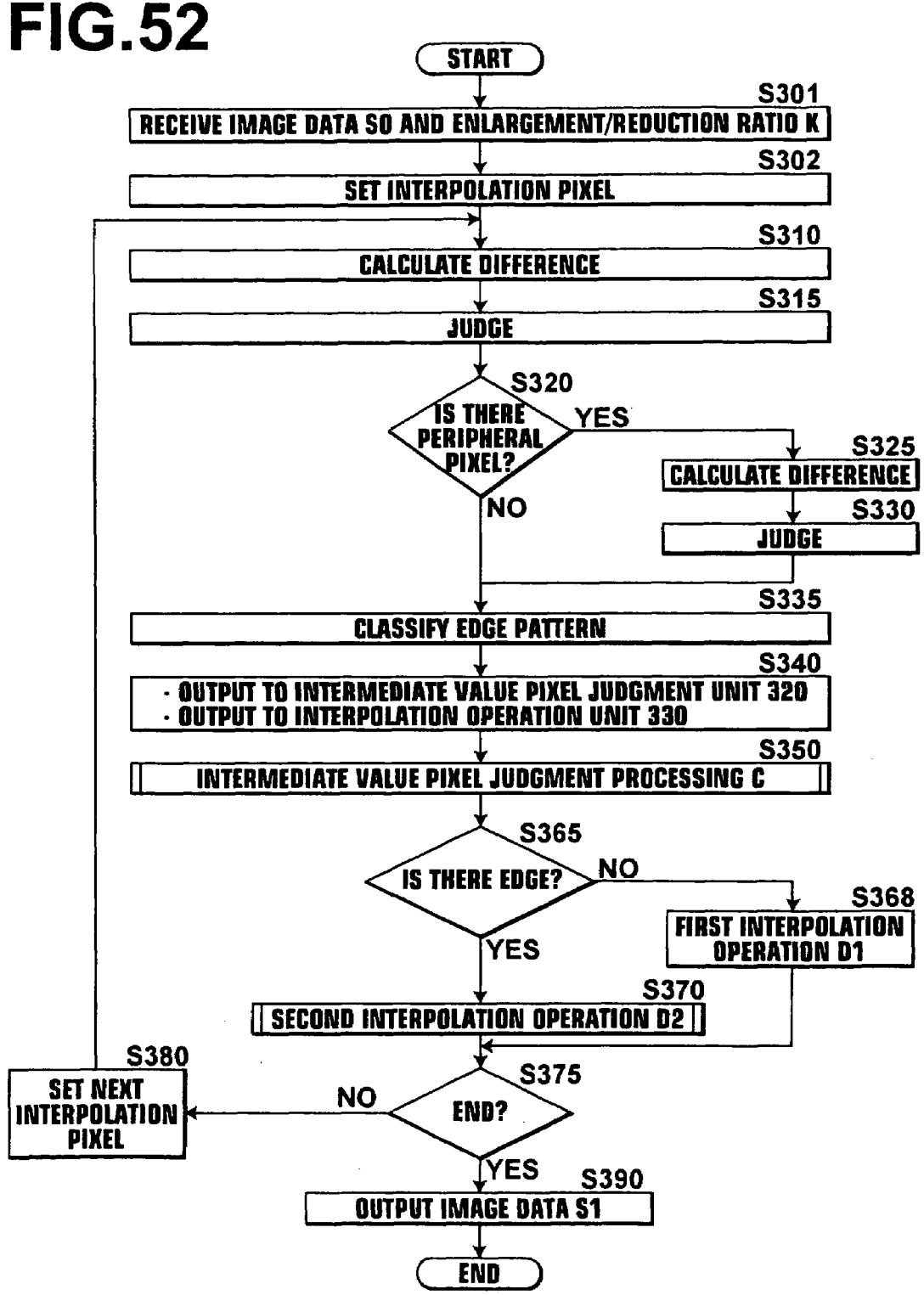
FIG. 52 is a flow chart illustrating processing performed in the present embodiment.

FIG. 52 is a flow chart illustrating processing performed in the present embodiment. In the present embodiment, it is assumed that the interpolation pixel P is located between pixels in the image S0. First, the input unit 301 receives an input of image data S0, on which enlargement or reduction processing will be performed, and an enlargement/reduction ratio K of the image data S0 (step S301). Then, the filtering unit 312 performs filtering processing, based on the enlargement/reduction ratio K, on a pixel pair including two adjacent pixels, within the 4×4 pixel block of 16 pixels (16 pixels surrounding the interpolation pixel P), which are located in the vicinity of a first interpolation pixel P (a pixel located in the upper left corner of the image, which is represented by the enlarged/reduced image data S1) by using a difference filter. Then, the filtering unit 312 calculates the difference in pixel value between each pixel pair (step S310).

Next, the judgment unit 314 judges whether there is an edge between the two pixels in each pixel pair based on whether the absolute value of the difference in pixel value between each pixel pair is equal to or larger than a predetermined threshold value Th. Specifically, if the absolute value of the difference in pixel value between the pixel pair is equal to or larger than the threshold value Th, the judgment unit 314 judges that there is an edge between the two pixels in the pixel pair. If the absolute value of the difference in pixel value between the pixel pair is less than the threshold value Th, the judgment unit 314 judges that there is no edge between the two pixels in the pixel pair. Next, the judgment unit 314 judges whether one of the two pixels in the pixel pair, between which it is judged that there is an edge, is a peripheral pixel (step S315). If the judgment is YES (step S320:YES), the filtering unit 312 obtains the difference between two mutually adjacent pixels in the 2×2 pixel group, to which the pixel, which is not included in the 16 pixels of the interpolation pixel P but adjacent to the peripheral pixel, belongs to. The filtering unit 312 outputs the result to the judgment unit 314 (step S325). The judgment unit 314 judges whether there is an edge between the pixel pair, between which the difference in pixel value has been obtained (step S330).

The edge pattern classification unit 316 classifies the edge pattern in each 2×2 pixel block based on the judgment result by the judgment unit 314 (step S335), and outputs the classification result to the intermediate value pixel judgment unit 320 and the interpolation operation unit 330 (step S340). The intermediate value pixel judgment unit 320 judges the intermediate value pixel in the 16 pixels of the interpolation pixel P. The intermediate value pixel judgment unit 320 outputs the judgment result to the interpolation operation unit 330 (step S350). If the edge pattern in each 2×2 pixel block in the 16 pixels is the pattern 0 based on the classification result by the edge pattern classification unit 316, the interpolation operation unit 330 judges that there is no edge within the 16 pixels of the interpolation pixel P (step S365: NO). The interpolation operation unit 330 also performs a first interpolation operation D1, namely the interpolation operation using the bicubic interpolation method, and obtains the pixel value of the interpolation pixel P (step S368). Meanwhile, if there is a 2×2 pixel block, of which edge pattern is not the pattern 0, within the area of 16 pixels surrounding the interpolation pixel P, the interpolation operation unit 330 judges that there is an edge within the 16 pixels surrounding the interpolation pixel P (step S365: YES). The interpolation operation unit 330 also performs the second interpolation operation D2, and obtains the pixel value of the interpolation pixel P (step S370).

The control unit 350 judges whether the pixel values of all the interpolation pixels P in the image S0 have been calculated (step S375). If step S375 is NO, the control unit 350 sets an interpolation pixel P, of which pixel value should be calculated, as the next interpolation pixel P (step S380). The processing goes back to the process from step S310. Meanwhile, if step S380 is YES, the control unit 350 outputs the enlarged/reduced image data S1 including the interpolation pixel P (step S390), and the processing ends.

Figure 53:
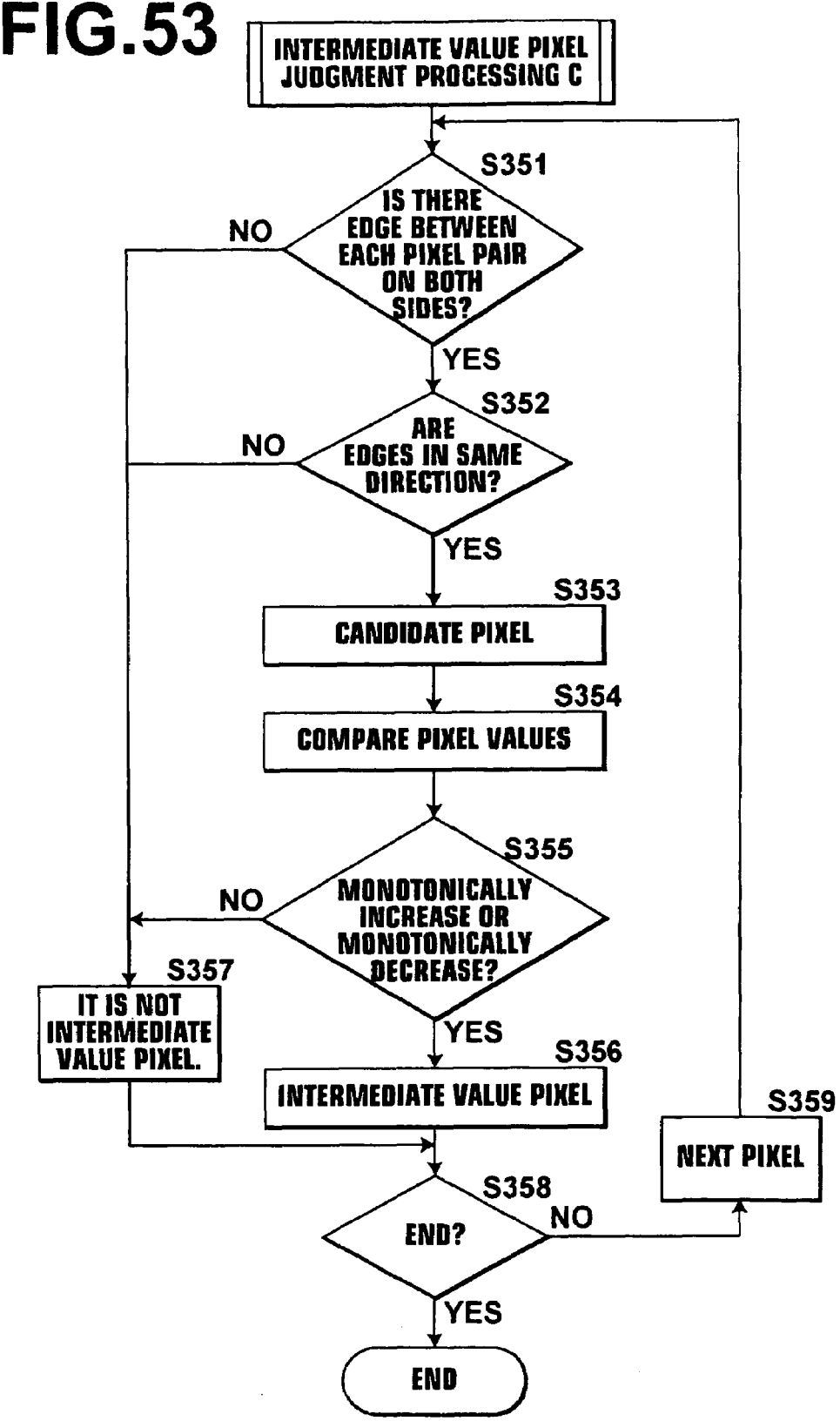
FIG. 53 is a flow chart illustrating intermediate value pixel judgment processing C.

FIG. 53 is a flow chart illustrating intermediate value pixel judgment processing C in step S350 in details. As illustrated in FIG. 53, the candidate pixel selection unit 322 in the intermediate value pixel judgment unit 320 checks, for each of the 16 pixels in each 4×4 block surrounding the interpolation pixel P, whether there is an edge between each pair of two mutually adjacent pixels among three serially adjacent pixels with the pixel at the middle among the three pixels (step S351). If there is an edge between each pair of two adjacent pixels among the three pixels (step S351: YES), the candidate pixel selection unit 322 further checks whether the directions of the two edges are the same (step S352). Only if the directions of the two edges are the same (step S352: YES), the candidate pixel selection unit 322 selects the pixel as the candidate pixel (step S353).

Next, the pixel value comparison unit 324 compares the pixel values of the above-mentioned three adjacent pixels, which correspond to the candidate pixel selected by the candidate pixel selection unit 322 in step S353, and outputs the comparison result to the judgment unit 326 (step S354).

If the compared pixel values of the three pixels monotonically increase or monotonically decrease along the arrangement direction of the three pixels (step S355: YES), the judgment unit 326 judges that the candidate pixel is the intermediate value pixel (step S356). In the other cases (step 351: NO, or step S351: YES and step S352: NO, or step S351:

YES, step S352: YES and step S355: NO), the judgment unit 326 judges that the pixel is not the intermediate value pixel (step S357).

If the judgment on whether the pixel is the intermediate pixel has been performed for all of the 16 pixels of the interpolation pixel P (step S358:YES), the control unit 350 causes the intermediate value pixel judgment unit 320 to end the processing. However, if there is a pixel, on which judgment has not been made (step S358:NO), the control unit 350 causes the intermediate value pixel judgment unit 320 to judge the next pixel (step S359), and the processing goes back to step S351.

FIG. 54 is a flow chart illustrating a second interpolation operation D2, which is performed by the interpolation operation unit 330 when there is an edge within 2×2 pixels, which are adjacent to the interpolation pixel P. As illustrated in FIG. 54, the interpolation operation unit 330 judges on which side of the edge the interpolation pixel P exists in the area of 16 pixels (step S371). Then, the interpolation operation unit 330 selects the pixel, which is located on the same side of the edge as the interpolation pixel P, as the reference pixel (step S372). Next, the interpolation operation unit 330 sets the weight Q of the reference pixel, which is judged as the intermediate value pixel by the intermediate value pixel judgment unit 320, to 0 to remove the intermediate value pixel from the reference pixel. The interpolation operation unit 320 performs the interpolation operation by using the pixel value of the reference pixel, which is not the intermediate value pixel, and obtains the pixel value of the interpolation pixel P.

As described above, in the image enlargement/reduction apparatus according to the present embodiment, the judgment is accurately made on whether the reference pixel is the intermediate value pixel instead of making the judgment on the possibility that the reference pixel is the intermediate value pixel. When the interpolation operation is performed by using the pixel value of the reference pixel to obtain the pixel value of the interpolation pixel, the weight of the reference pixel, which is the intermediate value pixel, is set to 0. Accordingly, the intermediate value pixel can be removed from the reference pixel, and the quality of the enlarged/reduced image can be improved.

Here, the weight given the reference pixel, which is judged to be the intermediate value pixel, is set to 0. However, a less weight, which is not 0, may be given to the reference pixel, which is the intermediate value pixel, than the weight given to the reference pixel, which is not the intermediate value pixel.

In the third and four embodiments as described above, only the pixel that is located on the same side of the edge as the interpolation pixel P, is selected as the reference pixel. However, the pixel, which is located on the opposite side of the edge from the interpolation pixel P may be also used as the reference pixel. In this case, a less weight should be given to the reference pixel, which is located on the opposite side of the edge from the interpolation pixel P than the weight given to the reference pixel, which is located on the same side of the edge as the interpolation pixel P. The weight, which is given at this time, is a third weight, which is different from the first weight W according to the distance from the interpolation pixel P and the second weight Q according to the possibility that the pixel is the intermediate value pixel, as described above.

As it is clear from the above description, a different weight (the above-mentioned second weight) is given to the reference pixel depending on whether the reference pixel is an edge neighboring pixel or whether the reference pixel is an intermediate value pixel. The second weight is different from the weight (the above-mentioned first weight), which is defined by the interpolation operation method. The weight in the present invention refers to the second weight as described above. Therefore, if the interpolation operation method is a method using the weighting addition of the pixel values of the reference pixels by giving the first weight to each of the reference pixels according to the distance from each of the reference pixels, the final weight of each of the reference pixels is a value, which is obtained by multiplying the first weight by the second weight. Therefore, the final weight of the reference pixel, of which second weight is small, is not always less than the final weight of the reference pixel, of which second weight is large.

FIG. 55 is a block diagram illustrating the configuration of an image enlargement/reduction apparatus according to a fifth embodiment of the present invention. As illustrated in FIG. 55, the image enlargement/reduction apparatus according to the present invention includes an input unit 401 for receiving an input of image data S0 and an enlargement/reduction ratio K of the image data S0. The image enlargement/reduction apparatus also includes an edge detection unit 410, an edge merger unit 420, and an interpolation operation unit 430 for calculating the pixel value of an interpolation pixel. The image enlargement/reduction apparatus also includes a control unit 450 for controlling the operations of the input unit 401, the edge detection unit 410, the edge merger unit 420, and the interpolation operation unit 430.

Figure 56:
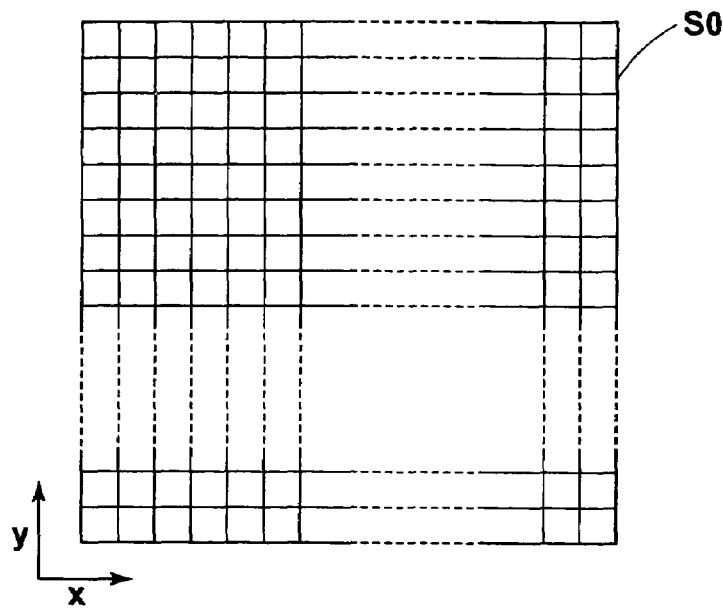
FIG. 56 is a diagram illustrating a pixel arrangement in an image represented by image data.

Here, an image represented by the image data S0 is composed of pixels, which are arranged two-dimensionally as illustrated in FIG. 56. In the following explanation, it is assumed that the x direction and the y direction are set as illustrated in FIG. 56. Further, in the following explanation, the image data and the image, which is represented by the image data, are not discriminated from each other, and the same reference numeral (S0 in this case) is assigned to both of them.

Figure 57:
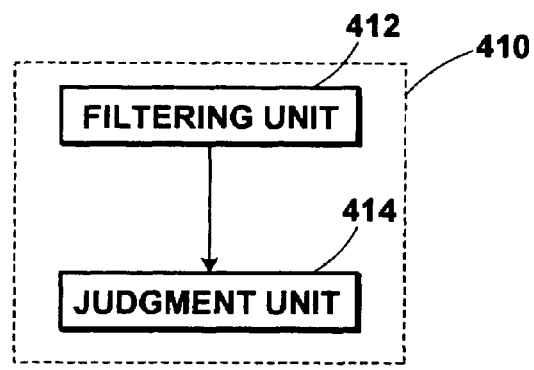
FIG. 57 is a block diagram illustrating the configuration of an edge detection unit 410 in the image enlargement/reduction apparatus, which is illustrated in FIG. 55.

FIG. 57 is a block diagram illustrating the configuration of the edge detection unit 410 in the image enlargement/reduction apparatus of the present embodiment. As illustrated in FIG. 57, the edge detection unit 410 includes a filtering unit 412 and a judgment unit 414, which judges whether there is an edge between two adjacent pixels.

The filtering unit 412 performs filtering processing as described below. The filtering unit 412 performs filtering processing for each low or column in each of the x direction and the y direction of the image S0 as illustrated in FIG. 4. The filtering unit 412 performs filtering processing on three pixel pairs (G1, G2), (G2, G3), and (G3, G4), each including two mutually adjacent pixels among four serially adjacent pixels G1-G4 by using a difference filter. The four serially adjacent pixels G1-G4 include two adjacent pixels G2 and G3 and two pixels, which are adjacent to the two pixels G2 and G3, respectively. The filtering unit 412 calculates the difference in pixel value between each pixel pair (G1, G2), (G2, G3), and (G3, G4) as primary difference d1, d2, and d3, respectively.

FIG. 5 is a diagram illustrating an example of the difference filter. As illustrated in FIG. 5, the difference filter, which is used in the present embodiment, is a two-tap filter with a filter value of (−1, 1). The difference filter is not limited tot his filter. A filter with a filter value for obtaining a weighting difference between two pixel values in a pixel pair or a filter, which has an even number of taps, which is two taps or more, may also be used as the filter.

Then, the filtering unit 412 performs filtering processing on two adjacent primary difference pairs (d1, d2) and (d2, d3) among the three primary differences d1, d2, and d3 by using the difference filter, which is illustrated in FIG. 5. The filtering unit 412 calculates a difference in difference value between the primary difference pair (d1, d2) and (d2, d3) as secondary differences d4 and d5, respectively.

Further, the filtering unit 412 performs filtering processing on the pixel pair (G2, G3), including two pixels which are located at the middle of the serially adjacent pixels G1-G4. Then, the filtering unit 412 calculates a difference d0 (=d2) in pixel value between the pixel pair (G2, G3). The primary difference d2 as described above may be used as the difference d0 without calculating d0.

The judgment unit 414 performs first judgment. In the first judgment, the judgment unit 414 judges whether there is an edge between two adjacent pixels G2 and G3 based on the relationship of the positives/negatives of the primary differences d1, d2, and d3 and the secondary differences d4 and d5.

The judgment unit 414 stores the tables illustrated in FIGS. 6-8. If the relationship of the positives/negatives of the preliminary differences d1, d2, and d3 and the secondary differences d4 and d5 among the four serially adjacent pixels is the relationship of the edge 1 or the edge 2, which is illustrated in FIG. 6, the judgment unit 414 judges that there is an edge between the two adjacent pixels G2 and G3. If the relationship of the positives/negatives of the differences is the relationship indicating a peak, trough, or the like, which is illustrated in FIGS. 7 and 8, the judgment unit 414 judges that there is no edge between the two adjacent pixels G2 and G3.

Figure 58:
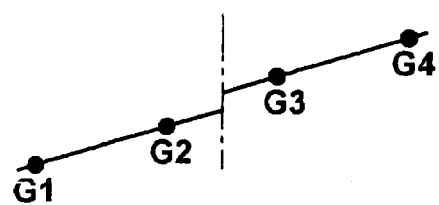
FIG. 58 is a diagram illustrating an example of a profile shape, which is judged to be a profile shape indicating an edge even though a difference in pixel value between two adjacent pixels is very little.

Further, if the judgment unit 414 judges that there is an edge in the first judgment as described above, the judgment unit 414 further performs a second judgment. In the second judgment, the judgment unit 414 judges whether the absolute value of the difference d0 between the pixel values of the pixels G2 and G3 is equal to or larger than a predetermined threshold value Th1. If the second judgment is YES, the judgment unit 414 judges that there is a true edge between the pixels G2 and G3. Meanwhile, if the second judgment is NO, the judgment unit 414 judges that there is no true edge between the pixels G2 and G3. The second judgment is made to prevent the interpolation operation unit 430 from performing an interpolation operation as described later in the case that even if the judgment unit 414 judges that there is an edge in the first judgment, the difference in pixel value between the pixels G2 and G3 is very little and it is regarded as a noise as illustrated in FIG. 58, for example. If the noise is regarded as an edge and the interpolation operation, which is appropriate for an edge part, is performed on the noise part, the noise is emphasized on the contrary. The judgment unit 414 makes the judgment on the difference in pixel value between each pair of two adjacent pixels, and the edge detection unit 410 outputs the judgment result to the edge merger unit 420.

The edge merger unit 420 detects whether there is a pair of adjacent edges in the edges detected by the edge detection unit 410. The adjacent edges are the edges, which are detected when there is an edge between each pair of two adjacent pixels among three serially adjacent pixels. The edge merger unit 420 merges the detected adjacent edges at the position of the pixel between the adjacent edges. For example, in the pixel string illustrated in FIG. 4, if an edge is detected between pixels G1 and G2 and between pixels G2 and G3, the edge merger unit 420 merges the two edges at the position of the pixel G2. Therefore, the edge is located only at the position of the pixel G2 between the pixel G1 and pixel G3. There is no edge between the pixel G1 and the pixel G2. There is no edge between the pixel G2 and the pixel G3.

Figure 59:
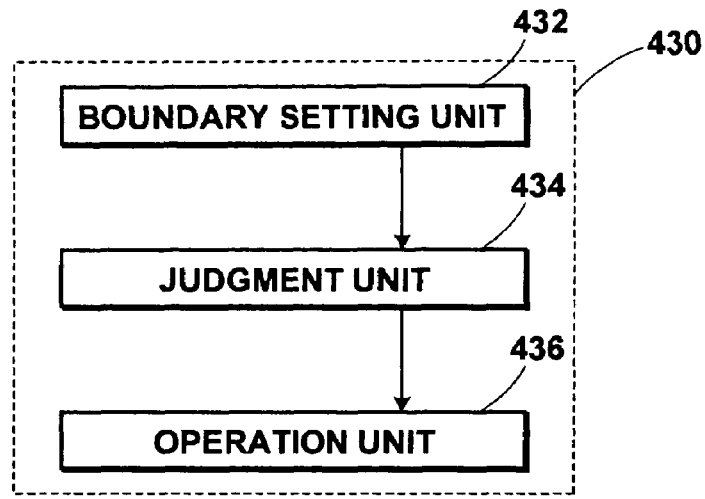
FIG. 59 is a block diagram illustrating the configuration of an interpolation operation unit 430 in the image enlargement/reduction apparatus, which is illustrated in FIG. 55.
Figure 60:
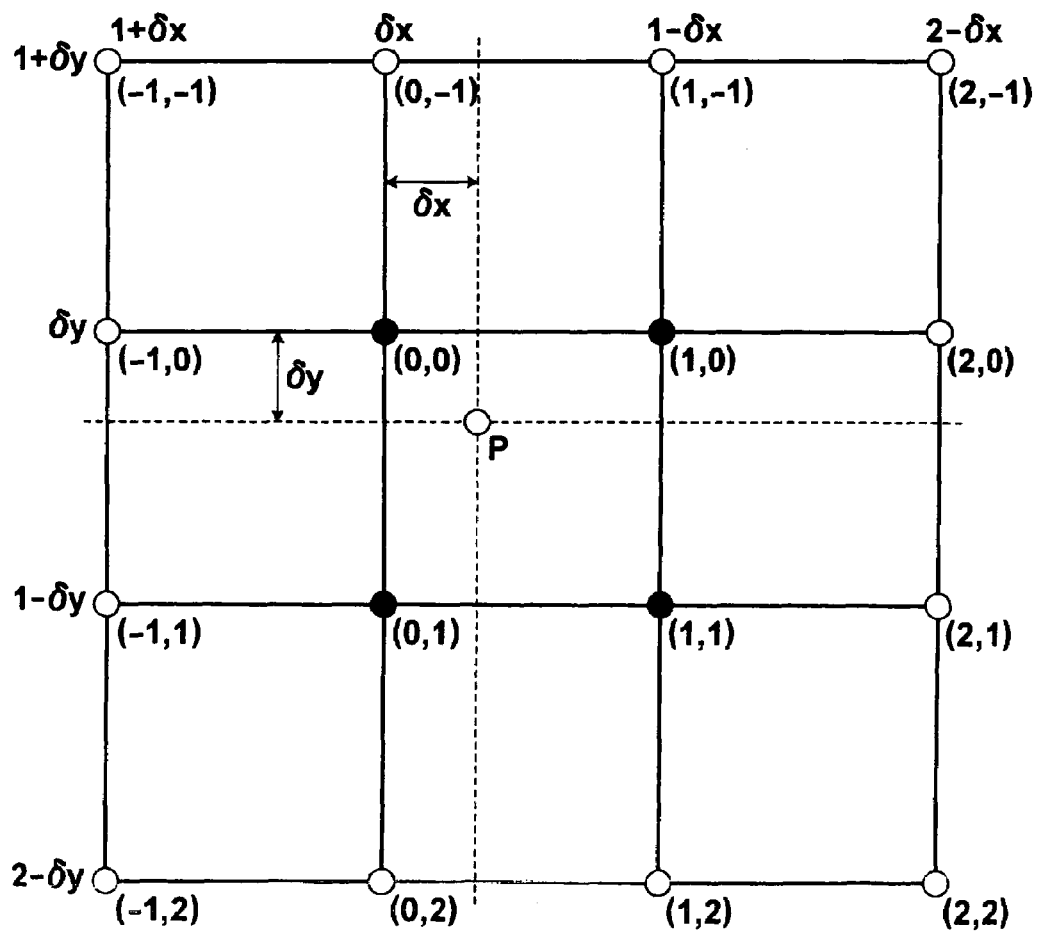
FIG. 60 is a diagram for explaining a bicubic method.

FIG. 59 is a block diagram illustrating the configuration of the interpolation operation unit 430 in the image enlargement/reduction apparatus. As illustrated in FIG. 59, the interpolation operation unit 430 includes a boundary setting unit 432, a judgment unit 434 and an operation unit 436. The interpolation operation unit 430 calculates the pixel value of an interpolation pixel P, which is located between pixels in the image S0. The interpolation operation unit 430 will be described in details below.

If there is no edge between two adjacent pixels, between which the interpolation pixel P is located or at the positions of the two adjacent pixels, the interpolation operation unit 430 calculates the pixel value of the interpolation pixel P using the bicubic method. Here, the detailed explanation on the bicubic method is omitted.

In the present embodiment, it is assumed that the bicubic method is applied only to a one-dimensional direction in either the x direction or the y direction to calculate the pixel value of the interpolation pixel P.

Figure 61A:
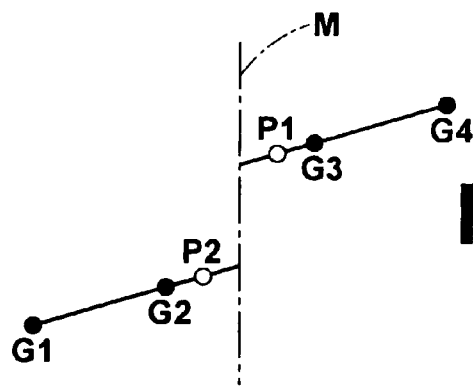
FIG. 61A is a diagram for explaining calculation of a pixel value of an interpolation pixel in a part, which is judged to be an edge (second interpolation operation B2)
Figure 61B:
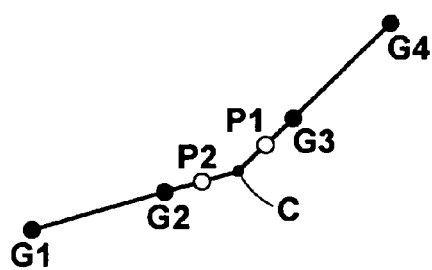
FIG. 61B is a diagram for explaining calculation of a pixel value of an interpolation pixel in a part, which is judged to be an edge (second interpolation operation B2)

Meanwhile, the interpolation operation unit 430 obtains the pixel value of the interpolation pixel P in the part, which is judged to be an edge, as described below. First, the case in which the edge is located between the pixels will be described. FIGS. 61A and 61B are diagrams illustrating the profiles of the pixel values in the part, which is judged to include an edge between the pixels. In FIGS. 61A and 61B, the arrangement direction of the pixels is the horizontal direction. The magnitude of the pixel values is represented in the vertical direction. If it is judged that there is an edge between two adjacent pixels, the profile of pixel values of four serially adjacent pixels G1-G4 is as illustrated in FIG. 61A or FIG. 61B. The four serially adjacent pixels G1-G4 are the two pixels G2 and G3 and two pixels G1 and G4, which are adjacent to the pixels G2 and G3, respectively.

If the profile has a step-edge shape as illustrated in FIG. 61A, the boundary setting unit 432 sets a median line M (dot-dashed line), which bisects the distance between the pixels G2 and G3 in the arrangement direction of the pixels as a boundary line. Then, the judgment unit 434 judges whether the interpolation pixel P is located on the right side of the boundary line M or the left side of the boundary line M. If the interpolation pixel P (referred to as "P1") is located on the right side of the boundary line M, the operation unit 436 calculates a value on the extended line of a straight line, which connects the pixels G3 and G4, as the pixel value of the interpolation pixel P1. If the interpolation pixel P (referred to as "P2") is located on the left side of the boundary line M, the operation unit 436 calculates a value on the extended line of a straight line, which connects the pixels G1 and G2, as the pixel value of the interpolation pixel P2.

If the profile has an edge shape as illustrated in FIG. 61B, the boundary setting unit 432 sets an intersection C of the extended line of the straight line, which connects the pixels G1 and G2, and the extended line of the straight line, which connects the pixels G3 and G4, as a boundary point. Then, the judgment unit 434 judges whether the interpolation pixel P is located on the right side of the boundary point C or the left side of the boundary point C. If the interpolation pixel P1 is located on the right side of the boundary point C, the operation unit 436 calculates a value on the extended line of the straight line, which connects the pixels G3 and G4, as the pixel value of the interpolation pixel P1. If the interpolation pixel P2 is located on the left side of the boundary point C, the operation unit 436 calculates a value on the extended line of a straight line, which connects the pixels G1 and G2, as the pixel value of the interpolation pixel P2.

Here, only the pixel values of two pixels are used to calculate the pixel value of the interpolation pixel P. However, three or more pixel values may be used. If three or more pixel values are used, it is difficult to connect the pixels with a straight line in some cases. Therefore, the pixels may be connected with a curve, which is defined by an arbitrary function, such as a spline curve. A value on the extended line of the curve may be used as the pixel value of the interpolation pixel P.

Next, the case, in which the edge is located at the position of a pixel, will be described. Specifically, it is the case, in which the edge merger unit 420 has merged two adjacent edges at the position of the pixel, which is sandwiched by the two adjacent edges. Calculation of the pixel value of the interpolation by the interpolation operation unit 430 will be described.

Figure 62A:
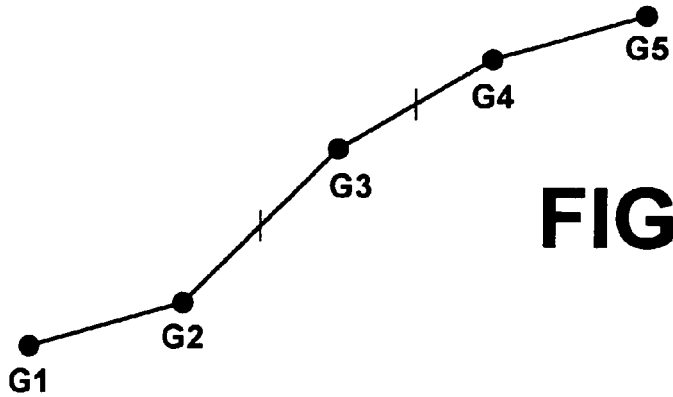
FIG. 62A is a diagram for explaining calculation of a pixel value of an interpolation pixel in a part, which is judged to be an edge (third interpolation operation B3)

First, in this case, the profile of the pixel values of three pixels, which sandwich each of adjacent edges, and the pixel values of two pixels, which are adjacent to two pixels, which are located outside the adjacent edges among the three pixels, will be described. FIG. 62A is a diagram illustrating an example of the profile as described above in the case that an edge in the pair of adjacent edges is an edge, which belongs to the type of (d1, d2, de, d4, d5)=(+, +, +, +, −) in the edge 1, which is illustrated in FIG. 6, and the other edge in the pair of adjacent edge is an edge, which belongs to the type of (d1, d2, de, d4, d5)=(+, +, +, −, −) in the edge 2, which is illustrated in FIG. 6. In the example, which is illustrated in FIG. 62A, the edge detection unit 410 has detected an edge between the adjacent pixels G2 and G3 and an edge between the adjacent pixels G3 and G4. The edge merger unit 420 has merged the two edges at the position of the pixel G3.

Figure 62B:
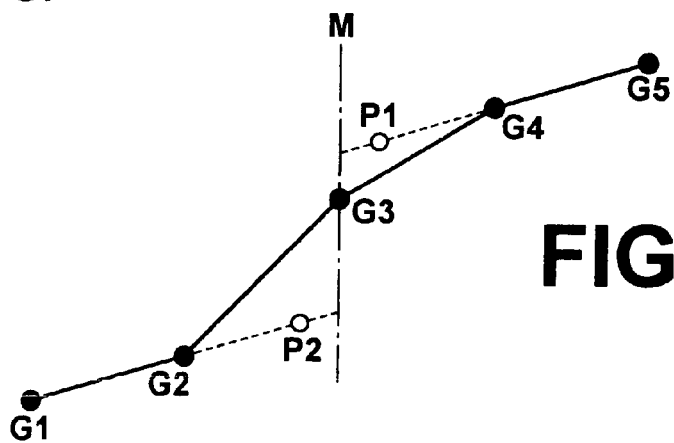
FIG. 62B is a diagram for explaining calculation of a pixel value of an interpolation pixel in a part, which is judged to be an edge (third interpolation operation B3)

First, the boundary setting unit 432 in the interpolation operation unit 430 sets a vertical line (dot-dashed line in FIG. 62B) M, which passes through the position of the edge, namely pixel G3, as a boundary line. Then, the judgment unit 434 judges whether the interpolation pixel is located on the right side of the boundary line M or the left side of the boundary line M. If the interpolation pixel (P1) is located on the right side of the boundary line M, the operation unit 436 calculates a value on the extended line of a straight line connecting the pixels G4 and G5 as the pixel value of the interpolation pixel. If the interpolation pixel (P2) is located on the right side of the boundary line M, the operation unit 436 calculates a value on the extended line of a straight line connecting the pixels G1 and G2 as the pixel value of the interpolation pixel.

Here, only the pixel values of two pixels are used to calculate the pixel value of the interpolation pixel P. However, three or more pixel values may be used. If three or more pixel values are used, it is difficult to connect the pixels with a straight line in some cases. Therefore, the pixels may be connected with a curve, which is defined by an arbitrary function, such as a spline curve. A value on the extended line of the curve may be used as the pixel value of the interpolation pixel P.

Further, in this case, if the interpolation pixel (P1) is located on the right side of the boundary line M, the pixel value of the pixel G4 may be used as the pixel value of the interpolation pixel. If the interpolation pixel (P2) is located on the left side of the boundary line M, the pixel value of the pixel G2 may be used as the pixel value of the interpolation pixel.

In the following descriptions, an operation (operation by the bicubic method) for obtaining the pixel value of an interpolation pixel, which is located in the part, in which there is no edge, is referred to as a first interpolation operation. An operation for obtaining the pixel value of an interpolation pixel, which is located in the part, in which there is an edge, is referred to as a second interpolation operation. An operation for obtaining the pixel value of an interpolation pixel, which is located in the part, in which there is an edge at the position of a pixel, is referred to as a third interpolation operation.

Figure 63:
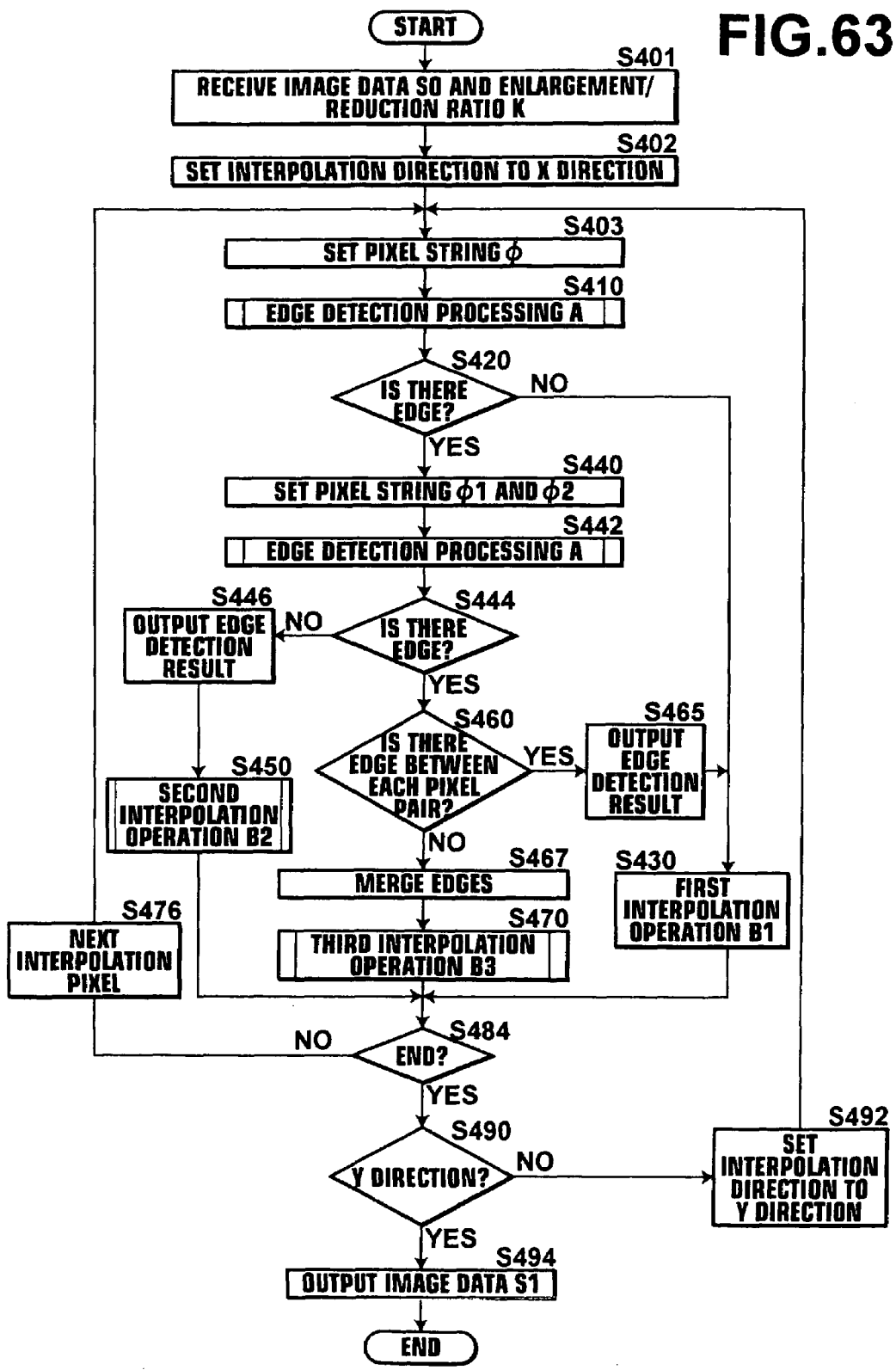
FIG. 63 is a flow chart illustrating processing performed in the present embodiment.
Figure 67:
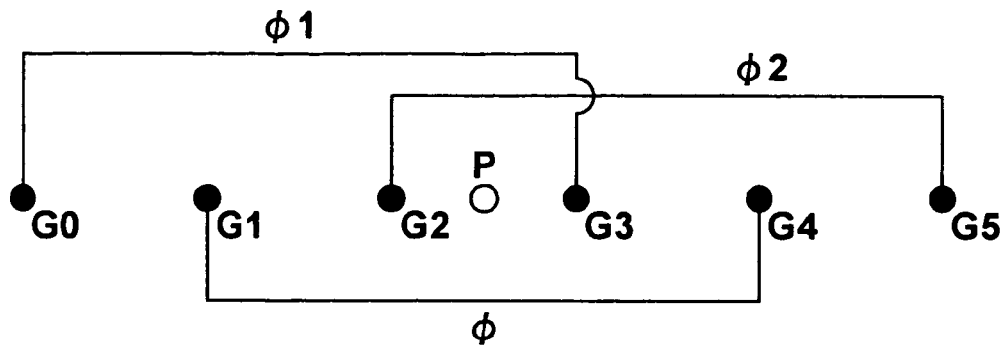
FIG. 67 is a diagram illustrating a pixel string, which is set for detecting adjacent edges.

Next, processing performed in the present embodiment will be described. FIG. 63 is a flow chart illustrating processing performed in the present embodiment. In the present embodiment, it is assumed that the interpolation pixel P is located between pixels in the image S0. First, the input unit 401 receives an input of image data S0, on which enlargement or reduction processing will be performed, and an enlargement/reduction ratio K of the image data S0 (step S401). Then, the input unit 401 sets the processing direction for interpolating a pixel to the x direction (step S402). Next, the filtering unit 412 in the edge detection unit 410 sets, based on the enlargement/reduction ratio K, a pixel string Φ for a first interpolation pixel P (for example, a pixel located in the upper left corner of the enlarged/reduced image S1). The pixel string Φ includes four serially adjacent pixels G1-G4 with the interpolation pixel located at the middle among the four pixels as illustrated in FIG. 67 (step S403). The filtering unit 412 detects whether there is an edge between the pixels G2 and G3 by using the pixel value of each of the pixels in the set pixel string Φ (step S410). Edge detection processing A, which is performed in step S410, will be described later in details. If it is judged that there is no edge between the pixels G2 and G3 (step S420: NO), the interpolation operation unit 430 performs the first interpolation operation B1, namely the interpolation operation by the bicubic method as described above, and obtains the pixel value of the interpolation pixel P (step S430).

Meanwhile, if it is judged that there is an edge between the pixels G2 and G3 in step S410 (step S420: YES), the filtering unit 412 in the edge detection unit 410 sets a pixel string Φ1 (G0-G3) and a pixel string Φ2 (G2-G5) by shifting the pixel string Φ by one pixel to the left or to the right, respectively, as illustrated in FIG. 67 (step S440). The edge detection unit 410 performs the edge detection processing A on the two pixel strings Φ1 and Φ2, which are set by the filtering unit 412, to detect whether there is an edge between the pixels G1 and G2 or an edge between the pixels G3 and G4 (step S442). Then, the result that there is an edge between the pixels G2 and G3 and the detection result as to whether there are an edge between the pair of pixels G1 and G2 and an edge between the pair of pixels G3 and G4 is output to the edge merger unit 420. If an edge is not detected between any one of the pair of the pixels G1 and G2 and the pair of the pixels G3 and G4 (step S444: NO), the edge merger unit 420 outputs the detection result by the edge detection unit 410 directly to the interpolation operation unit 430 (step S446). If an edge is detected between one of the pair of the pixels G1 and G2 and the pair of the pixels G3 and G4 (step S444: YES, step S460: NO), the edge merger unit 420 merges the edge detected between the pixels G2 and G3 and the edge detected between the pixels G1 and G2 or the edge detected between the pixels G3 and G4 at the position of the pixel (G2 or G3 in the example, which is illustrated in FIG. 67), which is sandwiched by the two edges. The edge merger unit 420 outputs information indicating the pixel located at the position, at which the edges are merged, to the interpolation operation unit 430 (step S467). If an edge is detected between each of the pair of the pixels G1 and G2 and the pair of the pixels G3 and G4 (step S444: YES, step S460: YES), the edge merger unit 420 outputs the edge detection result by the edge detection unit 410 directly to the interpolation operation unit 430 (step S465).

The interpolation operation unit 430 calculates the pixel value of the pixel P by performing an interpolation operation based on the information, which is output from the edge merger unit 420 in steps S446, S467, and S465. Specifically, if there is an edge between the pixels G2 and G3 (step S420: YES, step S444: NO), the interpolation operation unit 430 performs the second interpolation operation B2 (the details will be described later), and obtains the pixel value of the interpolation pixel P (step S450). Further, if the edge is located only at one of the pixels G2 and G3 (step S420: YES, step S444: YES, step 460: NO, step S467), the interpolation operation unit 430 performs the third interpolation operation B3 (the details will be described later), and obtains the pixel value of the interpolation pixel P (step S470). Further, if there is an edge between each pair of two adjacent pixels among the pixels G1, G2, G3, and G4 (step S420: YES, step S444: YES, step S460: YES, step S465), the interpolation operation unit 430 performs the first interpolation operation B1, namely the interpolation operation by the bicubic method, and obtains the pixel value of the interpolation pixel (step S430). Here, if there is an edge between each pixel pair of two mutually adjacent pixels among the pixels G1, G2, G3, and G4, in other words, if three adjacent edges are located successively, the possibility that each of the edges is not produced from an edge in a subject, but each of the edges is produced by the gradation of the image is high. Therefore, it is possible to judge that there is no edge between the pixels G2 and G3.

Figure 64:
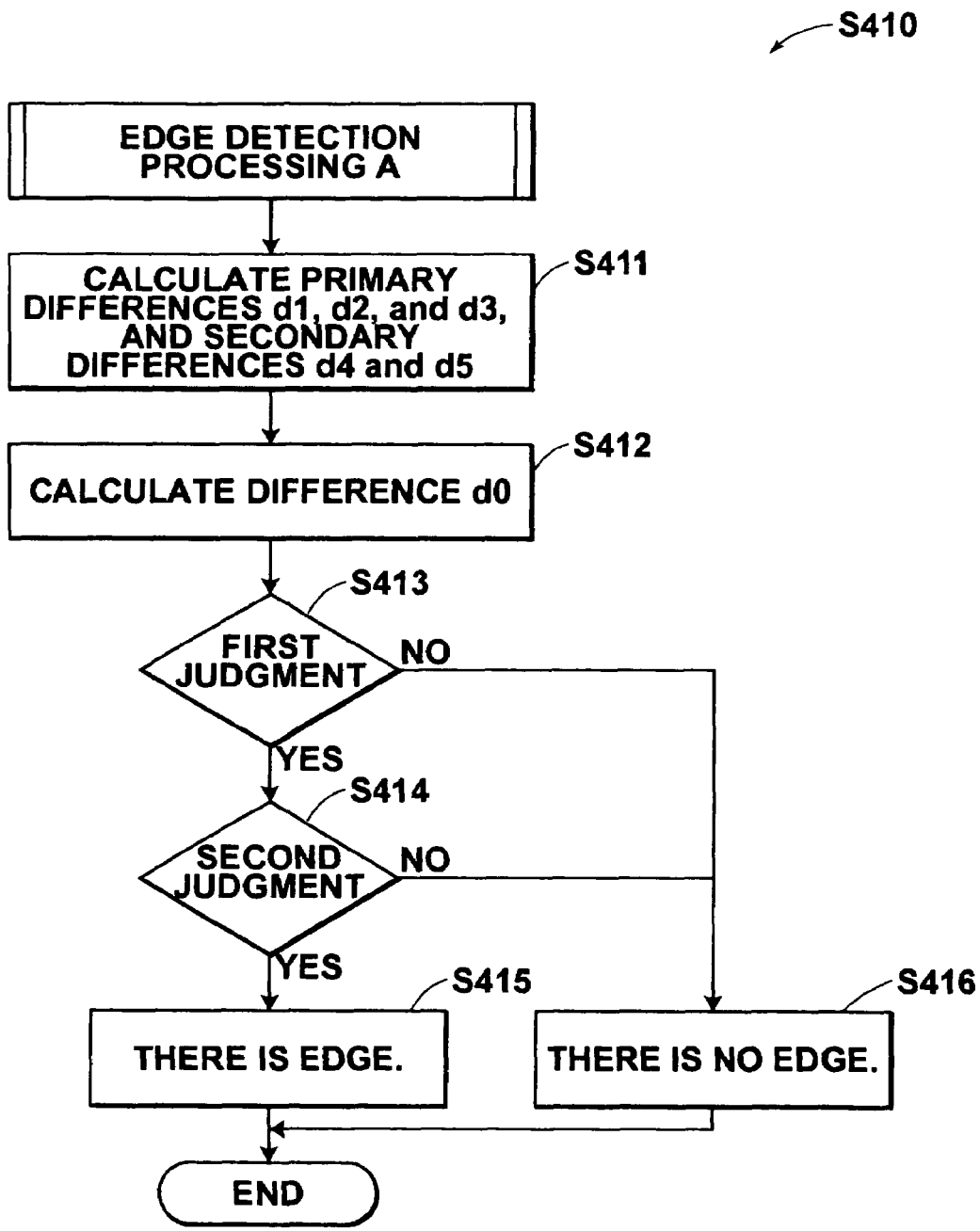
FIG. 64 is a flow chart illustrating edge detection processing A.

FIG. 64 is a flow chart illustrating edge detection processing A performed by the edge detection unit 410. As illustrated in FIG. 64, the filtering unit 412 in the edge detection unit 410 performs filtering processing on the set pixel string (the pixel string Φ, or the pixel string Φ1 or pixel string Φ2, which are illustrated in FIG. 67), and calculates the primary differences d1, d2, and d3 and the secondary differences d4 and d5 among the four pixels included in the pixel string (step S411). The filtering unit 412 also performs filtering processing on the two pixels, which are located at the middle of the pixel string, and calculates the difference d0 (=d2) (step S412). Then, the judgment unit 414 judges, based on the combination of the positives/negatives of the primary differences d1, d2, and d3 and the secondary differences d4 and d5, whether there is an edge between the pixels, which are located at the middle of the pixel string (first judgment, step S413). If the first judgment in step S413 is YES, the judgment unit 414 judges whether the absolute value of the difference d0 is equal to or larger than a predetermined threshold value Th1 (step S414, second judgment). If the second judgment in step S414 is YES (step S414: YES), the judgment unit 414 judges that there is an edge between the two pixels at the middle of the pixel string (step S415). Meanwhile, if the first judgment in step S413 is NO (step S413, NO), and the second judgment in step S414 is NO (S414: NO), the judgment unit 414 judges that there is no edge between the two pixels at the middle of the pixel string (step S416).

Figure 65:
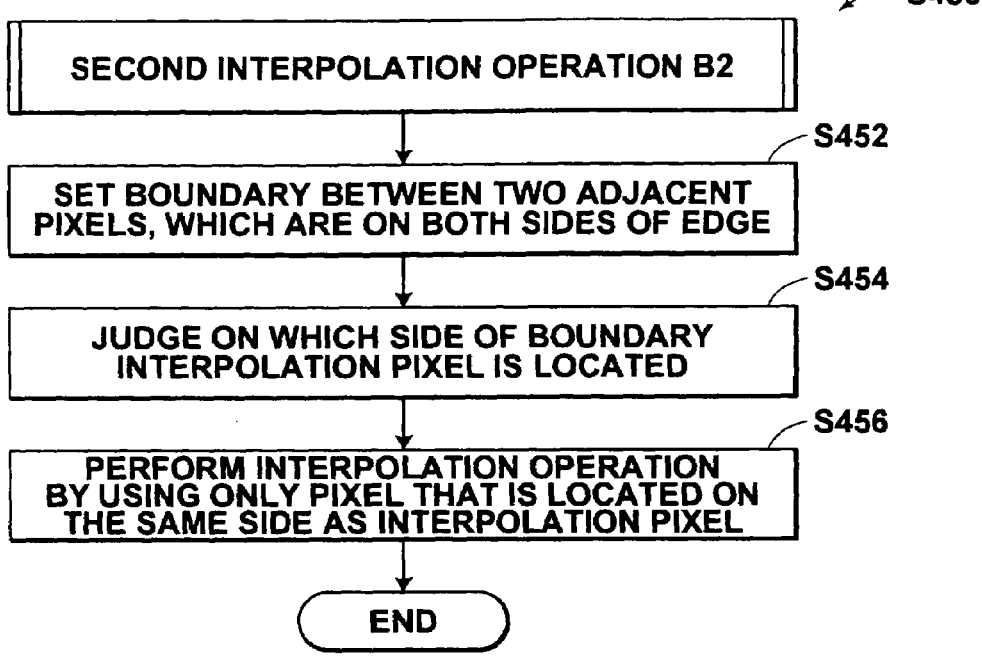
FIG. 65 is a flow chart illustrating a second interpolation operation B2.

FIG. 65 is a flow chart illustrating the processing of a second interpolation operation B2. As illustrated in FIG. 65, the boundary setting unit 432 in the interpolation operation unit 430 sets a boundary line or a boundary point between two adjacent pixels, between which the interpolation pixel P is located, as a boundary (step S452). The judgment unit 434 judges on which side of the boundary the interpolation pixel P is located (step S454). The operation unit 436 performs an interpolation operation by using only pixels, which are located on the same side of the boundary as the interpolation pixel P, and obtains the pixel value of the interpolation pixel P (step S456).

Figure 66:
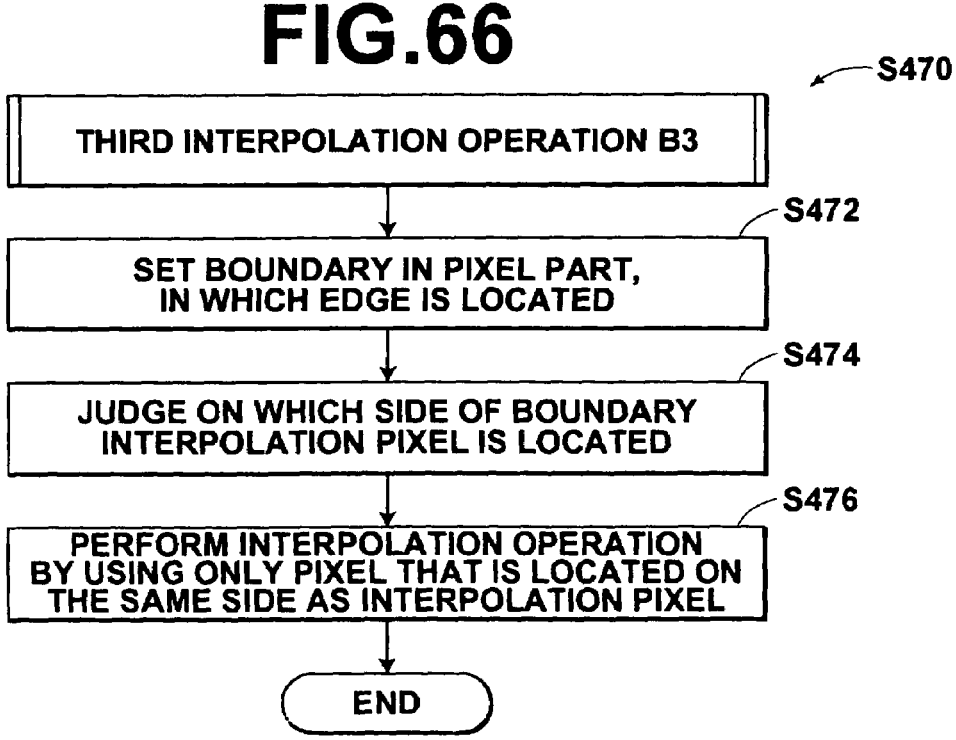
FIG. 66 is a flow chart illustrating a third interpolation operation B3.

FIG. 66 is a flow chart illustrating the third interpolation operation B3. As illustrated in FIG. 66, the boundary setting unit 432 in the interpolation operation unit 430 sets a vertical line, which passes through a pixel, at which an edge is located, as a boundary (step S472). The judgment unit 434 judges on which side of the boundary the interpolation pixel P is located (step S474). The operation unit 436 performs an interpolation operation by using only pixels, which are located on the same side of the boundary as the interpolation pixel P, and obtains the pixel value of the interpolation pixel (step S476).

The processing goes back to the steps illustrated in FIG. 63. The control unit 450 judges whether the pixel values of all the interpolation pixels P have been calculated in the set interpolation direction (step S484). If step S484 is NO, the control unit 450 sets an interpolation pixel P, of which pixel value should be calculated, as the next interpolation pixel P (step S476), and processing goes back to the process from step S403.

Meanwhile, if step S484 is YES, the control unit 450 judges whether the interpolation direction, in which the pixel values of all the interpolation pixels have been calculated, is the x direction or y direction (step S490). If the direction, in which the pixel values of all the interpolation pixels have been calculated, is the x direction (step S490: NO), the control unit 450 sets the interpolation direction to the y direction (step S492), and processing goes back to the process from step S403. If the direction, in which the pixel values of all the interpolation pixels have been calculated, is the y direction (step S490: YES), the control unit 450 outputs enlarged/reduced image data S1 including the interpolation pixel P (step S494), and processing ends.

Figure 68:
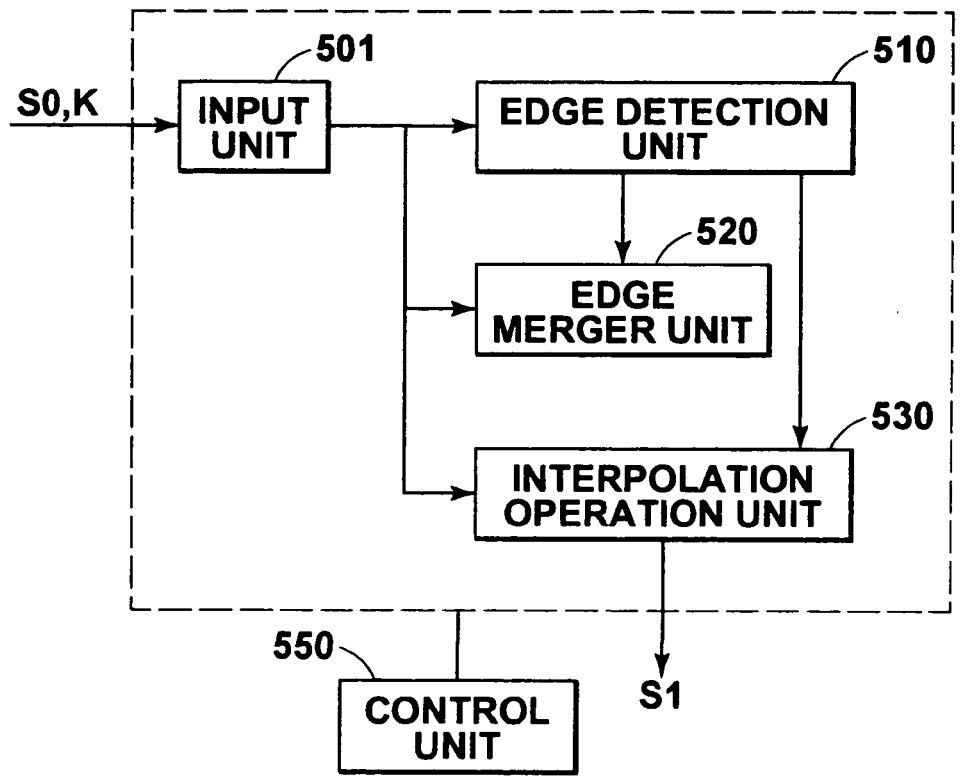
FIG. 68 is a block diagram illustrating the configuration of an image enlargement/reduction apparatus according to a sixth embodiment of the present invention.

FIG. 68 is a block diagram illustrating the configuration of an image enlargement/reduction apparatus according to a sixth embodiment of the present invention. As illustrated in FIG. 68, the image enlargement/reduction apparatus according to the present invention includes an input unit 501 for receiving an input of image data S0 and an enlargement/reduction ratio K of the image data S0. The image enlargement/reduction apparatus also includes an edge detection unit 510 for detecting whether there is an edge between pixels in the image, an edge merger unit 520, and an interpolation operation unit 530 for calculating the pixel value of an interpolation pixel. The image enlargement/reduction apparatus also includes a control unit 550 for controlling the operations of the input unit 501, the edge detection unit 510, the edge merger unit 520, and the interpolation operation unit 530. The configuration of each of the units will be described below in details.

Figure 69:
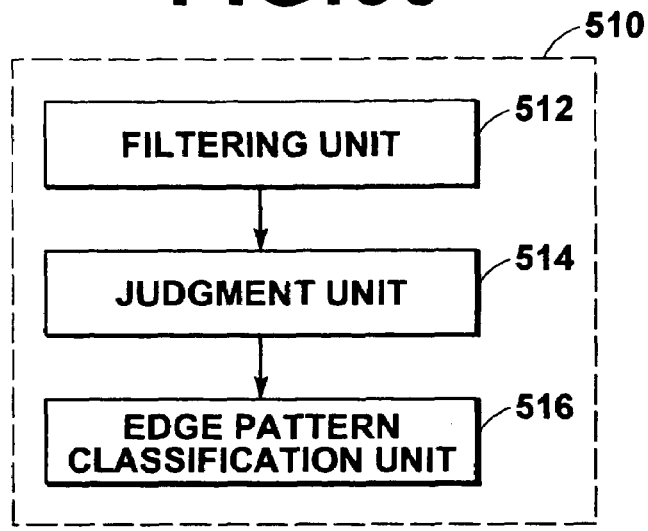
FIG. 69 is a block diagram illustrating the configuration of an edge detection unit 510 in the image enlargement/reduction apparatus, which is illustrated in FIG. 68.
Figure 70:
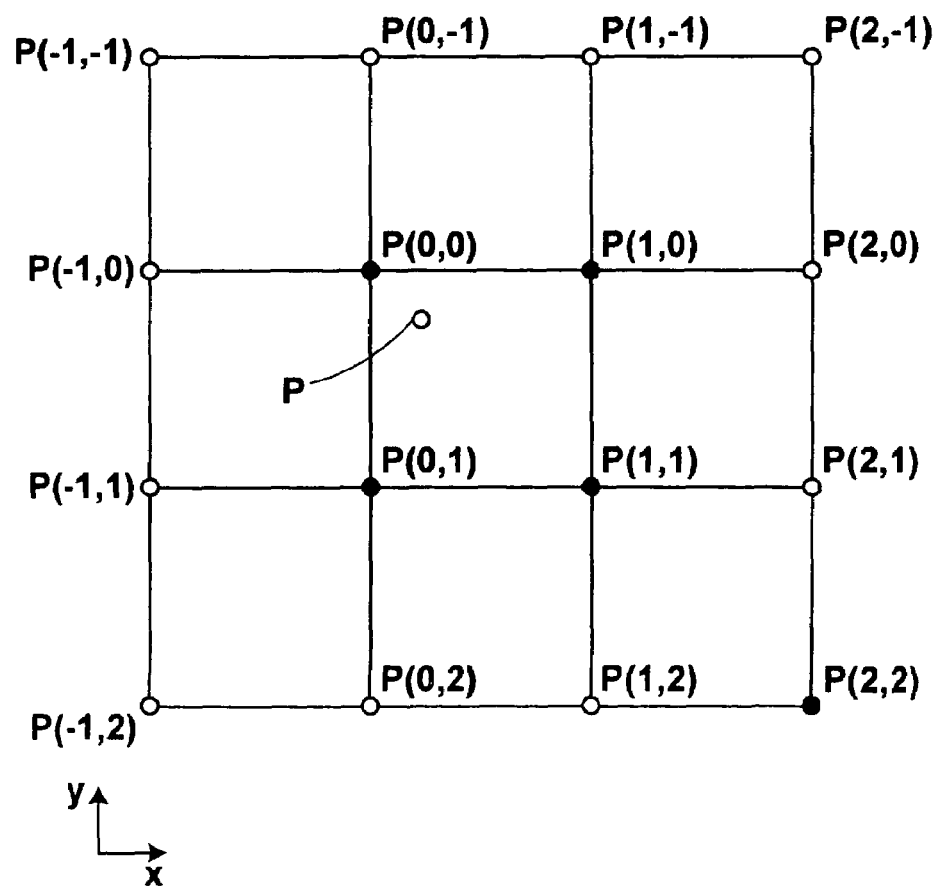
FIG. 70 is a diagram for explaining processing performed by a filtering unit 512.
Figure 71:
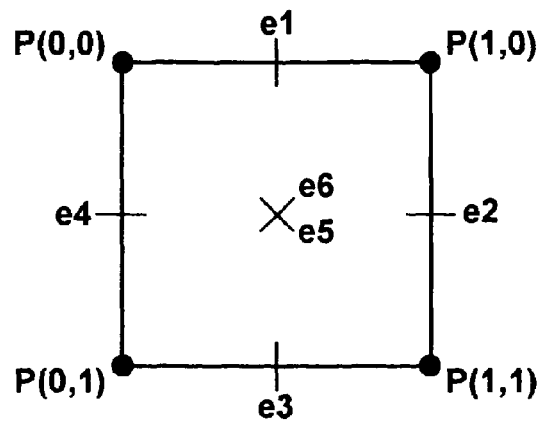
FIG. 71 is a diagram for explaining the operation by an edge pattern classification unit 516.

As illustrated in FIG. 69, the edge detection unit 510 includes a filtering unit 512, a judgment unit 514, and an edge pattern classification unit 516. First, the filtering unit 512 performs filtering processing, by using the difference filter illustrated in FIG. 5, on each pixel pair including two mutually adjacent pixels in a 4×4 pixel block of 16 pixels (16 pixels, P (i, j), (i, j=−1 to 2), which are illustrated in FIG. 70, hereinafter, referred to as "16 pixels of interpolation pixels P"), which are located in the vicinity of the interpolation pixel P in the image S0. Accordingly, the filtering unit 512 obtains the difference between each pixel pair (hereinafter, the difference between the pixel pair of adjacent pixels is referred to as "d"). Here, the two mutually adjacent pixels are not limited to two pixels such as the pair of pixels, P(−1, 0) and P(0, 0), which are adjacent to each other in the x direction of the arrangement direction of the pixels, or the pair of pixels, P(−1, −1) and P(−1, 0), which are adjacent to each other in the y direction of the arrangement direction of the pixels. The two mutually adjacent pixels also include two pixels such as the pair of P(−1, −1) and P(0, 0) or the pair of P(0, 1) and P(1, 0), which are adjacent to each other in the diagonal directions of the 2×2 pixel block.

The judgment unit 514 judges whether the absolute value of the difference d is equal to or larger than a predetermined threshold value Th. If the judgment is YES, the judgment unit 514 judges that there is an edge between the pixel pair corresponding to the difference, and outputs the judgment result to the edge pattern classification unit 516.

The edge pattern classification unit 516 classifies the edge pattern within each pixel block including four pixels, and outputs the classification result to the edge merger unit 520.

Figure 72:
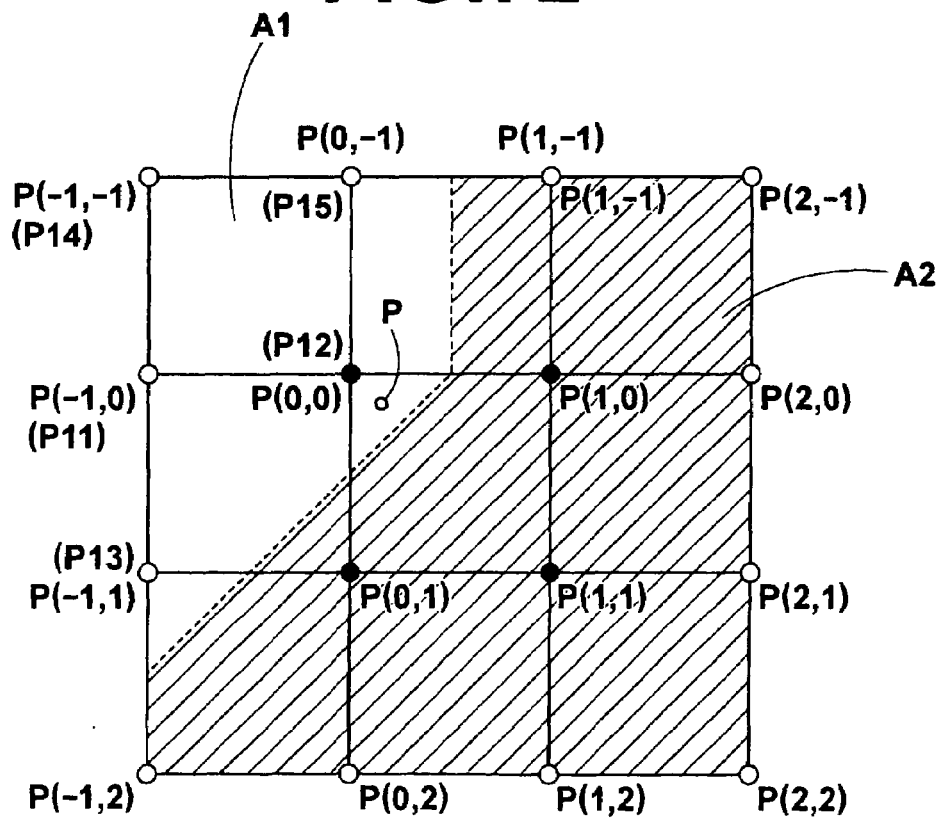
FIG. 72 is a diagram illustrating an example (No. 1) of a classification result by the edge pattern classification unit 516.
Figure 73:
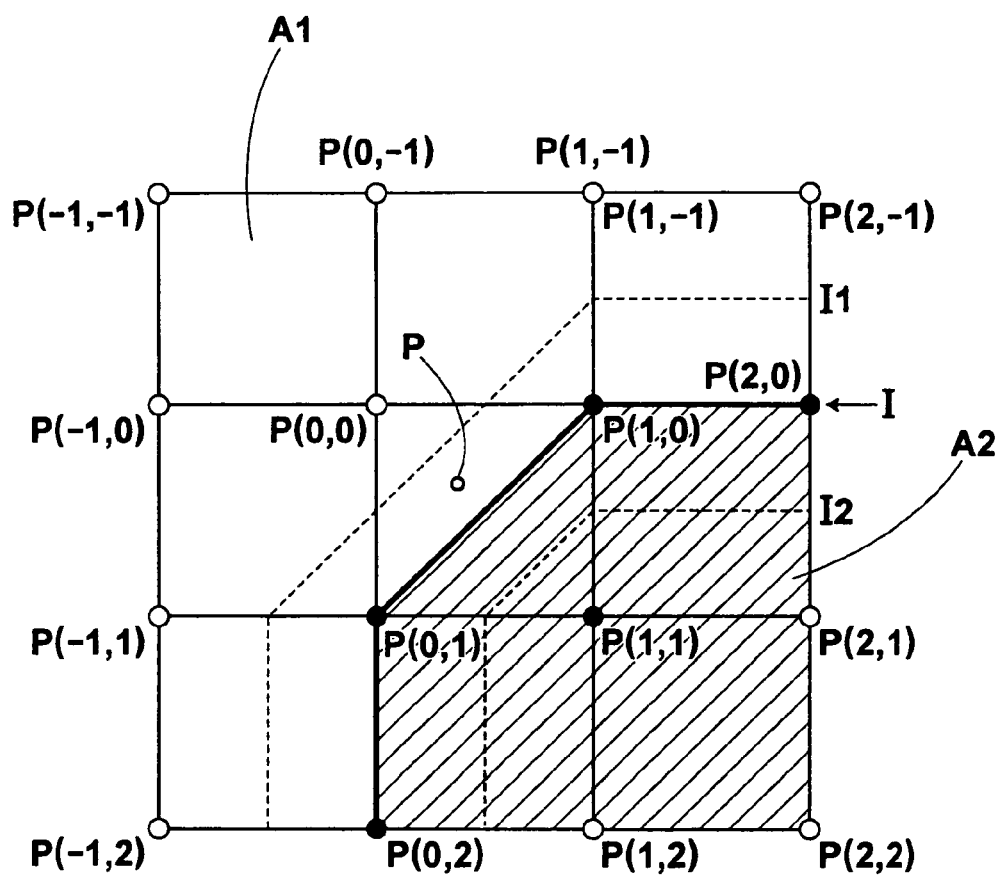
FIG. 73 is a diagram illustrating an example (No. 2) of a classification result by the edge pattern classification unit 516.

FIGS. 72 and 73 show examples of the edge patterns in the 4×4 pixel block of 16 pixels, which are obtained by the edge pattern classification unit 516. In the example illustrated in FIG. 72, the edge pattern within four pixels, which are adjacent to the interpolation pixel P, is a pattern 4. The edge pattern of four pixels, P(−1, −1), P(0, −1), P(0, 0), and P(−1, 0), is a pattern 0. The edge pattern of four pixels, P(0, −1), P(1, −1), P(1, 0), and P(0, 0), is a pattern 5. The edge pattern of four pixels, P(1, −1), P(2, −1), P(2, 0), and P(1, 0), is the pattern 0. The edge pattern of four pixels, P(−1, 0), P(0, 0), P(0, 1), and P(−1, 1), is a pattern 2. The edge pattern of four pixels, P(1, 0), P(2, 0), P(2, 1), and P(1, 1), is the pattern 0. The edge pattern of four pixels, P(−1, 1), P(0, 1), P(0, 2), and P(−1, 2), is a pattern 4. The edge pattern of four pixels, P(0, 1), P(1, 1), P(1, 2), and P(0, 2), is the pattern 0. The edge pattern of the four pixels, P(1, 1), P(2, 1), P(2, 2), and P(1, 2), is the pattern 0. As illustrated in FIG. 72, the area within the 16 pixels surrounding the interpolation pixel P is divided into two areas of an area A1 and an area A2 by the edge (a dotted line in FIG. 72). The area A2 is a shaded area in FIG. 72.

FIG. 73 shows an example of two edges (an edge 11 and an edge 12 indicated by dotted lines in FIG. 73), which are formed by successive edge patterns, in the 16 pixels of the interpolation pixel P.

Figure 74A:
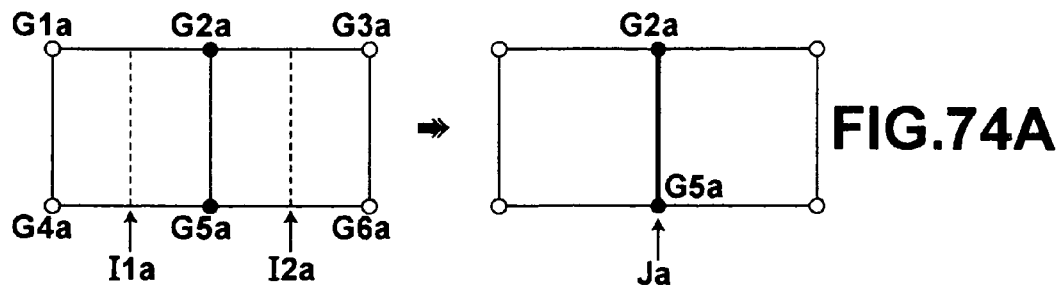
FIG. 74A is a diagram illustrating processing performed by an edge merger unit 520.
Figure 74B:
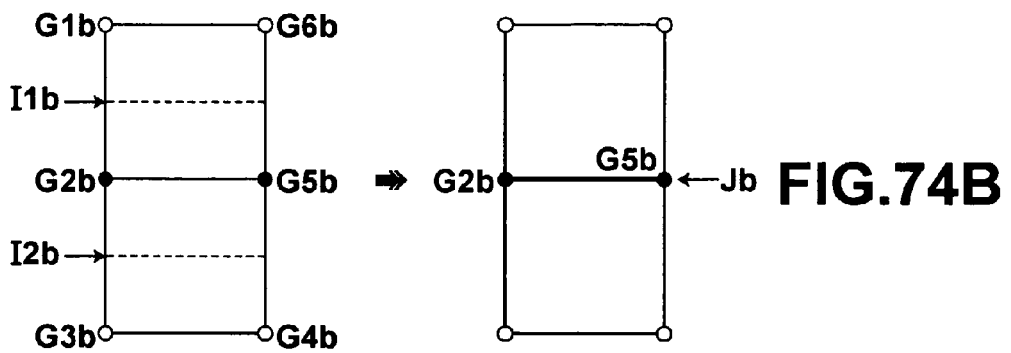
FIG. 74B is a diagram illustrating processing performed by the edge merger unit 520.
Figure 74C:
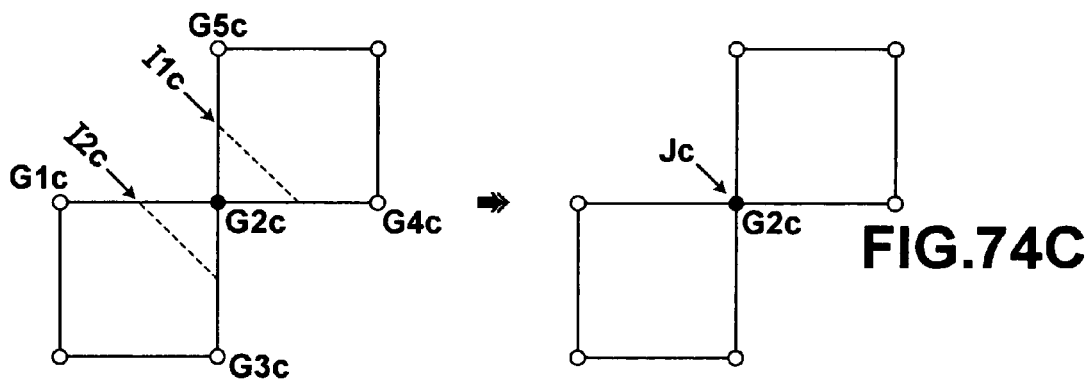
FIG. 74C is a diagram illustrating processing performed by the edge merger unit 520.
Figure 74D:
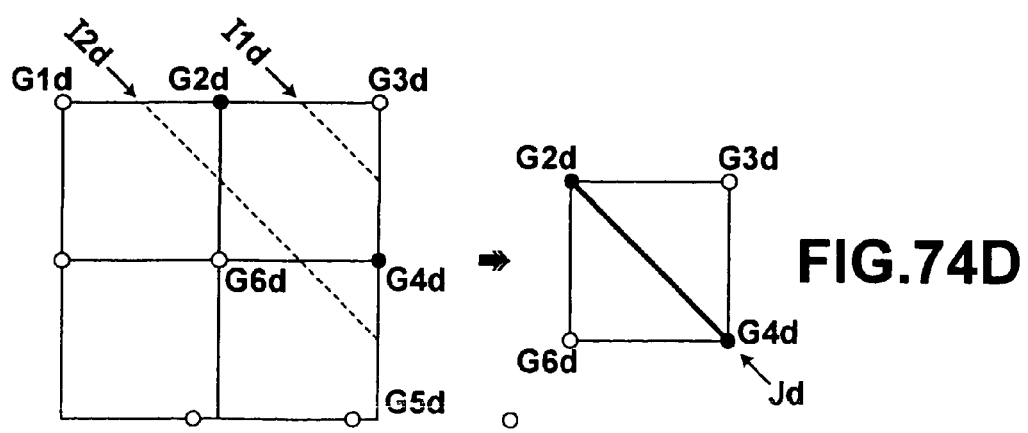
FIG. 74D is a diagram illustrating processing performed by the edge merger unit 520.

If there is an edge between each pair of two mutually adjacent pixels among the three serially adjacent pixels, the edge merger unit 520 compares the pixel values of the three pixels with each other based on the result, which is output from the edge pattern classification unit 516. If the pixel values of the three pixels monotonically increase or monotonically decrease, and the extension direction of the two edges are the same, the edge merger unit 520 merges the two edges at the position of the middle pixel. FIGS. 74A-74D are diagrams for explaining the processing for merging the adjacent edges by the edge merger unit 520. In FIGS. 74A-74D, it is assumed that the pixel values of the three pixels, to which each of the adjacent edges corresponds, satisfy the monotonically increasing or monotonically decreasing relationship along the arrangement direction of the pixels. As illustrated in FIG. 74A, an edge between the pixels G1a and G2a and an edge between the pixels G2a and G3a have been detected, and the extension directions of both edges are the same. Therefore, the two edges are merged at the position of the pixel G2a. Further, the extension directions of an edge between the pixel G4a and the pixel G5a and an edge between the pixel G5 and the pixel G6a are also the same. Therefore, as illustrated in the right side of FIG. 74A, two edges I1a and I2b (illustrated in dotted lines in FIG. 74A) are merged into a single edge Ja, which overlaps with a line (illustrated in a bold line in FIG. 74A) connecting the pixel G2a and the pixel G5a. Similarly, as illustrated in FIG. 74B, the edge I1b and the I2b are merged into a single edge Jb. Further, as illustrated in FIG. 74C, in two mutually adjacent pixel blocks with their point of contact at the pixel of the diagonal point, there is also an edge between the pixel G2c at the diagonal point, which is the point of contact, and each of pixels (G1c, G3c, G4c, and G5c), which are adjacent to the pixel G2c. Further, each of the edges extends in the same direction. Therefore, the edge between the pixels G5c and the pixel G2c and the edge between the pixel G2c and the pixel G3c are merged at the position of the pixel G2c. The edge between the pixel G1c and the pixel G2c and the edge between the pixel G2c and the pixel G4c are merged at the position of the pixel G2c. Therefore, the two edges I1c and I2c in the left side of FIG. 74C becomes the single edge Jc (the position of the pixel G2c) as illustrated in the right side of FIG. 74C. Further, as illustrated in FIG. 74D, the edge between the pixel G1d and the pixel G2d and the edge between the pixel G2d and the pixel G3d are merged at the position of the pixel G2c. The edge between the pixel G3d and the pixel G4d and the edge between the pixel G4d and the pixel G5d are merged at the position of the pixel G4d. Therefore, the part of the two edges I1d and I2d, which extend in the same direction, within the pixel block of the pixels G2d, G3d, G4d, and G6d becomes the single edge Jd, which connects the pixel G2d and the pixel G4d, which are located at diagonal points of the block as illustrated in the right side of FIG. 74D.

The edge merger unit 520 merges performs the merger processing as illustrated in FIGS. 74A-74D for the adjacent edges, which satisfy the conditions as described above, and outputs the result to the interpolation operation unit 530. In the edge pattern, which is illustrated in FIG. 73, the edge merger unit 520 merges the two edges 11 and 12 into a single edge I, which is indicated with a bold line in FIGS. 74A-74D. As illustrated in FIG. 73, the area of the 16 pixels of the interpolation pixel is divided into two areas by the edge I (indicated with a bold line in FIG. 73). Here, the areas on both sides of the edge I are referred to as an area A1 and an area A2, respectively. The area A2 is a shaded area.

In the example of the edge pattern, which is illustrated in FIG. 72, there are no edges, that will become targets for the merger. The edge merger unit 520 outputs the output result from the edge pattern classification unit 516 directly to the interpolation operation unit 530. In the example illustrated in FIG. 73, the edge merger unit 520 outputs the result, which is obtained by merging the edges within the 16 pixels of the interpolation pixel P, to the interpolation operation unit 530.

The interpolation operation unit 530 calculates the pixel value of the interpolation pixel P based on the result indicating the edge within the 16 pixels of the interpolation pixel P, which is output from the edge merger unit 520. Specifically, if there is no edge within the 16 pixels surrounding the interpolation pixel P, the interpolation operation unit 530 calculates the pixel value of the interpolation pixel using the bicubic method. The interpolation operation by the bicubic method is similar to the first interpolation operation, which is performed by the interpolation operation unit 430 in the embodiment illustrated in FIG. 55. Therefore, the detailed explanation is omitted. In the following descriptions of the present embodiment, the operation for calculating the pixel value of the interpolation pixel P using the bicubic method when there is no edge within the 16 pixels of the interpolation pixel P is referred to as a first interpolation operation in the present embodiment.

Meanwhile, if there is an edge within the 16 pixels of the interpolation pixel P, the interpolation operation unit 530 calculates the pixel value of the interpolation pixel P by the second interpolation operation. Here, the second interpolation operation by the interpolation operation unit 530 will be described with reference to FIG. 72. Further, for the purpose of simplifying the explanation, the pixels P(−1, −1), P(−1, 0), P(−1, 1), P(0, 0), and P(0, −1) in FIG. 72 are replaced by signs P14, P11, P13, P12, and P15, respectively. As illustrated in FIG. 72, the area within the 16 pixels surrounding the interpolation pixel P is divided into two areas of the area A1 and the area A2 by the edge. The area A2 is illustrated as a shaded area. First, the interpolation operation unit 530 determines the pixel, which is used for the interpolation operation, based on which side of the edge the interpolation pixel P exists. For example, if the interpolation pixel P exists in the area A1 as illustrated in FIG. 72, the interpolation operation unit 530 determines that the pixels P11, P12, P13, P14, and P15 are the pixels, which are used for the interpolation operation. If the interpolation pixel P exists in the area A2, the interpolation operation unit 530 determines that the pixels in the area A2 are the pixels, which are used for the interpolation operation.

Next, the interpolation operation unit 530 performs an interpolation operation to obtain the pixel value of the interpolation pixel P by giving a more weight to the pixel, which is located closer to the interpolation pixel P, among the determined pixels. Specifically, the interpolation operation unit 530 sets the weights W11-W15 for each of pixels P11-P15 so that the largest weight W12 is given to the pixel P12. The interpolation operation unit 530 calculates the pixel value (referred to as "Pt" in this case) of the interpolation pixel P by performing the operation according to the following equations (9) by using the pixel values Pt11-Pt15 of pixels P11-P15, respectively:

$$Pt = \sum_{i=1}^{5} W1i \cdot Pt1i \text{ wherein,} \qquad (9)$$

$$\sum_{i=1}^{5} W1i = 1$$

Figure 75:
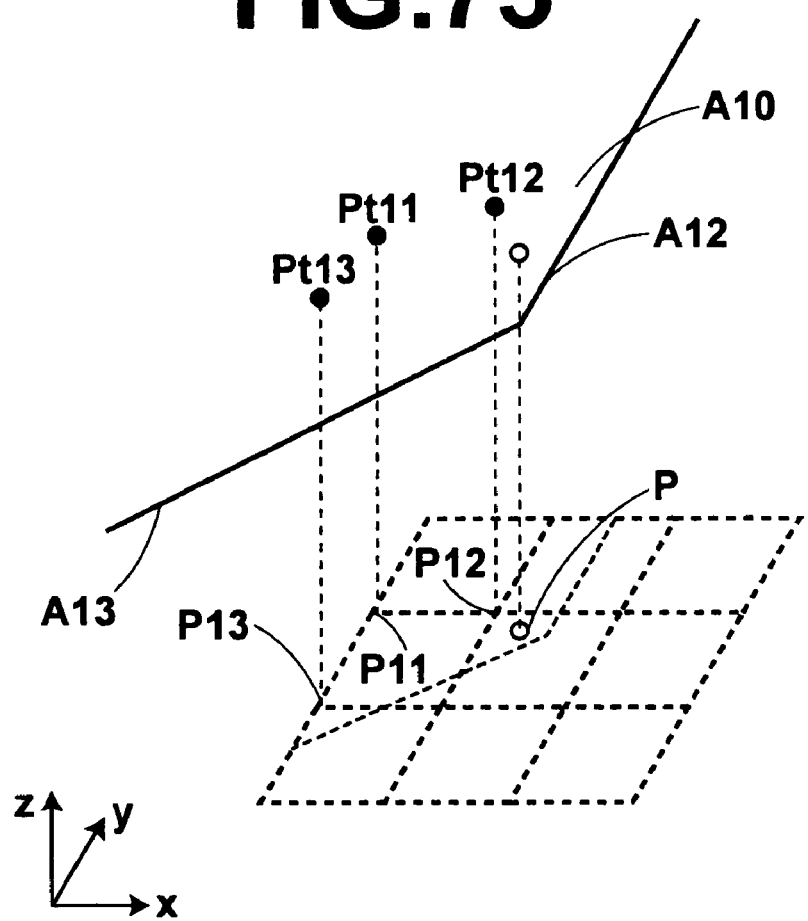
FIG. 75 is a diagram for explaining an interpolation operation (second interpolation operation D2), which is performed if there is an edge within 16 pixels surrounding an interpolation pixel P.

For calculating the pixel value of the interpolation pixel P, it is not required to use all the determined pixels. Further, the calculation method is not limited the method as descried above. For example, the pixel value of the interpolation pixel P may be obtained by applying the second interpolation operation (Refer to FIG. 61A.) by the interpolation operation unit 430 in the embodiment illustrated in FIG. 55 to the second dimension. Specifically, as illustrated in FIG. 75, a plane A10, which passes through the pixel values Pt11, Pt12, and Pt13 of the pixels P11, P12, and P13 (Refer to FIG. 74) is set in a three-dimensional space with the x coordinate and the y coordinate, which represent the position of the pixel, and the z coordinate, which represents the pixel value. Sides A12 and A13 of the plane A10 correspond to the positions of the edges. The value of the z coordinate, which corresponds to the x coordinate and the y coordinate of the interpolation pixel P, on the plane A10 should be obtained as the pixel value of the interpolation pixel P.

In the example illustrated in FIG. 73, the pixels, P(−1, −1), P(0, −1), P(1, −1), P(2, −1), P(−1, 0), P(−1, 1), P(−1, 2), and P(0, 0), which are located in the area A1, are determined as the pixels, which are used for the interpolation operation for obtaining the pixel value of the interpolation pixel P, for the pixel P, which is located in the area A1. The interpolation operation is performed by using these pixel values, and the pixel value of the interpolation pixel P is obtained.

As clear from the above descriptions, if the edge merger unit 520 does not perform the merger processing, only the pixels, P(2, 0), P(1, 0), P(0, 1), and P(0, 2), which are located between the edges I1 and I2, may be used for obtaining the pixel value of the interpolation pixel P, which is also located between the two edges I1 and I2. However, these pixels are the intermediate value pixels. If these pixels are excluded from the pixels, which are used for the interpolation operation, it is impossible to obtain the pixel value of the interpolation pixel P. Since the edge merger unit 520 performs the merger processing, it is possible to obtain the pixel value of the interpolation pixel P without using the intermediate value pixels P(2, 0), P(1, 0), P(0, 1), and P(0, 2).

Further, if there is an edge between each pair of two adjacent pixels among three serially adjacent pixels, the edge merger unit 520 compares the pixel values of the three pixels with each other. Only if the pixel values of the three pixels monotonically increase or monotonically decrease along the arrangement direction of the three pixels, and the two edges extend in the same direction, the edge merger unit 520 merges the edges. For example, in the example illustrated in FIG. 73, if the pixel values of the three pixels do not monotonically increase or monotonically decrease along the arrangement direction of the pixels, the edge merger unit 520 outputs the edge patterns of the edges I1 and I2 without performing the merger processing. The interpolation operation unit 530 may obtain the pixel value of the interpolation pixel P, which is located between the two edges I1 and I2, by performing the interpolation operation using the pixel values of the pixels, P(2, 0), P(1, 0), P(0, 1), and P(0, 2), which are located between the edges 11 and 12. In this case, the possibility that the pixels, P(2, 0), P(1, 0), P(0, 1), and P(0, 2 are not the intermediate value pixel but pixels, which represent a thin line in a subject, is high. Therefore, it is possible to prevent the thin line in the subject from disappearing from an enlarged/reduced image by obtaining the pixel value of the interpolation pixel P by using the pixel values of these pixels.

In the following descriptions, an interpolation operation, which is performed by the interpolation operation unit 530 when there is an edge within the 16 pixels of the interpolation pixel P, is referred to as a second interpolation operation in the present embodiment.

Figure 76:
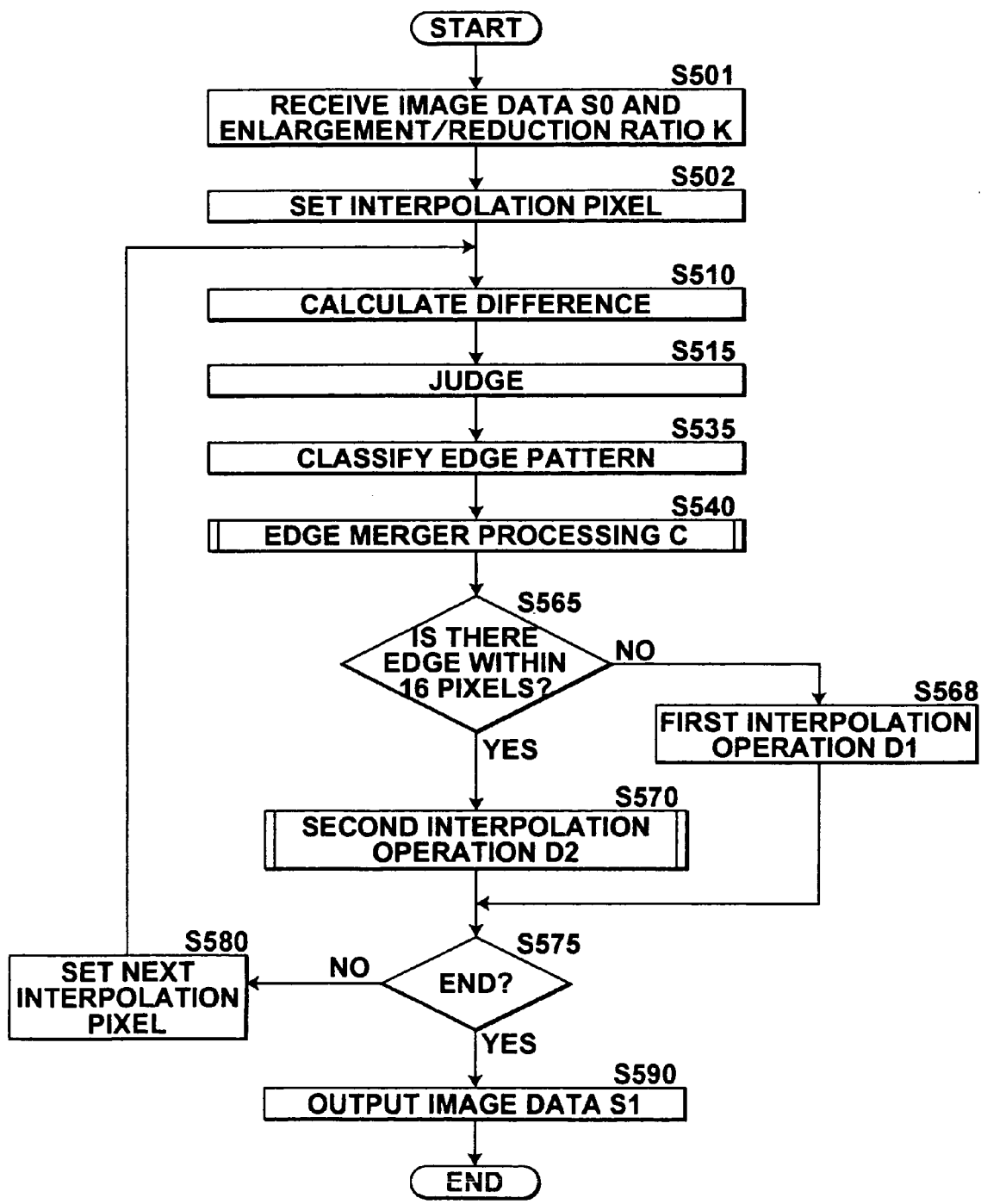
FIG. 76 is a flow chart illustrating processing performed in the present embodiment.

FIG. 76 is a flow chart illustrating processing performed in an image enlargement/reduction apparatus of the present embodiment. In the present embodiment, it is assumed that the interpolation pixel P is located between pixels in an image S0. First, the input unit 501 receives an input of the image data S0 and an enlargement/reduction ratio K of the image data S0 (step S501). Then, the filtering unit 512 performs filtering processing, based on the enlargement/reduction ratio K, on a pixel pair, which includes two adjacent pixels, within the 4×4 pixel block of 16 pixels (16 pixels of the interpolation pixel P), which are located in the vicinity of a first interpolation pixel P (the pixel located in the upper left corner of the image, which is represented by the enlarged/reduced image data S1) by using a difference filter. Accordingly, the filtering unit 512 calculates the difference in pixel value between each pixel pair (step S510).

Next, the judgment unit 514 judges whether there is an edge between each pixel pair of two pixels based on whether the absolute value of the difference in pixel value between each pixel pair is equal to or larger than a predetermined threshold value Th (step S515). Specifically, if the absolute value of the difference in pixel value between the pixel pair is equal to or larger than the threshold value Th, the judgment unit 514 judges that there is an edge between the two pixels in the pixel pair. If the absolute value of the difference in pixel value between the pixel pair is less than the threshold value Th, the judgment unit 514 judges that there is no edge between the two pixels of the pixel pair.

The edge pattern classification unit 516 classifies the edge pattern in each 2×2 pixel block based on the judgment result by the judgment unit 514, and outputs the classification result to the edge merger unit 520 (step S535). The edge merger unit 520 performs the merger processing (This is referred to as edge merger processing C. The details will be described later.) on the edges in the 16 pixels of the interpolation pixel P, and outputs the result to the interpolation operation unit 530 (step S540). If there is no edge within the 16 pixels based on the result output from the edge merger unit 520 (step S565:

NO), the interpolation operation unit 530 performs the first interpolation operation D1, namely the interpolation operation using the bicubic interpolation method, and obtains the pixel value of the interpolation pixel P (step S568). Meanwhile, if there is an edge within the 16 pixels of the interpolation pixel P (step S565: YES), the interpolation operation unit 530 performs the second interpolation operation D2, and obtains the pixel value of the interpolation pixel P (step S570).

The control unit 550 judges whether the pixel values of all the interpolation pixels P in the image S0 have been calculated (step S575). If step S575 is NO, the control unit 550 sets an interpolation pixel P, of which pixel value should be calculated, as the next interpolation pixel P (step S580). The processing goes back to the process from step S510. Meanwhile, if step S580 is YES, the control unit 550 outputs the enlarged/reduced image data S1 (step S590), and the processing ends.

Figure 77:
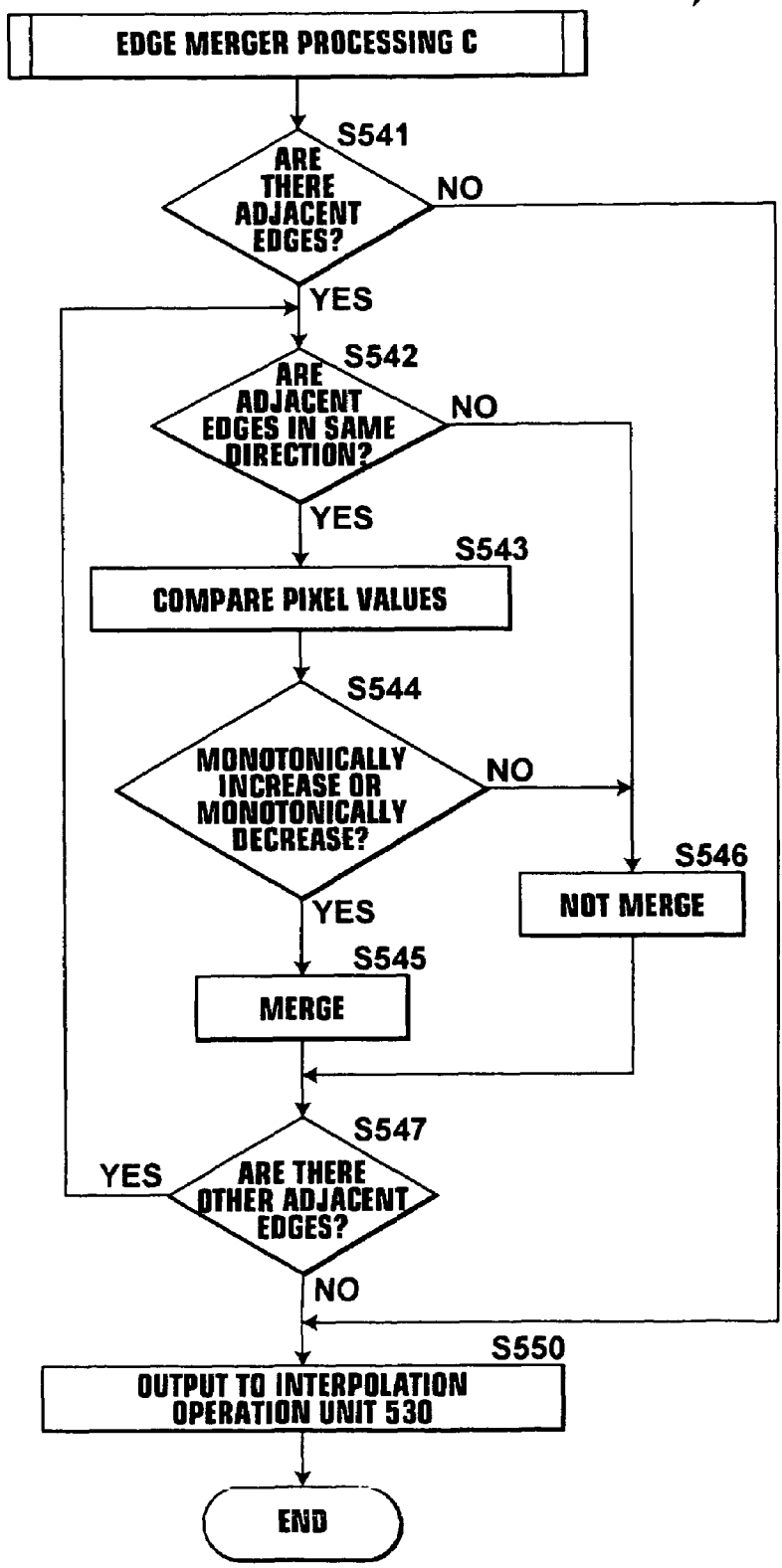
FIG. 77 is a flow chart illustrating edge merger processing C by the edge merger unit 520.

FIG. 77 is a flow chart illustrating the edge merger processing C, which is performed by the edge merger unit 520 in step S540. As illustrated in FIG. 77, the edge merger unit 520 checks whether there is a set of three serially adjacent pixels, among which there is an edge between each pair of two mutually adjacent pixels within the 4×4 pixel block of 16 pixels surrounding the pixel P. If there is such a set of pixels (step S541: YES), and if the two edges (adjacent edges) in the set of pixels extend in the same direction and the pixel values of the three pixels in the set of pixels monotonically increase or monotonically decrease along the arrangement direction of the three pixels (step S542: YES, step S543, step S544: YES), the edge merger unit 520 merges the two edges at the position of the middle pixel in the set of pixels corresponding to the edges (step S545). In other cases (step S542: NO, or step 542: YES, step S543, step S544: NO), the edge merger unit 520 does not merge the two edges (step S546).

The edge merger unit 520 performs the processing in steps S542 to step S545 on all the adjacent edges within the 16 pixels of the interpolation pixel P (step S547: YES, steps S542 to step S545, step S547: NO), and outputs the obtained information on the edges within the 16 pixels of the interpolation pixel P to the interpolation operation unit 530 (step S550), and processing ends.

Meanwhile, if it is judged that there is no adjacent edges within the 16 pixels of the interpolation pixel P in step S541 (step S541: NO), the edge merger unit 520 outputs the edge pattern, which is output from the edge pattern classification unit 516, directly to the interpolation operation unit 530 (step S550), and processing ends.

Figure 78:
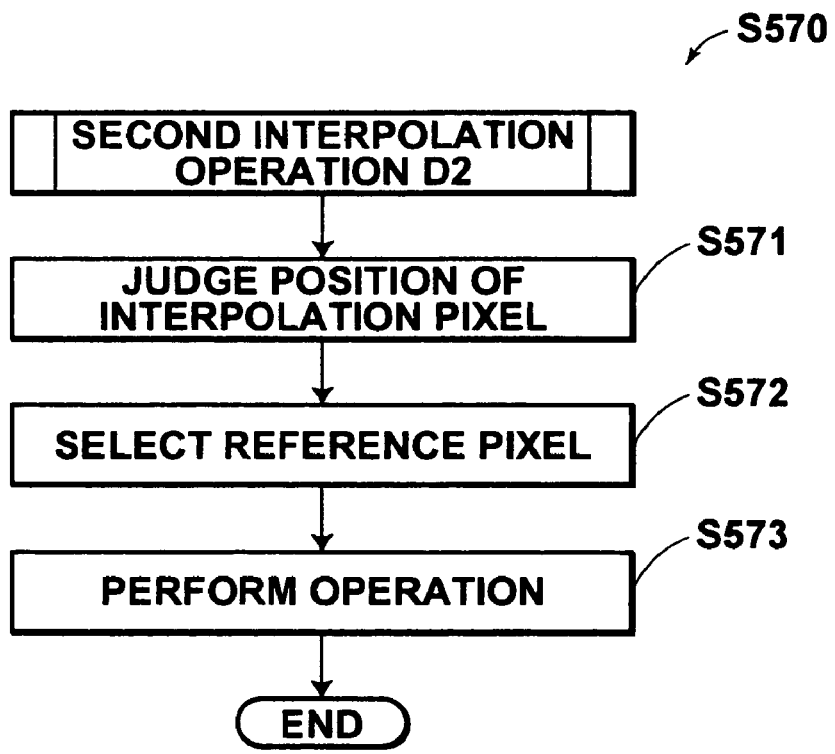
FIG. 78 is a flow chart illustrating the second interpolation operation D2.
Figure 79A:
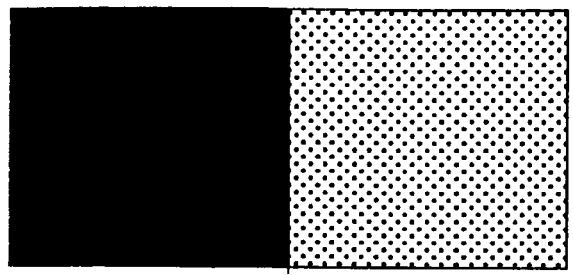
FIG. 79A is a diagram illustrating a relationship between an edge in a subject and an edge, which is detected in a digital image.
Figure 79B:
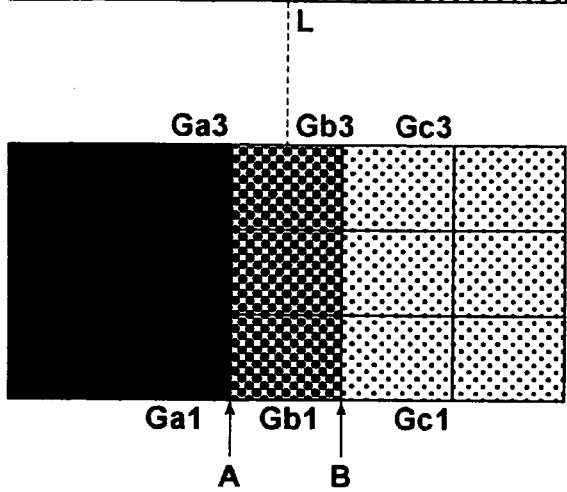
FIG. 79B is a diagram illustrating a relationship between the edge in the subject and the edge, which is detected in the digital image.
Figure 79C:
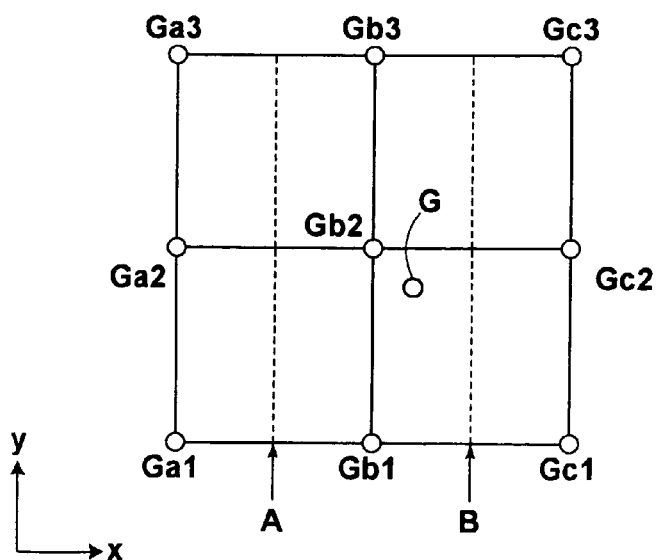
FIG. 79C is a diagram illustrating a relationship between the edge in the subject and the edge, which is detected in the digital image.

FIG. 78 is a flow chart illustrating the second interpolation operation D2 in details, which is performed by the interpolation operation unit 530 when there is an edge within the 16 pixels of the interpolation pixel P. As illustrated in FIG. 78, the interpolation operation unit 530 judges on which side of the edge the interpolation pixel P is located within the area of the 16 pixels (step S571). Then, the interpolation operation unit 530 selects a pixel, which is located on the same side of the edge as the interpolation pixel P, as a reference pixel, which is used for the interpolation operation (step S572). Next, the interpolation operation unit 530 performs the interpolation operation by using the pixel value of the reference pixel, and obtains the pixel value of the interpolation pixel P (step S573).

In the embodiment as described above, the edges (adjacent edges), each of which is detected between each pair of two mutually adjacent pixels among the three serially adjacent pixels, are merged at the position of the middle pixel among the three pixels. However, the position, at which the edges are merged, is not limited to the position of the middle pixel among the three pixels, and it may be any position in the vicinity of the middle pixel. In this case, the position, at which the edges are merged, may be determined at an arbitrary position within the range of the vicinity of the middle pixel. For example, the edges may be merged at a position, which is closer to a pixel, of which difference in pixel value from the pixel value of the middle pixel is large, than a pixel, of which difference in pixel value from the pixel value of the middle pixel is small, within the range of the vicinity of the middle pixel.

Figure 80:
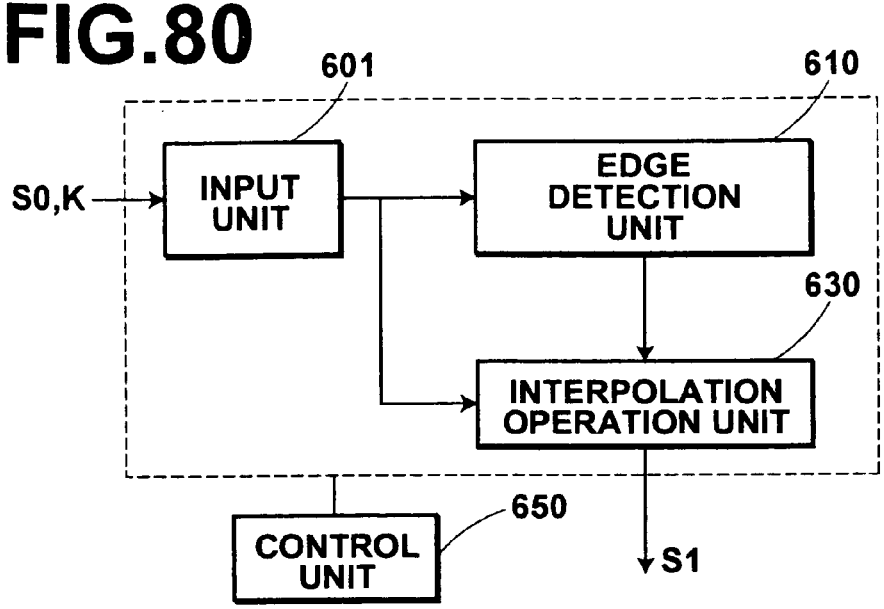
FIG. 80 is a block diagram illustrating the configuration of an image enlargement/reduction apparatus according to a seventh embodiment of the present invention.

FIG. 80 is a block diagram illustrating the configuration of an image enlargement/reduction apparatus according to a seventh embodiment of the present invention. As illustrated in FIG. 80, the image enlargement/reduction apparatus according to the present invention includes an input unit 601 for receiving an input of image data S0 and an enlargement/reduction ratio K of the image data S0. The image enlargement/reduction apparatus also includes an edge detection unit 610 for detecting whether there is an edge between pixels in the image, and an interpolation operation unit 630 for calculating the pixel value of an interpolation pixel. The image enlargement/reduction apparatus also includes a control unit 650 for controlling the operations of the input unit 601, the edge detection unit 610, and the interpolation operation unit 530.

Figure 81:
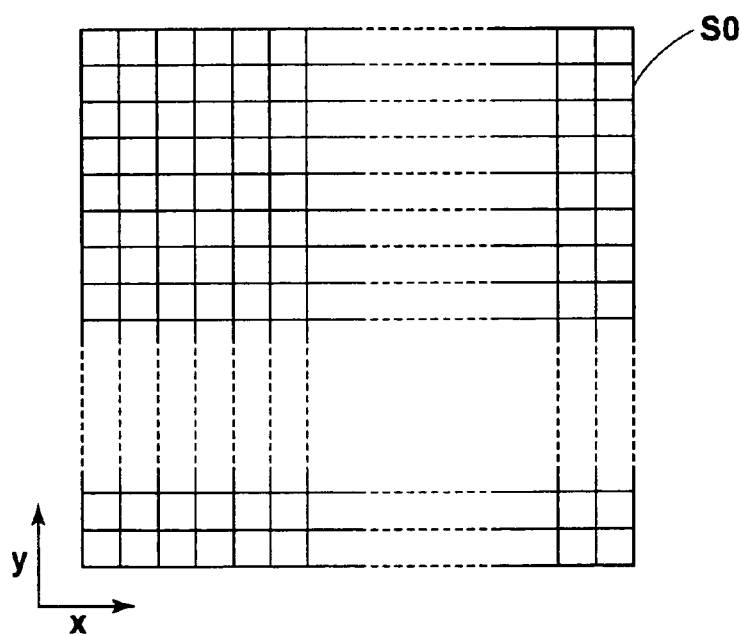
FIG. 81 is a diagram illustrating a pixel arrangement in an image represented by image data.

Here, an image, which is represented by the image data S0, is composed of two-dimensionally arranged pixels as illustrated in FIG. 81. In the following descriptions, it is assumed that the x direction and the y direction are set as illustrated in FIG. 81. Further, in the following explanation, the image data and the image, which is represented by the image data, are not discriminated from each other, and the same reference numeral (S0 in this case) is assigned to both of them.

Figure 82:
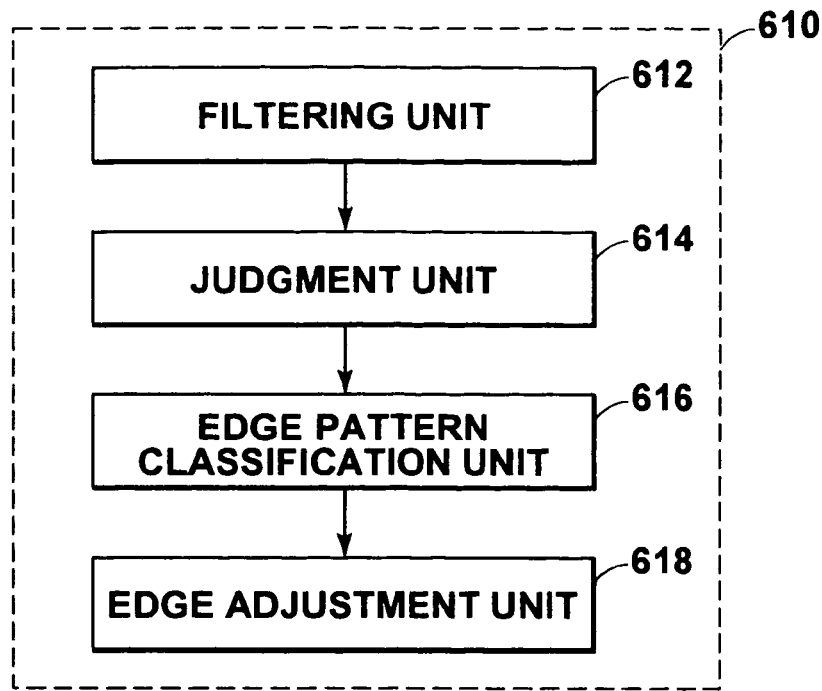
FIG. 82 is a block diagram illustrating the configuration of an edge detection unit 610 in the image enlargement/reduction apparatus, which is illustrated in FIG. 80.
Figure 84:
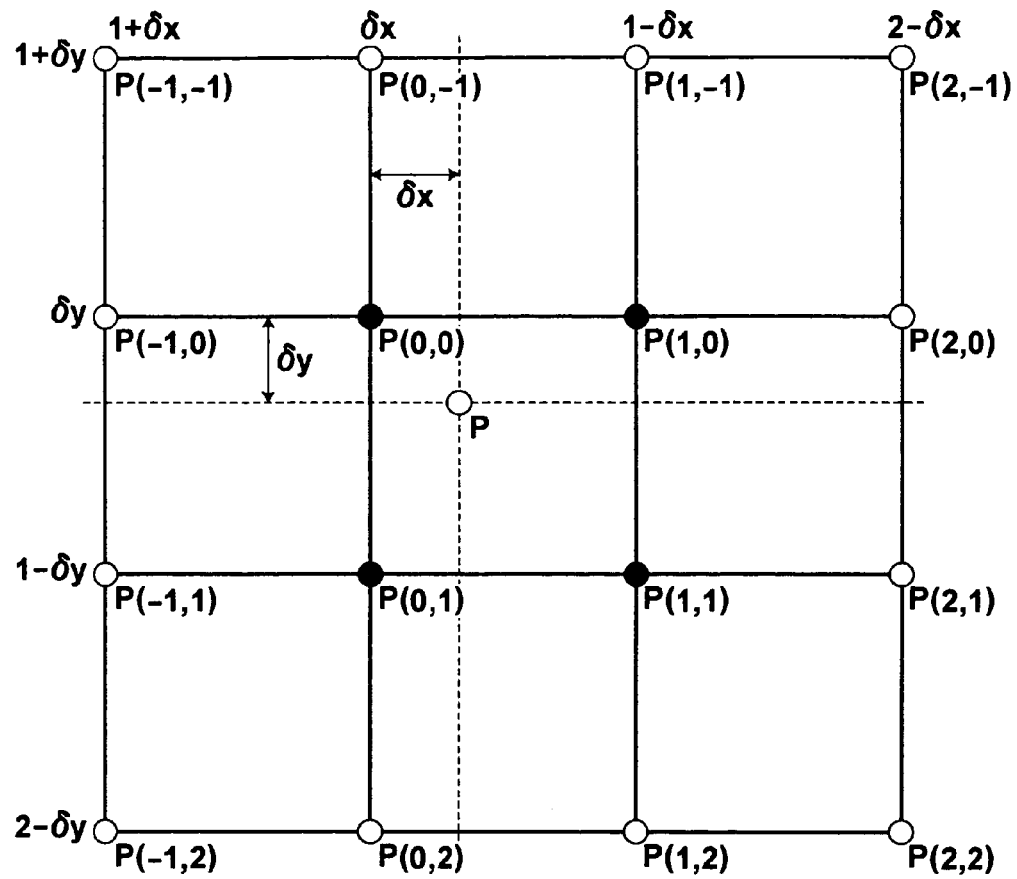
FIG. 84 is a diagram for explaining an interpolation operation.

As illustrated in FIG. 82, the edge detection unit 610 includes a filtering unit 612, a judgment unit 614, an edge pattern classification unit 616, and an edge adjustment unit 618. First, the filtering unit 612 performs filtering processing by using the difference filter illustrated in FIG. 5, on each pixel pair including two mutually adjacent pixels, in a 4×4 pixel block of 16 pixels (16 pixels, P (i, j), (i, j=−1 to 2), illustrated in FIG. 84, hereinafter referred to as 16 pixels of the interpolation pixel P), which are located in the vicinity of the interpolation pixel P in the image S0. Accordingly, the filtering unit 612 obtains the difference in pixel value between each pixel pair (hereinafter, the difference in pixel value between the pixel pair of adjacent pixels is referred to as "d"). Here, the two mutually adjacent pixels are not limited to two pixels such as the pair of P(−1, 0) and P(0, 0), which are adjacent to each other in the x direction of the arrangement direction of the pixels, or the pair of P(−1, −1) and P(−1, 0), which are adjacent to each other in the y direction of the arrangement direction of the pixels. The two mutually adjacent pixels also include two adjacent pixels such as the pair of P(−1, −1) and P(0, 0) or the pair of P(0, 1) and P(1, 0), which are adjacent to each other in the diagonal directions of the 2×2 pixel block.

The judgment unit 614 judges whether the absolute value of the difference d is equal to or larger than a predetermined threshold value Th. If the judgment is YES, the judgment unit 614 judges that there is an edge between the pixel pair corresponding to the difference, and outputs the judgment result to the edge pattern classification unit 616.

Figure 85:
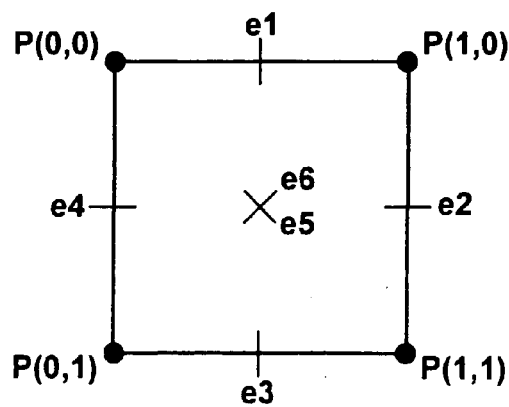
FIG. 85 is a diagram for explaining the operation of an edge pattern classification unit 616.
Figure 86:
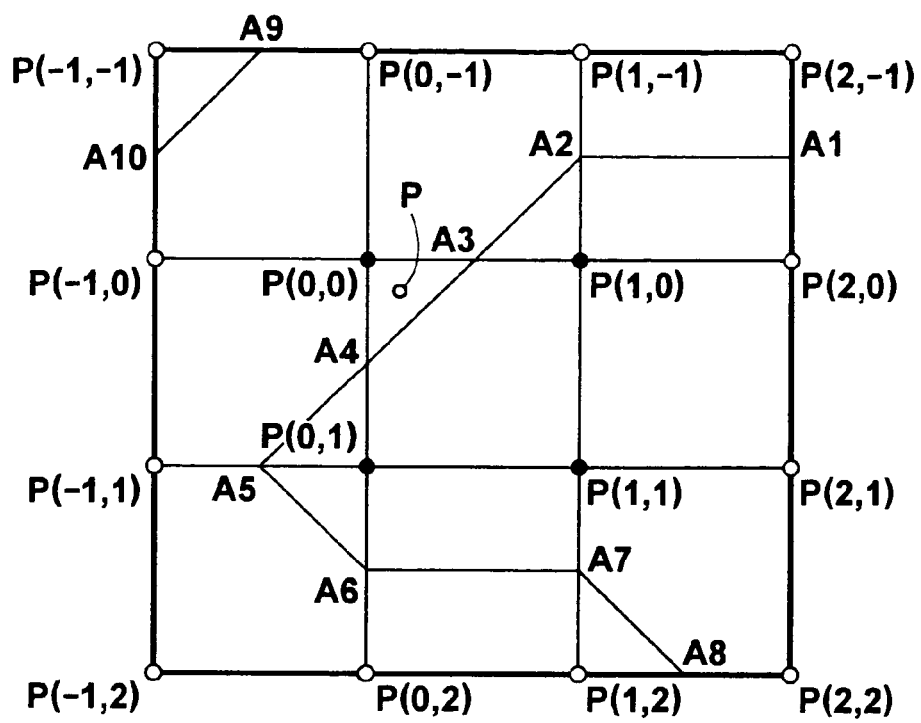
FIG. 86 is a diagram illustrating an example of a classification result by the edge pattern classification unit 616.

The edge pattern classification unit 616 classifies the edge pattern in each 2×2 pixel block based on the judgment result, which is output from the judgment unit 614. The edge pattern classification unit 616 performs edge pattern classification processing for classifying the edge pattern based on a straight line connecting each midpoint between each pair of pixels, between which an edge exists as illustrated in FIG. 85, and outputs the classification result to the edge adjustment unit 618. Since the edge pattern classification processing by the edge pattern classification unit 616 is the same as the edge pattern classification processing by the edge pattern classification unit in each of the embodiments as described above, the detailed explanation is omitted. FIG. 86 shows an example of the classification result by the edge pattern classification unit 616. In this example, the edge pattern within four pixels (● in FIG. 86), which are adjacent to the interpolation pixel P, is a pattern 4. The edge pattern of four pixels, P(−1, −1), P(0, −1), P(0, 0), and P(−1, 0), is a pattern 4. The edge pattern of four pixels, P(0, −1), P(1, −1), P(1, 0), and P(0, 0), is a pattern 2. The edge pattern of four pixels, P(1, −1), P(2, −1), P(2, 0), and P(1, 0), is the pattern 6. The edge pattern of four pixels, P(−1, 0), P(0, 0), P(0, 1), and P(−1, 1), is a pattern 2. The edge pattern of four pixels, P(1, 0), P(2, 0), P(2, 1), and P(1, 1), is the pattern 0. The edge pattern of four pixels, P(−1, 1), P(0, 1), P(0, 2), and P(−1, 2), is a pattern 1. The edge pattern of four pixels, P(0, 1), P(1, 1), P(1, 2), and P(0, 2), is the pattern 6. The edge pattern of four pixels, P(1, 1), P(2, 1), P(2, 2), and P(1, 2), is the pattern 3. In FIG. 86, the zigzag line A1-A2-A3-A4-A5-A6-A7-A8 and the line A9-A10 represent these edge patterns.

Figure 83:
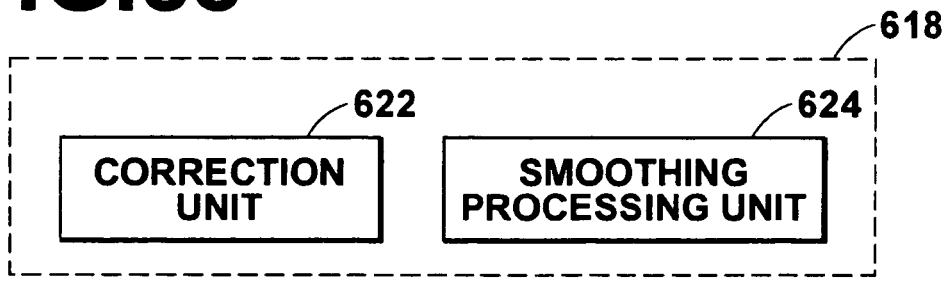
FIG. 83 is a block diagram illustrating the configuration of an edge adjustment unit 618 in the edge detection unit 610, which is illustrated in FIG. 82.

The edge adjustment unit 618 adjusts the edge in the area of 16 pixels of the interpolation pixel P based on the classification result, which is output from the edge pattern classification unit 616. As illustrated in FIG. 83, the edge adjustment unit 618 includes a correction unit 622 and a smoothing unit 624. The correction unit 622 and the smoothing unit 624 will be described in details by using an example of the classification result, which is illustrated in FIG. 86.

Figure 87:
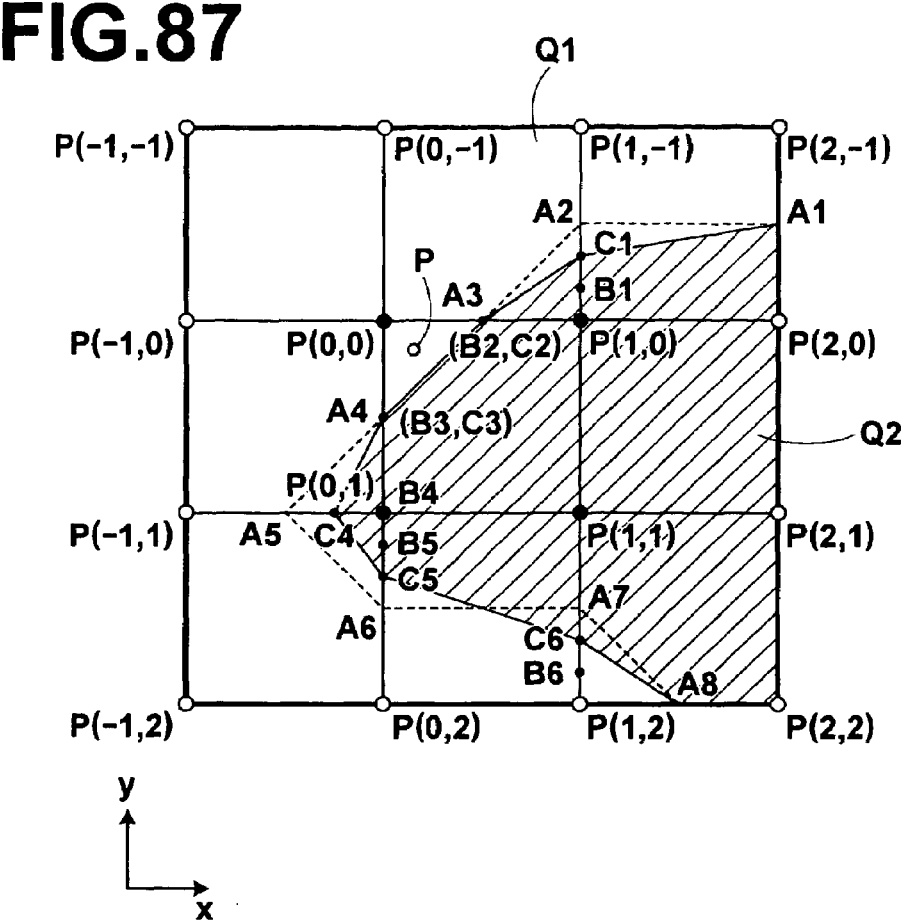
FIG. 87 is a diagram illustrating an example of a processing result by the edge adjustment unit 618.

The correction unit 622 checks, based on the classification result by the edge pattern classification unit 616, whether there is an edge, which is connected to an edge within each set of 2×2 pixels (hereinafter referred to as "pixel block") having an edge pattern other than the pattern 0. In the example illustrated in FIG. 86, except the pixel block including the pixels, P(−1, −1), P(0, −1), P(0, 0), and P(−1, 0), an edge in each of the pixel blocks, which has an edge pattern other than the edge pattern 0, is consecutively connected to each other. There is no edge that is connected the edge A9-A10 within the pixel block (hereinafter, referred to as a block 0) including the pixels P(−1, −1), P(0, −1), P (0, 0), and P (−1, 0). The correction unit 622 obtains an edge pattern in each of five blocks, which are adjacent to the pixel block 0 but not illustrated in FIG. 86, to check whether there is an edge, which is connected to the edge A9-A10, in the five pixel blocks. The five blocks are a pixel block, which is adjacent to the pixel block 0 through to the line connecting the pixel P(−1, −1) and the pixel P(0, −1), a pixel block, which is adjacent to the pixel block 0 through the line connecting the pixel P(−1, −1) and the pixel P(−1, 0), a pixel block, which is adjacent to the pixel block 0 with its point of contact with the pixel block 0 at the pixel P(−1, 0) (namely, a pixel block, which is adjacent to a pixel block including the pixels, P(−1, 0), P(0, 0), P(0, 1), and P(−1, 1) through the line connecting the pixel P(−1, 0) and the pixel P(−1, 1)), a pixel block, which is adjacent to the pixel block 0 with its point of contact with the pixel block 0 at the pixel P(−1, −1), and a pixel block, which is adjacent to the pixel block 0 with its point of contact with the pixel block 0 at the pixel P(0, −1). Specifically, the correction unit 622 causes the filtering unit 612 to obtain the difference in pixel value between two adjacent pixels in each of these pixel blocks. The correction unit 622 causes the judgment unit 614 to judge, based on the difference in pixel value, whether there is an edge. The correction unit 622 causes the edge pattern classification unit 616 to classify the edge pattern in the pixel block based on the judgment. Then, the correction unit 622 checks whether there is an edge, which is connected to the edge A9-A10, in these pixel blocks. If the checking result is NO, the correction unit 622 rejudges that the line A9-A10 is not an edge. If the checking result is YES, the correction unit 622 judges that the line A9-A10 is an edge. Here, it is assumed that the correction unit 622 has judged that there is no edge, which is connected to the edge A9-A10 within the block 0, in these pixel blocks, which are connected to the pixel block 0 and it has rejudged that the edge A9-A10 is not an edge. FIG. 87 is a diagram illustrating an example of an edge detection result by the edge detection unit 610. As clear from FIG. 87, because of the processing by the correction unit 622 in the edge adjustment unit 618, the judgment result from the edge detection unit 610 shows that there is no edge A9-A10 and the pixel block 0 is not an edge-including block.

The smoothing unit 624 performs smoothing processing on the zigzag line A1-A2-A3-A4-A5-A6-A7-A8, which is illustrated in FIG. 86. Specifically, the smoothing unit 624 determines a point, which is located at the middle between the point of contact between two edges, which are connected to each other, on the zigzag line and an intersection of a straight line, which connects two adjacent pixels, between which the point of contact is located, and a straight line, which connects an outer endpoint of each of the two connected edges, as a new point of contact, corresponding to the two mutually connected edges. For example, as illustrated in FIG. 87, an intersection B1 of a straight line A1-A3, which connects the outer endpoints A1 and A3 of the two edges, and a straight line, which connects two adjacent pixels P(−1, −1) and P(1, 0), between which the point A2, the point of contact of the two edges, is located, is obtained for two mutually connected edges A1-A2 and A2-A3. The midpoint C1 between the point A2 of contact, and the intersection B1 is determined as the new point of contact of the edge A1-A2 and the edge A2-A3. The smoothing unit 624 determines the new point of contact for each pair of two mutually connected edges, on the zigzag line A1-A2-A3-A4-A5-A6-A7-A8. In the example illustrated in FIG. 87, the smoothing unit 624 determined the new point C1 of contact of the edge A1-A2 and the edge A2-A3, a new point C2 of contact of the edge A2-A3 and the edge A3-A4, (which is the same as the point A3 of contact), a new point C3 of contact of the edge A3-A4 and the edge A4-A5 (which is the same as the point A4 of contact), a point C5 of contact of the edge A4-A5 and the edge A5-A6, and a new point C6 of contact of the edge A5-A6 and the edge A6-A7, respectively.

Next, the smoothing unit 624 obtains a new zigzag line A1-C1-C2-C3-C4-C5-C6-A8 by consecutively connecting the endpoints A1 and A8 of the two edges A1-A2 and A7-A8 at both ends of the zigzag line A1-A2-A3-A4-A5-A6-A7-A8 and the new points of contact, which are determined as described above. As clear from FIG. 87, the shape of the new zigzag line A1-C1-C2-C3-C4-C5-C6-A8, which is indicated by a solid line, is similar to the shape of the zigzag line A1-A2-A3-A4-A5-A6-A7-A8, but the new zigzag line is smoother than the zigzag line A1-A2-A3-A4-A5-A6-A7-A. The area of the 16 pixels of the interpolation pixel P is divided into two areas of an area Q1 and an area Q2 by the new zigzag line A1-C1-C2-C3-C4-C5-C6-A8. The area Q2 is indicated as a shaded area in FIG. 87.

Figure 88:
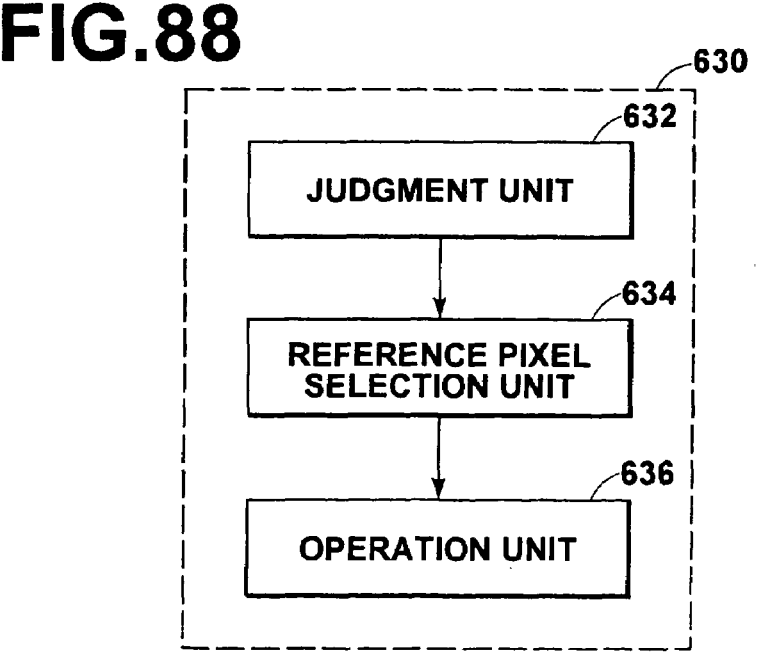
FIG. 88 is a block diagram illustrating the configuration of an interpolation operation unit 630 in the image enlargement/reduction apparatus, which is illustrated in FIG. 80.

The edge adjustment unit 618 outputs the edge pattern as illustrated in FIG. 87, on which processing by the correction unit 622 and the smoothing unit 624 have been performed, as the edge detection result by the edge detection unit 610 to the interpolation operation unit 630. The interpolation operation unit 630 calculates the pixel value of the interpolation pixel P based on the edge detection result. FIG. 88 is a block diagram illustrating the configuration of the interpolation operation unit 630. As illustrated in FIG. 88, the interpolation operation unit 630 includes a judgment unit 632 for judging on which side of the edge the interpolation pixel P exists. The interpolation operation unit 630 also includes a reference pixel selection unit 634 for selecting a pixel, which is located on the same side of the edge as the interpolation pixel P, among the 16 pixels surrounding the interpolation pixel P as the reference pixel. The interpolation operation unit 630 also includes an operation unit 636 for calculating the pixel value of the interpolation pixel P by performing an interpolation operation by using the pixel value of the reference pixel. Here, the interpolation operation unit 630 will be described in details.

If the edge pattern in 2×2 pixel block, which is adjacent to the interpolation pixel P, is the pattern 0, namely there is no edge in the area, the interpolation operation unit 630 calculates the pixel value of the interpolation pixel P using the bicubic method.

Meanwhile, if there is an edge within the 2×2 pixel block of four pixels, which are adjacent to the interpolation pixel P, the interpolation operation unit 630 performs an interpolation operation, which is different from the interpolation operation performed when there is no edge in the 2×2 pixel block of four pixels, which are adjacent to the interpolation pixel P. The interpolation operation, which is performed when there is no edge within the 2×2 pixel block of four pixels, which are adjacent to the interpolation pixel P, is hereinafter referred to as a first interpolation operation (a bicubic interpolation operation, in this case). The interpolation operation, which is performed when there is an edge within the four-pixel block, which is adjacent to the interpolation pixel P, is hereinafter referred to as a second interpolation operation.

With reference to the example illustrated in FIG. 87, the second interpolation operation by the interpolation operation unit 630 will be specifically described.

As illustrated in FIG. 87, the area within the 16 pixels surrounding the interpolation pixel P is divided into two areas of the area Q1 and the area Q2 by an edge. The area Q2 is the shaded area in FIG. 87. First, in the interpolation operation unit 630, the judgment unit 632 judges, based on the edge pattern in the 16 pixels, on which side of the edge the interpolation pixel P exists. For example, it is judged that the interpolation pixel P exists in the area Q1 as illustrated in FIG. 87. Next, the reference pixel selection unit 634 in the interpolation operation unit 630 selects the pixel, which is located on the same side of the edge as the interpolation pixel P, among the 16 pixels surrounding the interpolation pixel P as the reference pixel. In the example illustrated in FIG. 87, pixels, P(−1, −1), P(0, −1), P(1, −1), P(2, −1), P(−1, 0), P(0, 0), P(−1, 1), P(−1, 2), P(0, 2), and P(1, 2) in the area Q1, which are 10 pixels in total, are selected as the reference pixels, which are used for the interpolation operation. Next, the operation unit 636 sets a weight W for each reference pixel, which has been selected by the reference pixel selection unit 634 by giving a more weight to the pixel, which is located closer to the interpolation pixel P. In the example illustrated in FIG. 87, the weight W is set for each reference pixel so that the weight W of the pixel P(0, 0) becomes the largest. Here, the pixel value of the reference pixels, P(−1, −1), P(0, −1), P(1, −1), P(2, −1), P(−1, 0), P(0, 0), P(−1, 1), P(−1, 2), P(0, 2), and P(1, 2), are Pt1-Pt10, respectively. The operation unit 636 sets the weight Wi for each of the reference pixels.

Then, the operation unit 636 calculates the pixel value (referred to as "Pt" in this case) of the interpolation pixel P by performing the operation by using the set weight W according to the following equations (10):

$$Pt = \sum_{i=1}^{10} W1i \cdot Pt1i \text{ wherein,} \quad (10)$$

$$\sum_{i=1}^{10} W1i = 1$$

Figure 89:
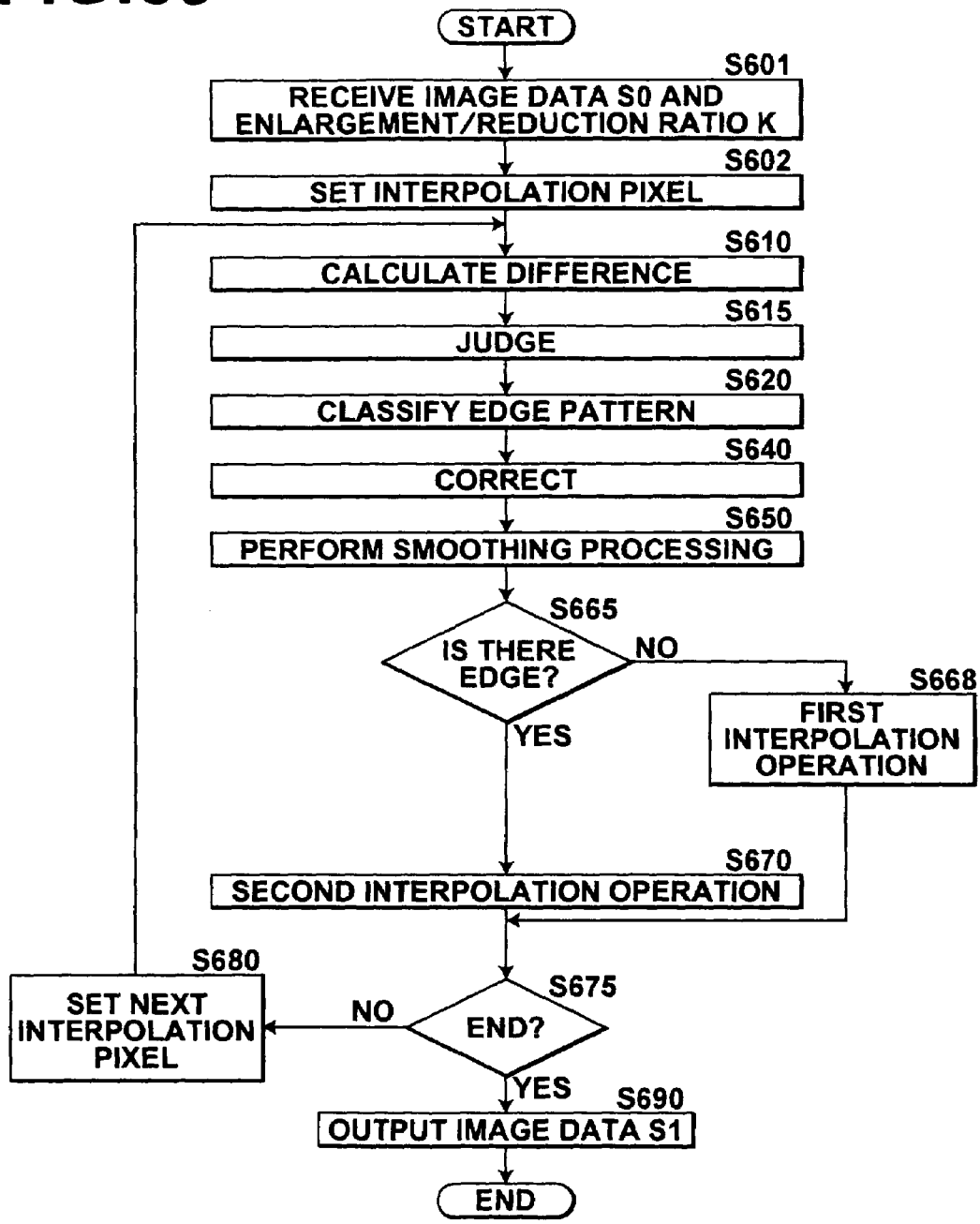
FIG. 89 is a flow chart illustrating processing performed in the image enlargement/reduction apparatus, which is illustrated in FIG. 80.

FIG. 89 is a flow chart illustrating processing performed in the image enlargement/reduction apparatus according to the present embodiment. In the present embodiment, it is assumed that the interpolation pixel P exists between pixels in the image S0. First, the input unit 601 receives an input of image data S0, on which enlargement or reduction processing will be performed, and an enlargement/reduction ratio K of the image data S0 (step S601). Then, the filtering unit 612 performs filtering processing, based on the enlargement/reduction ratio K, on each pixel pair including two adjacent pixels within the 4×4 pixel block of 16 pixels (16 pixels surrounding the interpolation pixel P), which are located in the vicinity of a first interpolation pixel P (a pixel located in the upper left corner of the image, which is represented by the enlarged/reduced image data S1), by using a difference filter. Accordingly, the filtering unit 612 calculates the difference in pixel value between each pixel pair (step S610).

Next, the judgment unit 614 judges whether there is an edge between the two pixels in each pixel pair based on whether the absolute value of the difference in pixel value between each pixel pair is equal to or larger than a predetermined threshold value Th. Specifically, if the absolute value of the difference in pixel value between the pixel pair is equal to or larger than the threshold value Th, the judgment unit 614 judges that there is an edge between the two pixels in the pixel pair. If the absolute value of the difference in pixel value between the pixel pair is less than the threshold value Th, the judgment unit 614 judges that there is no edge between the two pixels in the pixel pair.

The edge pattern classification unit 616 classifies, based on the judgment result by the judgment unit 614, the edge pattern in each 2×2 pixel block of four pixels (step S620). If there is no edge in 2×2 pixel blocks, which are adjacent to a 2×2 pixel block, the edge adjustment unit 618 rejudges that an edge in the 2×2 pixel block is not an edge. The edge adjustment unit 618 also outputs the result obtained by performing smoothing processing on the zigzag line, which is formed by consecutively connecting edges in the adjacent pixel blocks, as the detection result by the edge detection unit 610 to the interpolation operation unit 630 (steps S640 and S650). If there is no edge within the 2×2 pixel block, which is adjacent to the interpolation pixel P, based on the classification result by the edge pattern classification unit 616 (step S660: NO), the interpolation operation unit 630 performs the first interpolation operation, namely the interpolation operation by the bicubic interpolation method, and obtains the pixel value of the interpolation pixel P (step S668). Meanwhile, if there is an edge within the 2×2 pixel block, which is adjacent to the interpolation pixel (step S660: YES), the interpolation operation unit 630 performs the second interpolation operation, and obtains the pixel value of the interpolation pixel P (step S670).

The control unit 650 judges whether the pixel values of all the interpolation pixels P in the image S0 have been calculated (step S675). If step S675 is NO, the control unit 650 sets an interpolation pixel P, of which pixel value should be calculated, as the next interpolation pixel P (step S680), and the processing goes back to the process from step S610. If step S680 is YES, the control unit 650 outputs the enlarged/reduced image data S1 including the interpolation pixel P (step S690), and the processing ends.

What is claimed is:

1. An intermediate value pixel judgment method comprising the steps:
   judging an intermediate value pixel, which is a pixel representing an edge part in a subject, and of which pixel value is an intermediate value between signal values in the parts on both sides of the edge in the edge part, in a digital image obtained by taking a photograph of the subject;
   detecting whether there is an edge between pixels in the digital image; and
   if the edge is detected between each pair of mutually adjacent pixels among three serially adjacent pixels in the digital image in the detecting step, judging that the pixel, which is located at the middle among the three pixels, is the intermediate value pixel.

2. An intermediate value pixel judgment method comprising the steps:
   judging an intermediate value pixel, which is a pixel representing an edge part in a subject, and of which pixel value is an intermediate value between signal values in the parts on both sides of the edge in the edge part, in a digital image obtained by taking a photograph of the subject;
   detecting whether there is an edge between pixels in the digital image;
   if the edge is detected between each pair of mutually adjacent pixels among three serially adjacent pixels in the digital image in the detecting step, selecting the pixel, which is located at the middle among the three pixels, as a candidate pixel for the intermediate value pixel;
   comparing the pixel values of the three adjacent pixels, which includes the selected candidate pixel; and
   only if the pixel values of the three adjacent pixels monotonically increase or monotonically decrease along the arrangement direction of the three pixels, judging that the candidate pixel is the intermediate value pixel.

3. An intermediate value pixel judgment method as defined in claim 2, further comprising the step of:
   distinguishing the extension direction of the edge, which is detected in the detecting step, wherein only if the edge is detected between each pair of mutually adjacent pixels among the three serially adjacent pixels in the digital image, and the extension directions of the two detected edges are the same, the pixel, which is located at the middle among the three pixels, is selected as the candidate pixel.

4. An image interpolation method comprising the steps of:
   when the pixel value of an interpolation pixel is obtained, which is located between pixels in a digital image obtained by taking a photograph of a subject, detecting whether there is an edge between pixels in the vicinity of the interpolation pixel in the digital image;
   selecting a different reference pixel from the pixels in the vicinity of the interpolation pixel depending on whether the edge is detected; and
   obtaining the pixel value of the interpolation pixel by performing an interpolation operation by using the pixel value of the selected reference pixel, wherein the interpolation operation is performed by giving a less weight to an edge neighboring pixel, which is one of two adjacent pixels on both sides of the edge detected in the detecting step, than the weight of the reference pixel other than the edge neighboring pixel.

5. An image interpolation method comprising the steps of:
   when the pixel value of an interpolation pixel is obtained, which is located between pixels in a digital image obtained by taking a photograph of a subject, detecting whether there is an edge between pixels in the vicinity of the interpolation pixel in the digital image;
   selecting a different reference pixel from the pixels in the vicinity of the interpolation pixel depending on whether the edge is detected;
   obtaining the pixel value of the interpolation pixel by performing an interpolation operation by using the pixel value of the selected reference pixel; and
   judging whether the reference pixel is an intermediate value pixel, which is a pixel representing an edge part in the subject, and of which pixel value is an intermediate value between signal values in the parts on both sides of the edge, wherein the interpolation operation is performed by giving a less weight to a reference pixel, which is judged to be the intermediate value pixel, than the weight of a reference pixel, which is judged not to be the intermediate value pixel.

6. An edge adjustment method comprising the steps of:
   detecting an edge located between pixels in a digital photograph image obtained by taking a photograph of a subject; and
   if the edge is detected between each pair of mutually adjacent pixels among three serially adjacent pixels in the digital photograph image, merging the two edges at a position in the vicinity of the middle pixel among the three pixels.

7. An edge adjustment method as defined in claim 6, further comprising the steps of:
   comparing the pixel values of the three pixels of the two edges with each other, wherein only if the pixel values of the three pixels monotonically increase or monotonically decrease along the arrangement direction of the three pixels, the two edges are merged.

8. An edge adjustment method as defined in claim 6, wherein only if the extension directions of the two edges are the same, the two edges are merged.

9. An edge adjustment method as defined in claim 7, wherein only if the extension directions of the two edges are the same, the two edges are merged.

10. An edge detection method comprising the steps of:
    judging whether there is an edge between two adjacent pixels in an image;
    obtaining edge information, based on the judgment, representing whether there is an edge within a 2×2 pixel block in the image and an edge pattern including the position of the edge and the extension direction of the edge in an edge-including block, which includes the edge; and
    if the edge information of each of the pixel blocks, which are adjacent to the edge-including block, indicates that there is no edge connected to the edge in the edge-including block, rejudging that the edge in the edge-including block is not an edge.

11. An edge detection method comprising the steps of:
    judging whether there is an edge between two adjacent pixels in an image;
    obtaining edge information, based on the judgment, representing whether there is an edge within a 2×2 pixel block in the image and an edge pattern including the position of the edge and the extension direction of the edge in an edge-including block, which includes the edge; and in an area including at least two adjacent edge-including blocks, performing processing on each pair of mutually connected edges on a zigzag line, which is formed by consecutively connecting edges, each represented by the edge pattern in each of the edge-including blocks, so that a point, which is located between the point of contact between two mutually connected edges on the zigzag line and an intersection of a straight line connecting two adjacent pixels on both sides of the point of contact in the image and a straight line connecting the outer endpoints of the two mutually connected edges, becomes a new point of contact, which corresponds to the two mutually connected edges, and using a new zigzag line, which is formed by sequentially connecting the outer endpoint of each edge at both ends of the zigzag line and each of the new points of contact, as an edge in the area.

12. An intermediate value pixel judgment apparatus for judging an intermediate value pixel, which is a pixel representing an edge part in a subject, and of which pixel value is an intermediate value between signal values in the parts on both sides of the edge in the edge part, in a digital image obtained by taking a photograph of the subject, the apparatus comprising:
   an edge detection means for detecting whether there is an edge between pixels in the digital image; and
   a judgment means for judging that if the edge detection means detects the edge between each pair of mutually adjacent pixels among three serially adjacent pixels in the digital image, the pixel, which is located at the middle among the three pixels, is the intermediate value pixel.

13. An intermediate value pixel judgment apparatus for judging an intermediate value pixel, which is a pixel representing an edge part in a subject, and of which pixel value is an intermediate value between signal values in the parts on both sides of the edge in the edge part, in a digital image obtained by taking a photograph of the subject, the apparatus comprising:
   an edge detection means for detecting whether there is an edge between pixels in the digital image;
   a candidate pixel selection means for, if the edge detection means detects the edge between each pair of mutually adjacent pixels among three serially adjacent pixels in the digital image, selecting the pixel, which is located at the middle among the three pixels, as a candidate pixel for the intermediate value pixel; and
   a judgment means for comparing the pixel values of the three adjacent pixels, which includes the selected candidate pixel, and only if the pixel values of the three adjacent pixels monotonically increase or monotonically decrease along the arrangement direction of the three pixels, judging that the candidate pixel is the intermediate value pixel.

14. An intermediate value pixel judgment apparatus as defined in claim 13, wherein the edge detection means includes an edge direction distinction means for distinguishing the extension direction of the detected edge, wherein only if the edge is detected between each pair of mutually adjacent pixels among the three serially adjacent pixels in the digital image, and the extension directions of the two detected edges are the same, the candidate pixel selection means selects the pixel, which is located at the middle among the three pixels, as the candidate pixel.

15. An image interpolation apparatus comprising:
   an edge detection means for, when the pixel value of an interpolation pixel is obtained, which is located between pixels in a digital image obtained by taking a photograph of a subject, detecting whether there is an edge between pixels in the vicinity of the interpolation pixel in the digital image;
   a reference pixel selection means for selecting a different reference pixel from the pixels in the vicinity of the interpolation pixel depending on whether the edge is detected; and
   an interpolation operation means for obtaining the pixel value of the interpolation pixel by performing an interpolation operation by using the pixel value of the selected reference pixel, wherein the interpolation operation means performed the interpolation operation by giving a less weight to an edge neighboring pixel, which is one of two adjacent pixels on both sides of the edge detected by the edge detection means, than the weight of the reference pixel other than the edge neighboring pixel.

16. An image interpolation apparatus comprising:
   an edge detection means for when the pixel value of an interpolation pixel is obtained, which is located between pixels in a digital image obtained by taking a photograph of a subject, detecting whether there is an edge between pixels in the vicinity of the interpolation pixel in the digital image;
   a reference pixel selection means for selecting a different reference pixel from the pixels in the vicinity of the interpolation pixel depending on whether the edge is detected;
   an interpolation operation means for obtaining the pixel value of the interpolation pixel by performing an interpolation operation by using the pixel value of the selected reference pixel; and
   an intermediate value pixel judgment means for judging whether the reference pixel is an intermediate value pixel, which is a pixel representing an edge part in the subject, and of which pixel value is an intermediate value between signal values in the parts on both sides of the edge, wherein the interpolation operation means performs the interpolation operation by giving a less weight to a reference pixel, which is judged to be the intermediate value pixel, than the weight of a reference pixel, which is judged not to be the intermediate value pixel.

17. An image interpolation apparatus as defined in claim 16, wherein if the edge detection means detects the edge between each pair of mutually adjacent pixels among three serially adjacent pixels in the digital image, the intermediate value pixel judgment means judges that the pixel located at the middle among the three pixels is the intermediate value pixel.

18. An image interpolation apparatus as defined in claim 16, wherein if the edge detection means detects the edge between each pair of mutually adjacent pixels among three serially adjacent pixels in the digital image, the intermediate value pixel judgment means selects the pixel located at the middle among the three pixels as a candidate pixel for the intermediate value pixel, and compares the pixel values of the three adjacent pixels including the selected candidate pixel, and only if the compared pixel values of the three pixels monotonically increase or monotonically decrease along the arrangement direction of the three pixels, the intermediate value pixel judgment means judges that the candidate pixel is the intermediate value pixel.

19. An image interpolation apparatus as defined in claim 18, wherein the edge detection means includes an edge direction distinction means for distinguishing the extension direction of the detected edge, wherein only if the edge detection means detects the edge between each pair of mutually adjacent pixels among three serially adjacent pixels on the image and the extension directions of the two detected edges are the same, the intermediate value pixel judgment means selects the pixel located at the middle among the three pixels as the candidate pixel.

20. An edge adjustment apparatus comprising:
an edge detection means for detecting an edge located between pixels in a digital photograph image obtained by taking a photograph of a subject; and
an edge merger means for, if the edge detection means detects the edge between each pair of mutually adjacent pixels among three serially adjacent pixels in the digital photograph image, merging the two edges at a position in the vicinity of the middle pixel among the three pixels.

21. An edge adjustment apparatus as defined in claim 20, wherein the edge merger means compares the pixel values of the three pixels of the two edges with each other, and only if the pixel values of the three pixels monotonically increase or monotonically decrease along the arrangement direction of the three pixels, the edge merger means merges the two edges.

22. An edge adjustment apparatus as defined in claim 20, wherein the edge detection means detects the extension direction of the edge, and only if the extension directions of the two edges are the same, the edge merger means merges the two edges.

23. An edge adjustment apparatus as defined in claim 21, wherein the edge detection means detects the extension direction of the edge, and only if the extension directions of the two edges are the same, the edge merger means merges the two edges.

24. An edge detection apparatus comprising:
a judgment means for judging whether there is an edge between two adjacent pixels in an image;
an edge information obtainment means for obtaining edge information, based on the judgment, representing whether there is an edge within a 2×2 pixel block in the image and an edge pattern including the position of the edge and the extension direction of the edge in an edge-including block, which includes the edge; and
a correction means for, if the edge information of each of the pixel blocks, which are adjacent to the edge-including block, indicates that there is no edge connected to the edge in the edge-including block, rejudging that the edge in the edge-including block is not an edge.

25. An edge detection apparatus comprising:
a judgment means for judging whether there is an edge between two adjacent pixels in an image;
an edge information obtainment means for obtaining edge information, based on the judgment, representing whether there is an edge within a 2×2 pixel block in the image and an edge pattern including the position of the edge and the extension direction of the edge in an edge-including block, which includes the edge; and
an edge smoothing means for, in an area including at least two adjacent edge-including blocks, performing processing on each pair of mutually connected edges on a zigzag line, which is formed by consecutively connecting edges, each represented by the edge pattern in each of the edge-including blocks, so that a point, which is located between the point of contact between two mutually connected edges on the zigzag line and an intersection of a straight line connecting two adjacent pixels on both sides of the point of contact in the image and a straight line connecting the outer endpoints of the two connected edges, becomes a new point of contact, which corresponds to the two connected edges, and using a new zigzag line, which is formed by sequentially connecting the outer endpoint of each edge at both ends of the zigzag line and each of the new points of contact, as an edge in the area.

26. A program embodied in a computer readable medium for causing a computer to execute an intermediate value pixel judgment method, the program comprising the procedure for:
judging an intermediate value pixel, which is a pixel representing an edge part in a subject, and of which pixel value is an intermediate value between signal values in the parts on both sides of the edge in the edge part, in a digital image obtained by taking a photograph of the subject, wherein the intermediate value pixel judgment procedure includes an edge detection procedure for detecting whether there is an edge between pixels in the digital image, and a judgment procedure for, if the edge is detected between each pair of mutually adjacent pixels among three serially adjacent pixels in the digital image in the detection, judging that the pixel, which is located at the middle among the three pixels, is the intermediate value pixel.

27. A program embodied in a computer readable medium for causing a computer to execute an intermediate value pixel judgment method, the program comprising the procedure for:
judging an intermediate value pixel, which is a pixel representing an edge part in a subject, and of which pixel value is an intermediate value between signal values in the parts on both sides of the edge in the edge part, in a digital image obtained by taking a photograph of the subject, wherein the intermediate value pixel judgment procedure includes an edge detection procedure for detecting whether there is an edge between pixels in the digital image, a candidate pixel selection procedure for, if the edge is detected between each pair of mutually adjacent pixels among three serially adjacent pixels in the digital image in the detection, selecting the pixel, which is located at the middle among the three pixels, as a candidate pixel for the intermediate value pixel, and a judgment procedure for comparing the pixel values of the three adjacent pixels, which includes the selected candidate pixel, and only if the pixel values of the three adjacent pixels monotonically increase or monotonically decrease along the arrangement direction of the three pixels, judging that the candidate pixel is the intermediate value pixel.

28. A program embodied in a computer readable medium for causing a computer to execute an intermediate value pixel judgment method, as defined in claim 27, wherein the candidate pixel selection procedure includes an edge direction distinction procedure for distinguishing the extension direction of the detected edge, wherein the candidate pixel selection procedure is a procedure for, only if the edge is detected between each pair of mutually adjacent pixels among the three serially adjacent pixels in the digital image, and the extension directions of the two detected edges are the same, selecting the pixel, which is located at the middle among the three pixels as the candidate pixel.

29. A program embodied in a computer readable medium for causing a computer to execute an image interpolation method, the program comprising the procedures for:
when the pixel value of an interpolation pixel is obtained, which is located between pixels in a digital image obtained by taking a photograph of a subject, detecting whether there is an edge between pixels in the vicinity of the interpolation pixel in the digital image;
selecting a different reference pixel from the pixels in the vicinity of the interpolation pixel depending on whether the edge is detected; and performing an interpolation operation by using the pixel value of the selected reference pixel to obtain the pixel value of the interpolation pixel, wherein the interpolation operation procedure is a procedure for performing the interpolation operation by giving a less weight to an edge neighboring pixel, which is one of two adjacent pixels on both sides of the edge detected in the detection, than the weight of the reference pixel other than the edge neighboring pixel.

30. A program embodied in a computer readable medium for causing a computer to execute an image interpolation method, the program comprising the procedures for:
when the pixel value of an interpolation pixel is obtained, which is located between pixels in a digital image obtained by taking a photograph of a subject, detecting whether there is an edge between pixels in the vicinity of the interpolation pixel in the digital image;
selecting a different reference pixel from the pixels in the vicinity of the interpolation pixel depending on whether the edge is detected;
performing an interpolation operation by using the pixel value of the selected reference pixel to obtain the pixel value of the interpolation pixel by performing an interpolation operation; and
judging whether the reference pixel is an intermediate value pixel, which is a pixel representing an edge part in the subject, and of which pixel value is an intermediate value between signal values in the parts on both sides of the edge, wherein the interpolation operation procedure is a procedure for performing the interpolation operation by giving a less weight to a reference pixel, which is judged to be the intermediate value pixel, than the weight of a reference pixel, which is judged not to be the intermediate value pixel.

31. A program embodied in a computer readable medium for causing a computer to execute an edge adjustment method, the program comprising the procedures for:
detecting an edge located between pixels in a digital photograph image obtained by taking a photograph of a subject; and
if the edge is detected between each pair of mutually adjacent pixels among three serially adjacent pixels in the digital photograph image, merging the two edges at a position in the vicinity of the middle pixel among the three pixels.

32. A program embodied in a computer readable medium for causing a computer to execute an edge adjustment method, as defined in claim 31, wherein the edge merger procedure is a procedure for comparing the pixel values of the three pixels of the two edges with each other, and only if the pixel values of the three pixels monotonically increase or monotonically decrease along the arrangement direction of the three pixels, merging the two edges.

33. A program embodied in a computer readable medium for causing a computer to execute an edge adjustment method, as defined in claim 31, wherein the edge detection procedure is a procedure for, only if the extension directions of the two edges are the same, merging the two edges.

34. A program embodied in a computer readable medium for causing a computer to execute an edge adjustment method, as defined in claim 32, wherein the edge detection procedure is a procedure for, only if the extension directions of the two edges are the same, merging the two edges.

35. A program embodied in a computer readable medium for causing a computer to execute an edge detection method, the program comprising the procedures for:
judging whether there is an edge between two adjacent pixels in an image;
obtaining edge information, based on the judgment, representing whether there is an edge within a 2×2 pixel block in the image and an edge pattern including the position of the edge and the extension direction of the edge in an edge-including block, which includes the edge; and
if the edge information of each of the pixel blocks, which are adjacent to the edge-including block, indicates that there is no edge connected to the edge in the edge-including block, rejudging that the edge in the edge-including block is not an edge.

36. A program embodied in a computer readable medium for causing a computer to execute an edge adjustment method, the program comprising the procedures for:
judging whether there is an edge between two adjacent pixels in an image;
obtaining edge information, based on the judgment, representing whether there is an edge within a 2×2 pixel block in the image and an edge pattern including the position of the edge and the extension direction of the edge in an edge-including block, which includes the edge;
in an area including at least two adjacent edge-including blocks, performing processing on each pair of mutually connected edges on a zigzag line, which is formed by consecutively connecting edges, each represented by the edge pattern in each of the edge-including blocks, so that a point, which is located between the point of contact between two mutually connected edges on the zigzag line and an intersection of a straight line connecting two adjacent pixels on both sides of the point of contact in the image and a straight line connecting the outer endpoints of the two connected edges, becomes a new point of contact, which corresponds to the two connected edges; and
using a new zigzag line, which is formed by sequentially connecting the outer endpoint of each edge at both ends of the zigzag line and each of the new points of contact, as an edge in the area.

* * * * *